(12) United States Patent
Yazawa

(10) Patent No.: US 7,370,406 B2
(45) Date of Patent: May 13, 2008

(54) METHOD OF MANUFACTURING A THIN FILM STRUCTURE

(75) Inventor: Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 418 days.

(21) Appl. No.: 10/858,999

(22) Filed: Jun. 2, 2004

(65) Prior Publication Data

US 2004/0246623 A1   Dec. 9, 2004

(30) Foreign Application Priority Data

Jun. 9, 2003   (JP)   ............................ 2003-163088
Sep. 9, 2003   (JP)   ............................ 2003-316950

(51) Int. Cl.
*G11B 5/17* (2006.01)

(52) U.S. Cl. ............................ 29/603.23; 29/603.07; 29/603.25; 29/846; 29/841; 29/850; 205/119; 205/123; 205/125; 360/234.4; 360/264.2

(58) Field of Classification Search ............ 29/603.07, 29/846, 850, 852, 841, 855, 842, 831, 603.23, 29/603.25, 603.24; 205/119, 123, 125, 135; 360/234.4, 264.2, 266.3
See application file for complete search history.

(56) References Cited

U.S. PATENT DOCUMENTS

| 5,120,678 | A | * | 6/1992 | Moore et al. | ............ 29/841 X |
| 5,784,261 | A | * | 7/1998 | Pedder | ............ 29/841 X |
| 6,117,299 | A | * | 9/2000 | Rinne et al. | ............ 205/125 |
| 6,256,170 | B1 | | 7/2001 | Honda | |
| 2003/0066680 | A1 | | 4/2003 | Kikuiri et al. | |

FOREIGN PATENT DOCUMENTS

| JP | 58-179922 | | 10/1983 | |
| JP | 64-11398 | * | 1/1989 | ............ 205/135 |

(Continued)

OTHER PUBLICATIONS

Itagashi et al., "Thin Film Lmainated Multilayer Wiring Board for Multichip Modules", 1995 Proceedings of Electronic Manufacturing Technology Symposium, 18th IEEE/CPMT International, Dec. 1995, pp. 318-322.*

(Continued)

*Primary Examiner*—A. Dexter Tugbang
(74) *Attorney, Agent, or Firm*—Brinks Hofer Gilson & Lione

(57) ABSTRACT

A thin film magnetic head is described, the magnetic head having an insulating layer and a protrusion which has an upper portion and a base portion, and the upper portion has an extended portion. The insulating layer is present under the extending part. A method of manufacturing the magnetic head includes forming a first insulating layer around the lower core layer; simultaneously forming a coil layer by plating the lower core layer with a coil insulating underlayer interposed between the lower coil layer and a coil lead layer connected to the coil layer on the first insulating layer; forming a coil insulating layer of an inorganic material on the coil layer and the coil lead layer; and, simultaneously forming a first plating underlayer for forming an upper core layer by plating, a second plating underlayer on the first coil lead layer exposed through the plating-forming opening, and a current-carrying lead layer.

4 Claims, 42 Drawing Sheets

FOREIGN PATENT DOCUMENTS

| | | |
|---|---|---|
| JP | 2-123511 | 5/1990 |
| JP | 04-021919 | 1/1992 |
| JP | 4-21919 | 1/1992 |
| JP | 09-073608 | 3/1997 |
| JP | 11-100690 | 4/1999 |
| JP | 2000-149221 | 5/2000 |
| JP | 2003-123208 | 4/2003 |

OTHER PUBLICATIONS

Notification of Reasons for Refusal dated Mar. 28, 2006 for corresponding Japanese Application No. 2003-316950.

* cited by examiner

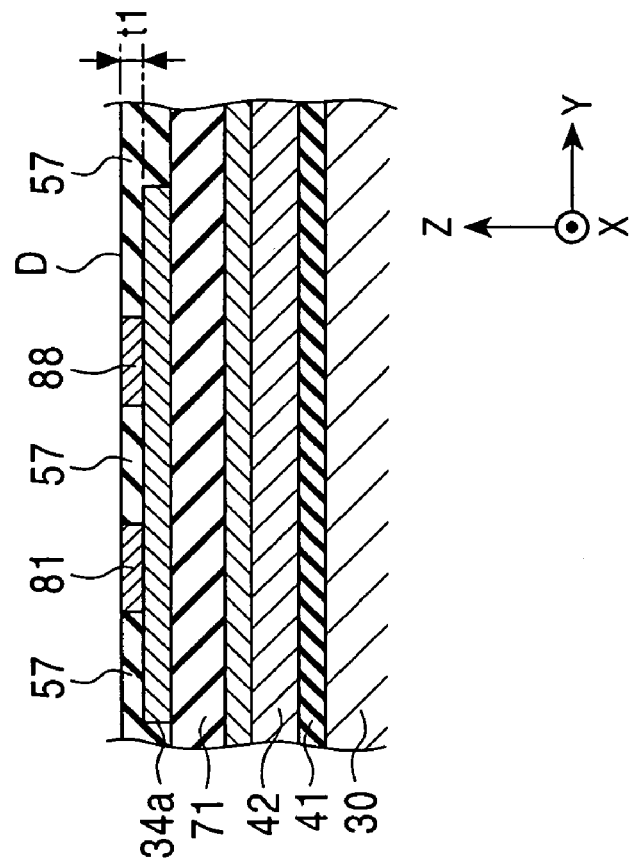
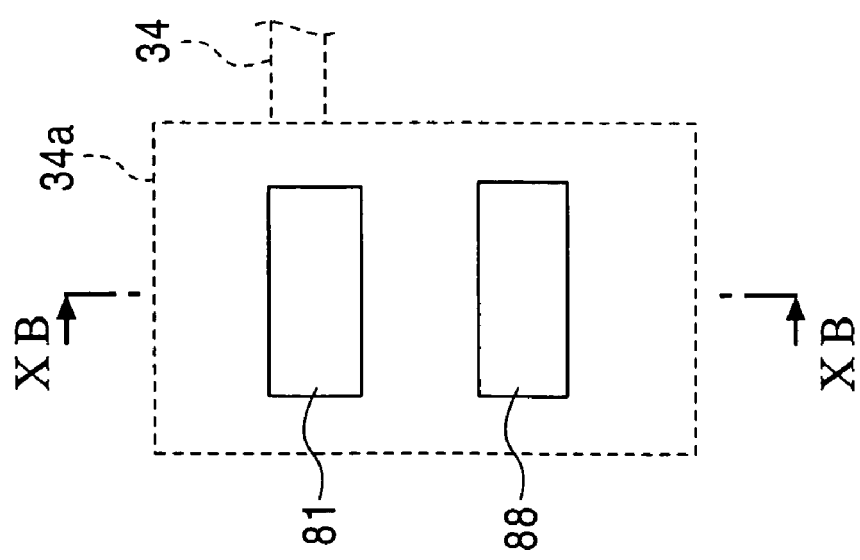

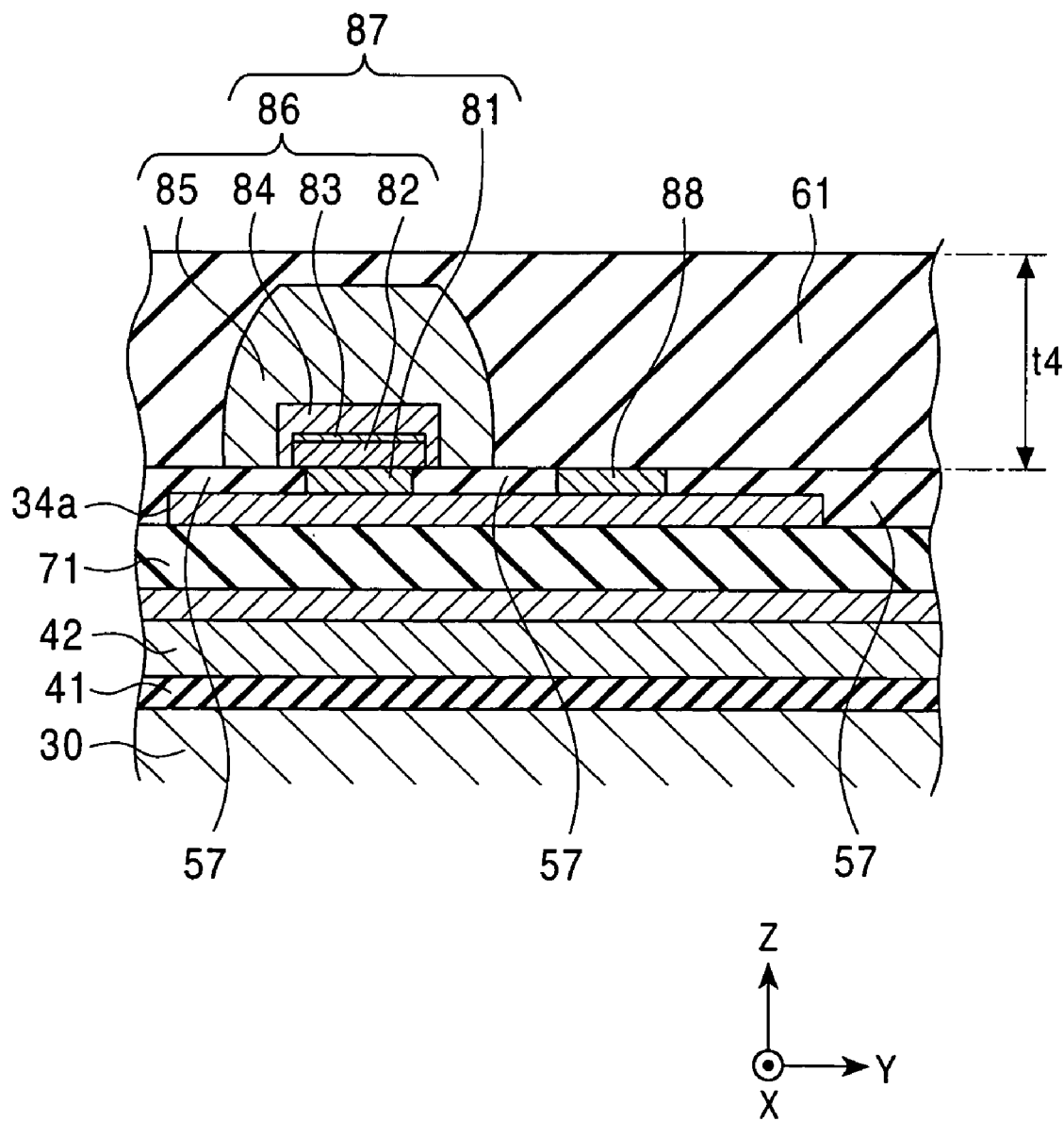

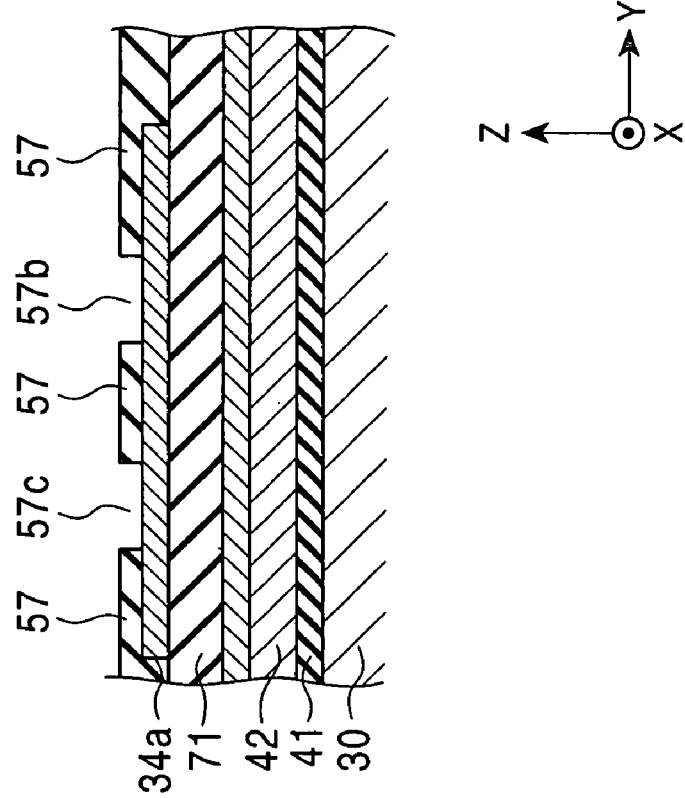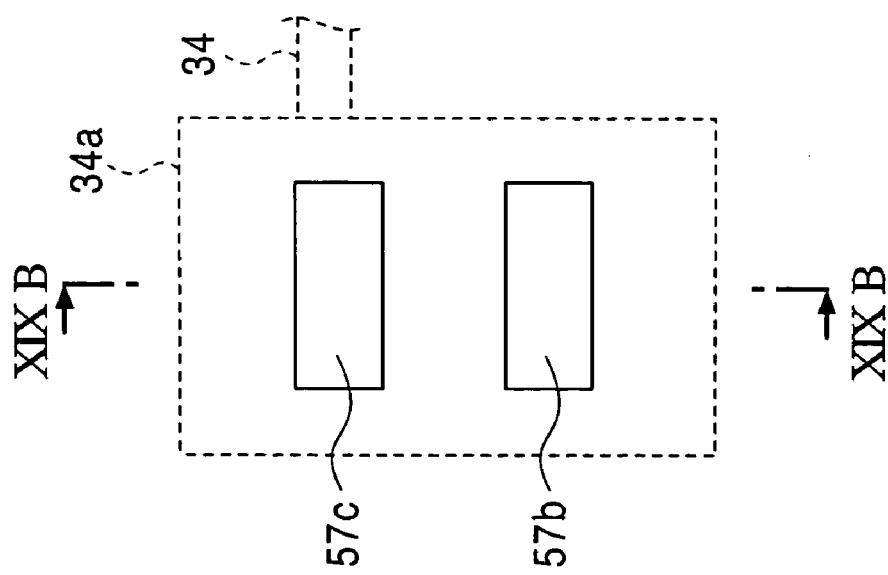

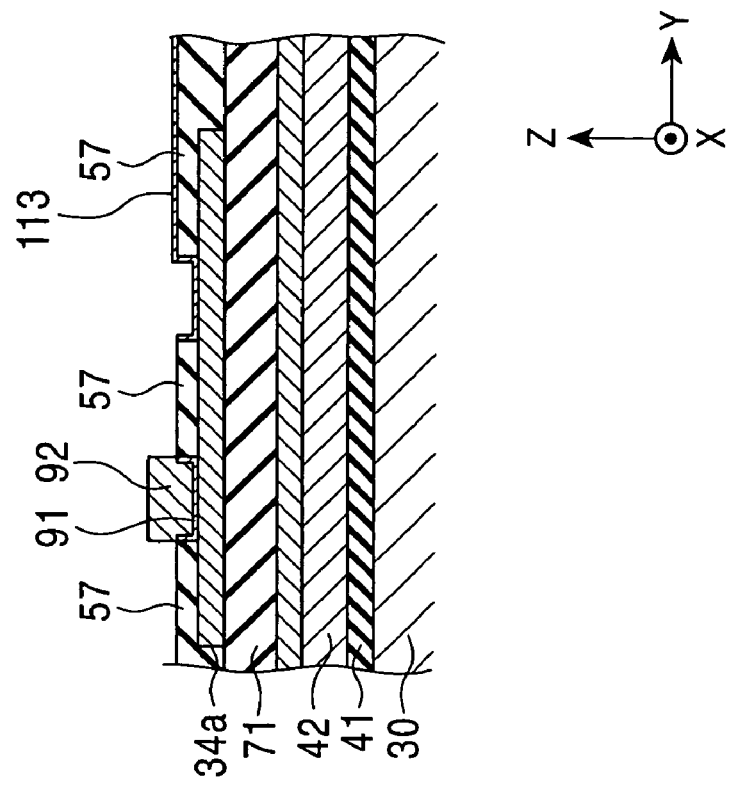
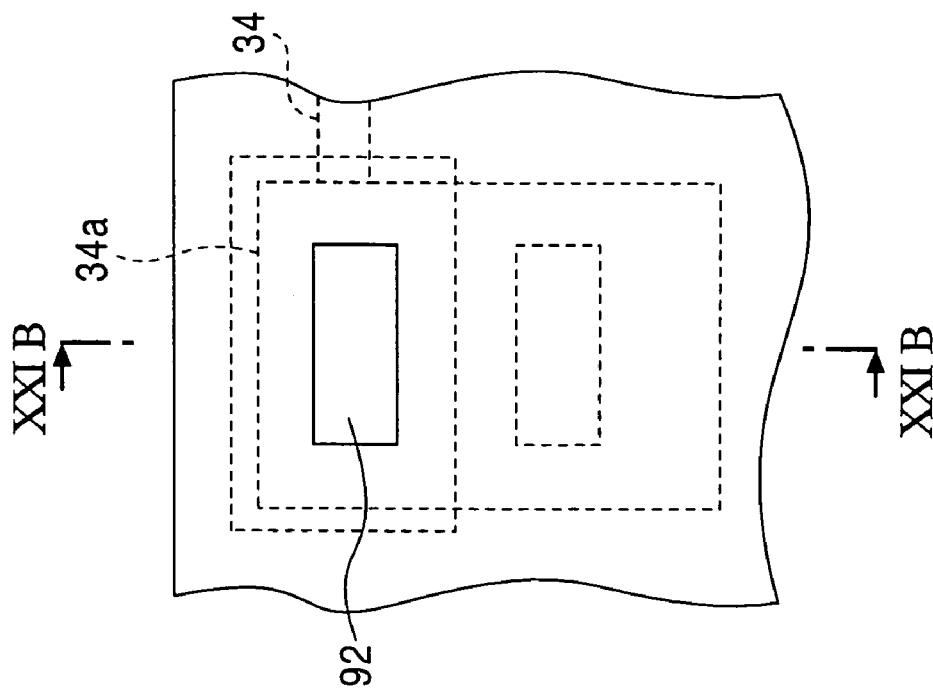

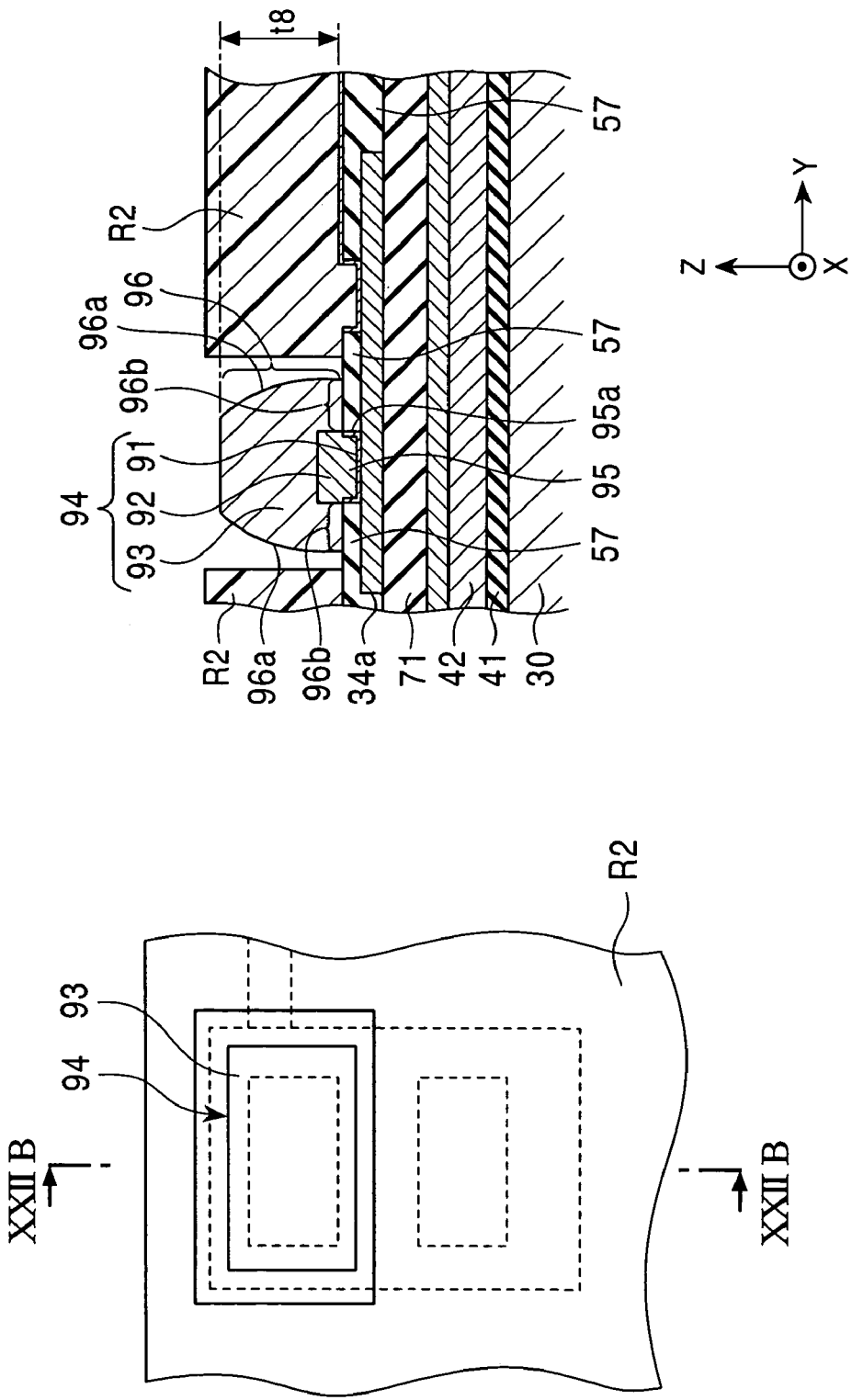

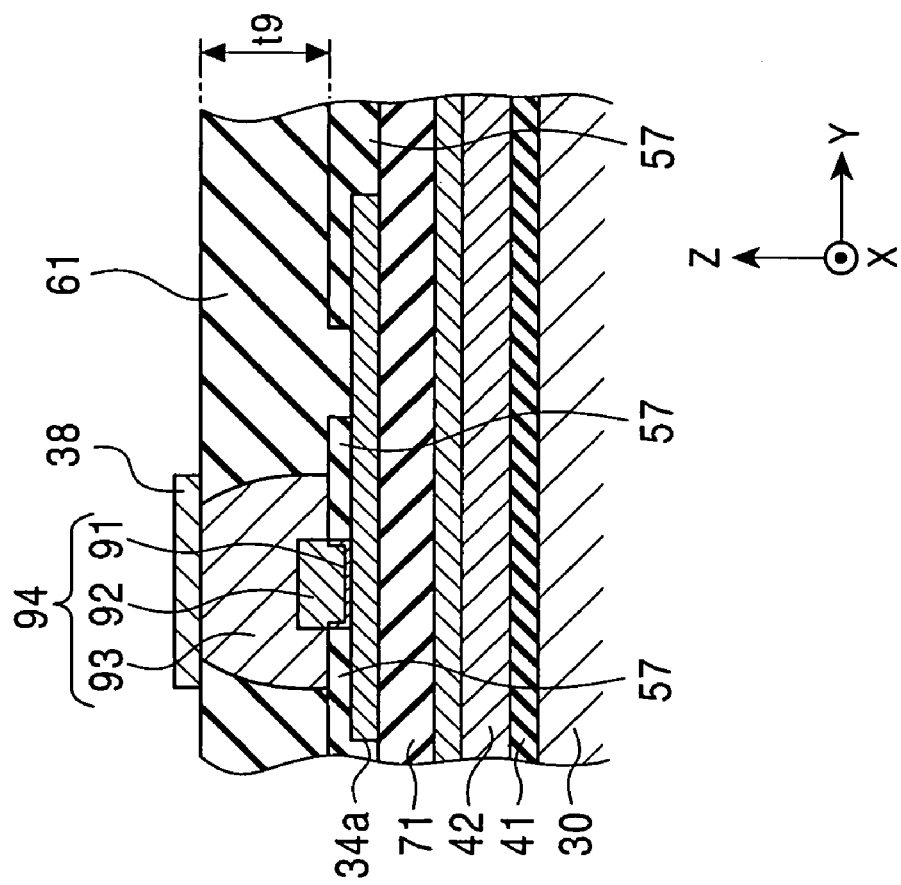
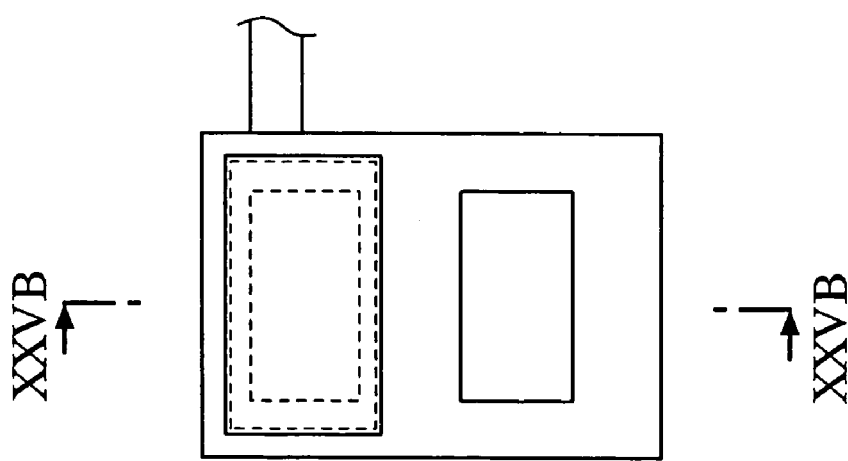

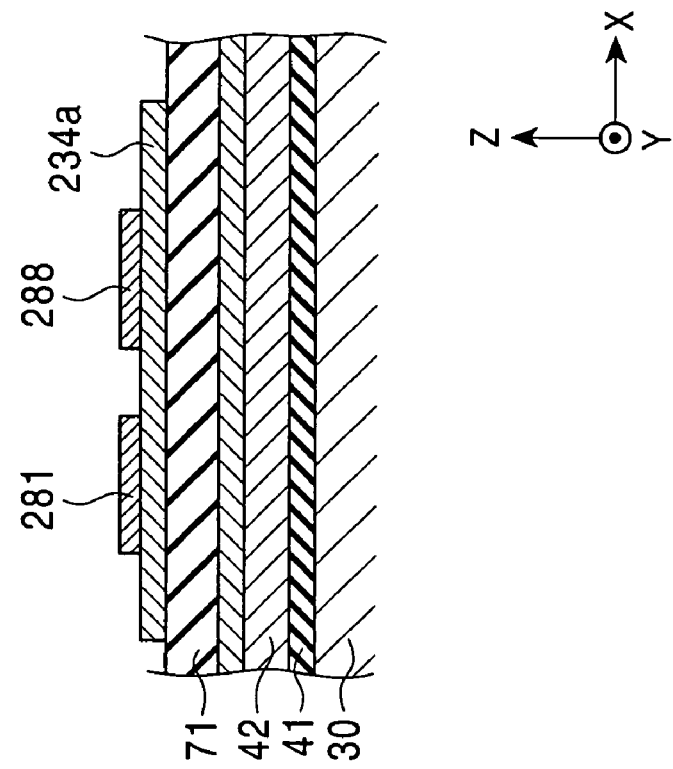
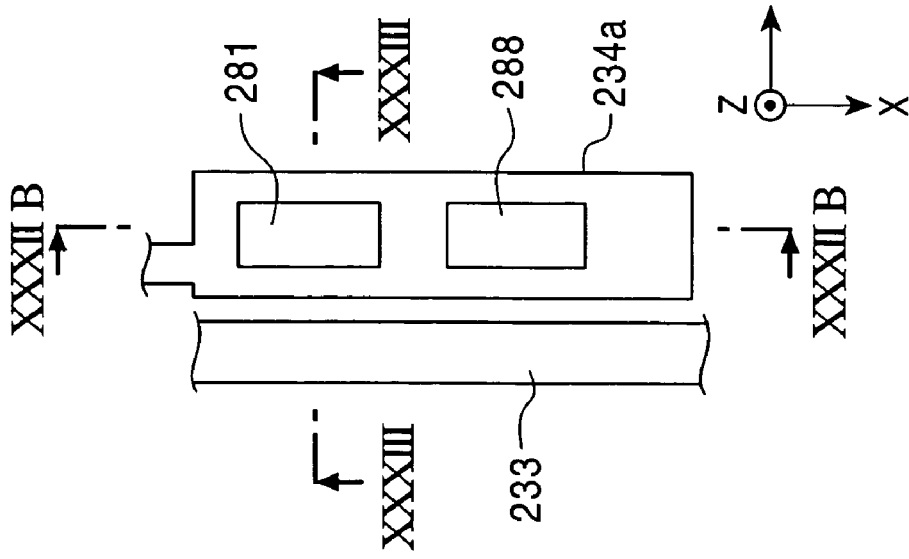

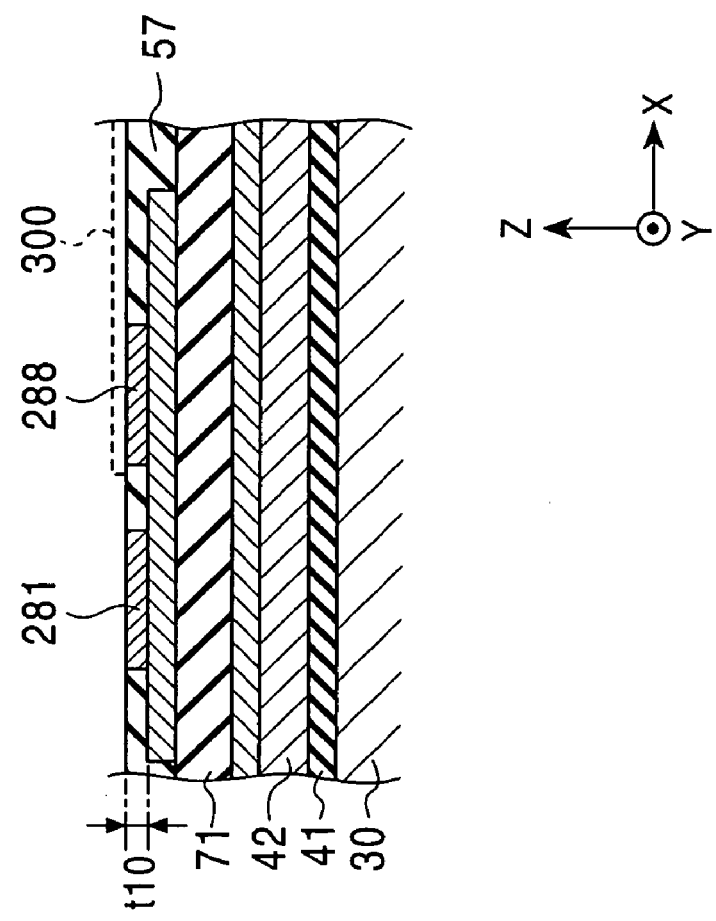
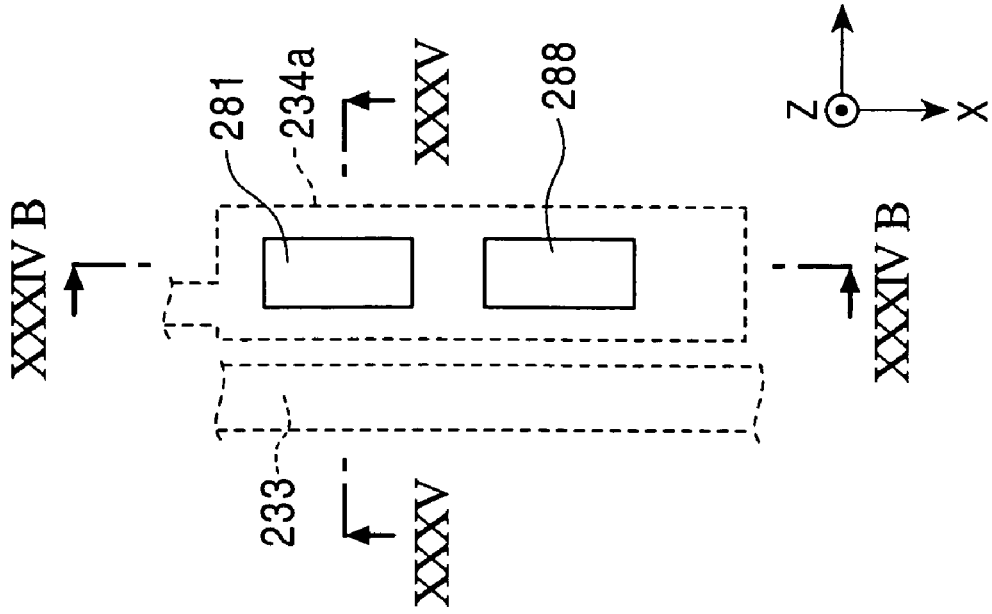

FIG. 35
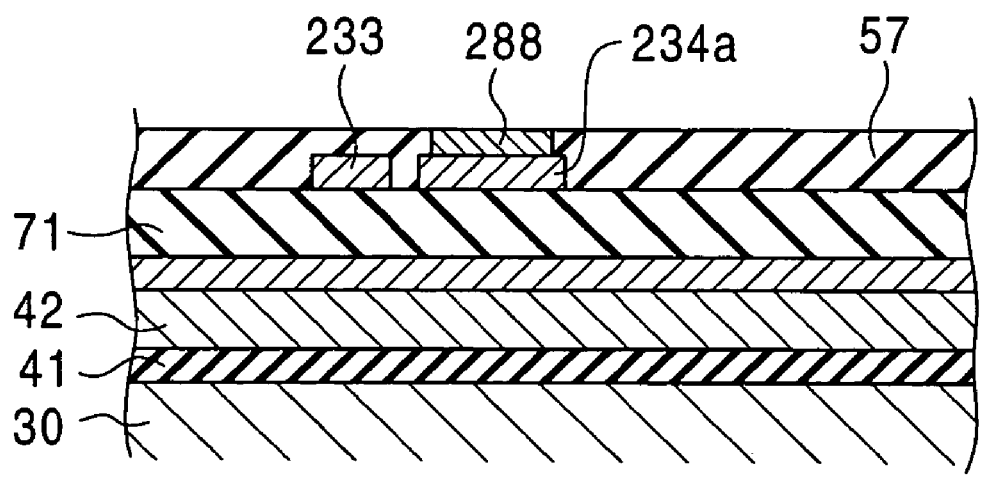
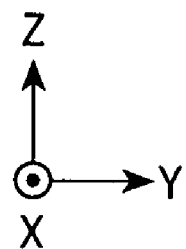

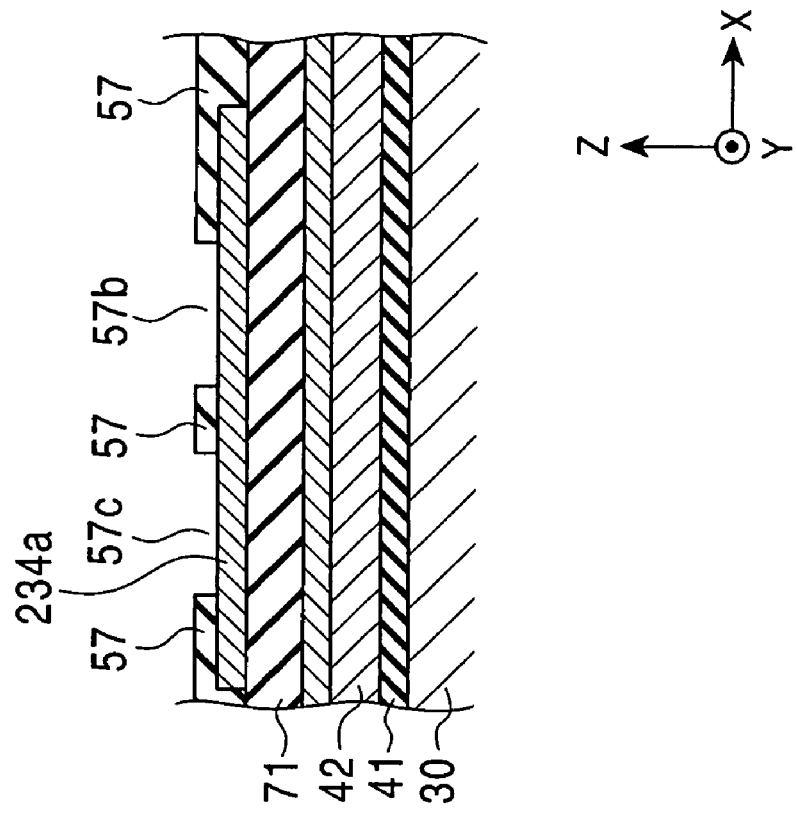
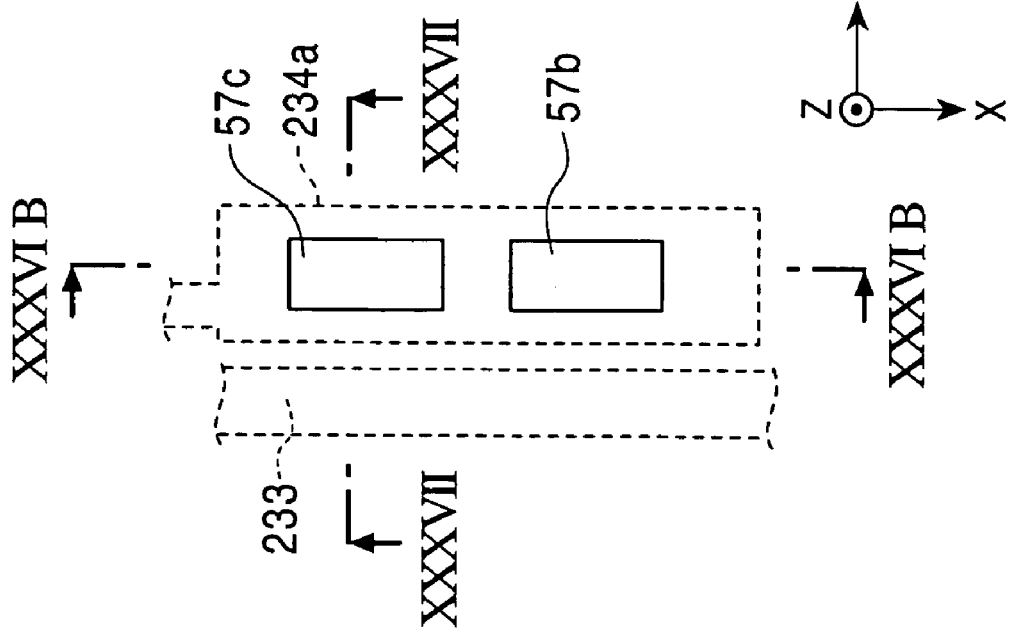

METHOD OF MANUFACTURING A THIN FILM STRUCTURE

This application claims the benefit of priority to Japanese Patent Application Nos. 2003-163088 and 2003-316950, herein incorporated by reference.

BACKGROUND OF THE INVENTION

1. Field of the Invention

The present invention relates to thin film structures in which a conductive protrusion is provided on a conductive layer and is surrounded by an insulating layer formed on the conductive layer, and more particularly, relates to a thin film structure having resistance against mechanical impact or the like and a manufacturing method thereof.

2. Description of the Related Art

FIG. 40 is a cross-sectional view of a related thin film structure. In this thin film structure, for example, a conductive layer 2 is formed on an insulating layer 1, the conductive layer 2 being connected to a lead layer extending from a coil layer of an inductive magnetic head or to a lead layer extending from an electrode layer of a magnetoresistive effect element. On the conductive layer 2, a protrusion (bump) 4 is formed with a metal film 3 interposed therebetween. Around the protrusion (bump) 4, an insulating layer 5 made of $Al_2O_3$ or $SiO_2$ is formed, and the upper surface of the protrusion (bump) 4 is exposed at the surface of the insulating layer 5. The metal layer 3 is a remaining part of a current-carrying layer which was used for supplying current for forming the protrusion 4 by plating.

The protrusion 4 has a base portion 4a connected to the metal film 3 and an upper portion 4b provided on this base portion 4a. A sidewall part of the upper portion 4b extends outward from a periphery of the base portion 4a to form an extending part 4c. On the upper surface of the protrusion 4, a metal pad 6 made of a metal material is formed.

FIGS. 41 to 45 are cross-sectional views for illustrating a manufacturing method of the related thin film structure.

First, in a step shown in FIG. 41, the conductive layer 2 is formed on the insulating layer 1 by plating. Next, over the conductive layer 2 to the insulating layer 1, a current-carrying layer 7 used for forming the protrusion 4 by plating is formed by sputtering. In addition, on the current-carrying layer 7, a resist layer R for forming the bump is provided, and an opening portion Ra is formed in the resist layer R at a position at which the protrusion 4 is to be formed. In this method, the current-carrying layer 7 is formed to extend in the right direction in the figure, and from an end portion thereof, current is to be supplied.

Next, in a step shown in FIG. 42, on the current-carrying layer 7 exposed through the opening portion Ra of the resist layer R, isotropic plating is performed using nickel (Ni), gold (Au), copper (Cu), or a conductive material containing Cu, thereby forming the protrusion 4. For example, a height H1 of the protrusion 4 is 40 μm.

After the protrusion 4 is formed, the resist layer R is removed, and as a result, the state shown in FIG. 43 can be obtained. Next, the current-carrying layer 7 around the protrusion 4 is removed by ion milling or the like. In this milling, a part of the current-carrying layer 7 located under the upper portion 4b of the protrusion 4 remains, and as a result, the metal film 3 shown in FIG. 44 is formed.

After the current-carrying layer 7 is removed, as shown in FIG. 45, on the conductive layer 2 and the protrusion 4, the insulating layer 5 is formed which is made of $Al_2O_3$ or $SiO_2$.

Next, in order to expose the protrusion 4 at the surface of the insulating layer 5, the insulating layer 5 is milled, for example, to a level indicated by the line A-A shown in the figure, and the metal pad 6 is then formed, thereby forming the thin film structure shown in FIG. 40.

In addition, in Japanese Unexamined Patent Application Publication No. 4-21919, a technique has been disclosed in which a wire density can be increased by disposing another lead conductor 28 under the protrusion 4. The thin film structures and the manufacturing methods thereof as described above have been disclosed in the following six patent documents, that is, Japanese Unexamined Patent Application Publication Nos. 11-100690 (p. 3, FIG. 1), 9-73608 (p. 3, FIG. 3), 2000-149221 (p. 3, FIG. 8), 58-179922 (pp. 1 and 2, FIGS. 2 and 3), 4-21919 (pp. 4 and 5, FIGS. 5 and 6), and 2003-123208 (pp. 4 and 5, FIGS. 1 to 8).

However, the related thin film structure described above has the following problems.

In the step shown in FIG. 43, when the resist layer R is removed, a space S is formed under the extending part 4c of the upper portion 4b of the protrusion 4. When the insulating layer 5 is formed in the step shown in FIG. 45, since the space S is present under the extending part 4c, the insulating layer 5 is not filled in the space S, and hence a void is formed. As described above, when the space S under the extending part 4c of the protrusion 4 remains as the void, the mechanical strength of the insulating layer 5 is decreased, and as a result, in the milling step shown in FIG. 45, a crack C indicated by a dotted line is liable to be formed in the insulating layer 5. When the crack C is formed in the insulating layer 5, corrosion resistance of the thin film structure is extremely degraded, and in addition, wire-breakage may occur in some cases.

In addition, in Japanese Unexamined Patent Application Publication No. 58-179922, the structure has been disclosed in which an overhang part (extending part) of a conductor (protrusion) is removed by milling (milling along chain lines E shown in FIG. 44) so that the space formed under the overhang part is eliminated, and in which an insulating layer is formed around the entire periphery of the conductor (protrusion). However, since the step of milling the conductor (protrusion) is additionally performed, the manufacturing process becomes complicated, and in addition, due to the decrease in volume of the conductor (protrusion), a problem may arise in that the electrical resistance is increased. Furthermore, the variation in volume of the conductor (protrusion) is increased, and as a result, the electrical resistance also varies.

In addition, according to the thin film structure disclosed in Japanese Unexamined Patent Application Publication No. 2063-123208, it is difficult to supply current for forming a lower pad 3A and an upper pad 3B by plating, and hence the structure described above must be further improved.

SUMMARY OF THE INVENTION

Accordingly, the present invention was made to solve the problems described above, and an object of the present invention is to provide a thin film structure comprising an insulating layer and a protrusion which has an upper portion and a base portion and a manufacturing method thereof, in which the upper portion has an extending part extending outward from the periphery of the base portion and in which the insulating layer is also present under the extending part.

In accordance with one aspect of the present invention, there is provided a thin film structure comprising: a conductive protrusion provided on a conductive layer; and an insulating layer provided on the conductive layer and surrounding the periphery of the protrusion. In the thin film structure described above, the protrusion has a base portion connected to the conductive layer and an upper portion provided on the base portion, a cross-sectional area of the upper portion perpendicular to a thickness direction is gradually decreased along a direction toward an upper side of the upper portion, the upper portion has a sidewall part extending outward from a periphery of the base portion to form an extending part, and the insulating layer is also present all around the periphery of the base portion under the extending part.

In the present invention, since the insulating layer is also present under the extending part of the protrusion, the mechanical strength around the protrusion is improved. Hence, cracking is unlikely to occur in the insulating layer, corrosion resistance of the thin film structure is improved, and in addition, the probability of wire breakage can be reduced.

In addition, in the upper portion of the protrusion described above, since the sidewall part extends outward from the periphery of the base portion to form the extending part, the volume of the protrusion is maintained, and hence increase in electrical resistance can be prevented.

It is preferable when the insulating layer is in contact with the periphery of the base portion described above. In this case, since the insulating layer is present in the entire region under the extending part of the protrusion, the mechanical strength around the protrusion is further improved.

In addition, when another lead layer is provided at a side of the conductive layer and under the extending part of the protrusion, a higher wire density can be realized.

According to the present invention, since the insulating layer is also present all around the periphery of the base portion under the extending part, even when the width dimension of the base portion is decreased for providing said another lead layer at the side of the conductive layer, the mechanical strength around the protrusion can be maintained.

In this case, said another lead layer is connected, for example, to another thin film structure.

In accordance with another aspect of the present invention, there is provided a method for manufacturing a thin film structure, comprising the steps of: (a) forming a conductive base portion on a conductive layer; (b) forming a current-carrying portion on the conductive layer, followed by the formation of an insulating layer all around the periphery of the conductive layer and all around the periphery of the current-carrying portion; (c) exposing the upper surface of the base portion at a surface of the insulating layer; (d) exposing the upper surface of the current-carrying portion at a surface of the insulating layer; (e) forming an upper portion on the base portion by free plating growth using a plating material with current supplied from the upper surface of the current-carrying portion, the upper portion having a cross-sectional area perpendicular to a thickness direction which is gradually decreased along a direction toward an upper side of the upper portion and having a sidewall part which extends outward from the periphery of the base portion to form an extending part; and (f) forming an insulating layer around the upper portion.

According to the present invention, in said step (e), by supplying current from the upper surface of the current-carrying portion through the conductive layer, the upper portion is formed on the base portion by plating. Hence, the current-carrying portion can be formed in the vicinity of the base portion described above so as to have a minimal size, and this current-carrying portion is not necessary to be removed later. Accordingly, after the upper portion is formed by plating, the insulating layer formed all around the periphery of the base portion is also not necessary to be removed, and hence a thin film structure having the insulating layer present also under the extending part of the protrusion can be formed.

In the thin film structure formed in accordance with the manufacturing method of the present invention, the mechanical strength around the protrusion is improved, cracking is unlikely to occur in the insulating layer, and the corrosion resistance is improved.

In addition, according to the present invention, when the upper portion is formed, since the free plating growth is only performed, the variation in volume of the protrusion is reduced, and hence the variation in electrical resistance can be reduced.

In addition, after the upper surface of the current-carrying portion is exposed at the surface of the insulating layer in said step (d), a lead layer connected to the upper surface of the current-carrying portion is preferably formed.

In the present invention, the free plating growth means plating growth performed while a side surface and an upper surface of a material which is formed by plating are not controlled.

In accordance with another aspect of the present invention, there is provided a method for manufacturing a thin film structure, comprising the steps of: (g) forming an insulating layer on a conductive layer; (h) forming at least two openings in the insulating layer to expose the conductive layer; (i) forming a base portion and an upper portion provided thereon by free plating growth using a plating material with current supplied from the conductive layer exposed through one of the openings which is used as a current-carrying opening, the base portion being connected to the conductive layer exposed through another opening used as a plating-forming opening, the upper portion having a cross-sectional area perpendicular to a thickness direction which is gradually decreased along a direction toward an upper side of the upper portion and having a sidewall part which extends outward from a periphery of the base portion to form an extending part; and (j) forming an insulating layer around the upper portion.

According to the present invention, in said step (i), the base portion and the upper portion are formed in that order on the conductive layer exposed through the plating-forming opening by supplying current from the current-carrying opening. When the current-carrying opening is formed at a position close to the plating-forming opening, the conductive layer in the vicinity of this current-carrying opening is not necessary to be removed later. Accordingly, after the upper portion is formed by plating, the insulating layer formed all around the periphery of the base portion is also not necessary to be removed, and as a result, a thin film structure can be formed having the insulating layer also present under the extending part of the protrusion.

In the thin film structure formed in accordance with the manufacturing method of the present invention, the mechanical strength around the protrusion is improved, cracking is unlikely to occur in the insulating layer, and the corrosion resistance is improved.

In addition, according to the present invention, when the upper portion is formed, since the free plating growth is only performed, the variation in volume of the protrusion is reduced, and as a result, the variation in electrical resistance can be reduced.

In addition, after said step (h), a lead layer is preferably formed which is connected to the conductive layer exposed through one of the openings described above.

In the present invention, the free plating growth means plating growth performed while a side surface and an upper surface of a material which is formed by plating are not controlled.

In addition, the method for manufacturing a thin film structure, described above, may further comprise, before said step (a) and/or said step (g), a step (k) and/or a step (l), respectively, of forming another lead layer at a side of the conductive layer, wherein, in said step (e) and/or said step (i), the extending part of the upper portion is formed to overlap said another lead layer, thereby placing said another lead layer at the side of the conductive layer and under the extending part of the protrusion. As a result, a thin film structure capable of realizing a higher wire density can be formed.

Furthermore, since the insulating layer described above is also present all around the periphery of the base portion under the extending part, even when the width dimension of the base portion is decreased for providing said another lead layer at the side of the conductive layer, the mechanical strength around the protrusion can be maintained.

According to the present invention, in said step (k) and/or said step (l), the conductive layer and said another lead layer are preferably formed at the same time.

As has thus been described above, according to the present invention, since the insulating layer is also present under the extending part of the protrusion, the mechanical strength around the protrusion is improved. Hence, cracking is unlikely to occur in the insulating layer, the corrosion resistance of the thin film structure is improved, and in addition, the wire breakage can be prevented.

In addition, in the upper portion of the protrusion, since the sidewall part extends outward from the periphery of the base portion to form the extending part, the volume of the protrusion is maintained, and hence the increase in electrical resistance can be prevented.

BRIEF DESCRIPTION OF THE DRAWINGS

FIGS. 10A and 10B are a plan view and a cross-sectional view, respectively, for illustrating a step of manufacturing the conductive connection structure (thin film structure) shown in FIGS. 3 and 4;

FIG. 16 is a cross-sectional view for illustrating a step of manufacturing the conductive connection structure (thin film structure) shown in FIGS. 3 and 4;

FIGS. 19A and 19B are a plan view and a cross-sectional view, respectively, for illustrating a step of manufacturing the conductive connection structure (thin film structure) shown in FIGS. 5 and 6;

FIGS. 21A and 21B are a plan view and a cross-sectional view, respectively, for illustrating a step of manufacturing the conductive connection structure (thin film structure) shown in FIGS. 5 and 6;

FIGS. 22A and 22B are a plan view and a cross-sectional view, respectively, for illustrating a step of manufacturing the conductive connection structure (thin film structure) shown in FIGS. 5 and 6;

FIGS. 25A and 25B are a plan view and a cross-sectional view, respectively, for illustrating a step of manufacturing the conductive connection structure (thin film structure) shown in FIGS. 5 and 6;

FIGS. 32A and 32B are a plan view and a cross-sectional view, respectively, for illustrating a step of manufacturing the conductive connection structure (thin film structure) shown in FIGS. 27 and 28;

FIGS. 34A and 34B are a plan view and a cross-sectional view, respectively, for illustrating a step of manufacturing the conductive connection structure (thin film structure) shown in FIGS. 27 and 28;

FIG. 35 is a cross-sectional view for illustrating a step of manufacturing the conductive connection structure (thin film structure) shown in FIGS. 27 and 28;

FIGS. 36A and 36B are a plan view and a cross-sectional view, respectively, for illustrating a step of manufacturing the conductive connection structure (thin film structure) shown in FIGS. 29 and 30;

DESCRIPTION OF THE PREFERRED EMBODIMENTS

Figure 1:
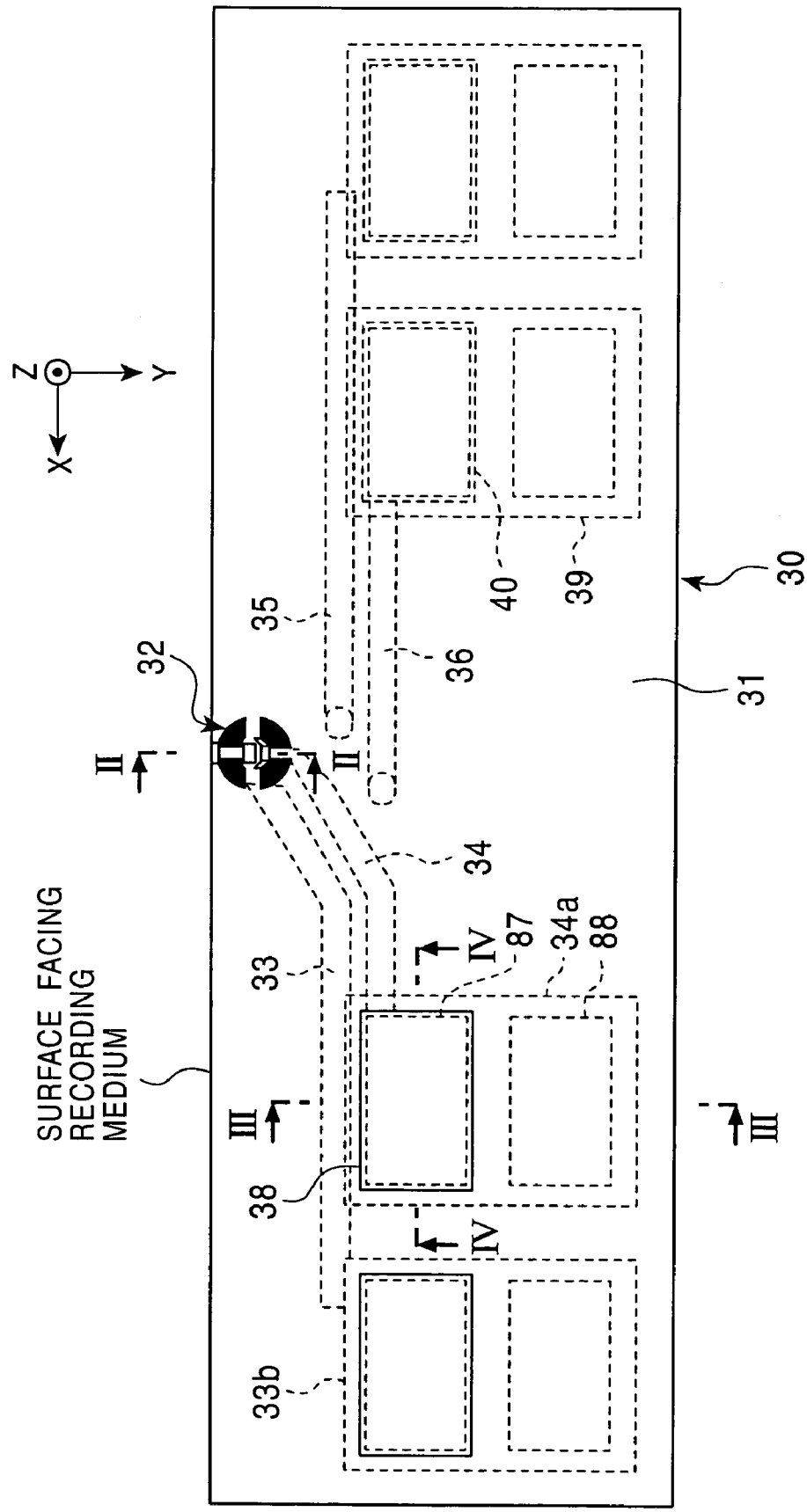
FIG. 1 is a partial plan view of an end surface at a trailing side of a slider provided with a magnetic head, in which a thin film structure of the present invention is used as a lead line for electrode connection.

FIG. 1 is a partial plan view showing the structure of an end surface 31 of a slider 30 at a trailing side provided with a magnetic head, the slider using a thin film structure of the present invention as a lead line for electrode connection. In the figure, the upper side of the slider 30 shown in FIG. 1 is a surface facing a recording medium.

The slider 30 shown in FIG. 1 is formed of a ceramic material such as alumina-titanium carbide ($Al_2O_3$—TiC), and on the end surface 31 at the trailing side thereof, a thin film magnetic head 32 is provided at the side of the surface facing a recording medium.

The thin film magnetic head 32 is a so-called composite thin film magnetic head composed of a reproducing MR head and a recording inductive head laminated to each other.

As shown in FIG. 1, on the end surface 31 at the trailing side of the slider 30, four lead layers 33 to 36 are formed by plating. The lead layers 33 and 34 are coil lead layers electrically connected to coil layers forming the inductive head. As shown in FIG. 1, the second coil lead layer 34 is electrically connected at a terminal portion (exterior connection portion) thereof to an exterior terminal 38 with a protrusion 87 provided therebetween, the protrusion 87 being formed directly or indirectly on the second coil lead 34 by plating. As is the second coil lead layer 34, the first coil lead layer 33 is electrically connected at a terminal portion (exterior connection portion) thereof to an exterior terminal with a protrusion provided therebetween.

The lead layer 35 and 36 shown in FIG. 1 are electrode lead layers for supplying a sense current to a magnetoresistive effect element of an MR head, and the electrode lead layer 36 is electrically connected at a terminal portion (exterior connection portion) thereof to an exterior terminal 40 with a protrusion 39 provided therebetween, the protrusion 39 being formed directly or indirectly on the terminal portion by plating. In addition, as is the electrode lead layer 36, the electrode lead layer 35 is electrically connected at a terminal portion (exterior connection portion) thereof to an exterior terminal with a protrusion (bump) provided therebetween.

Figure 2:
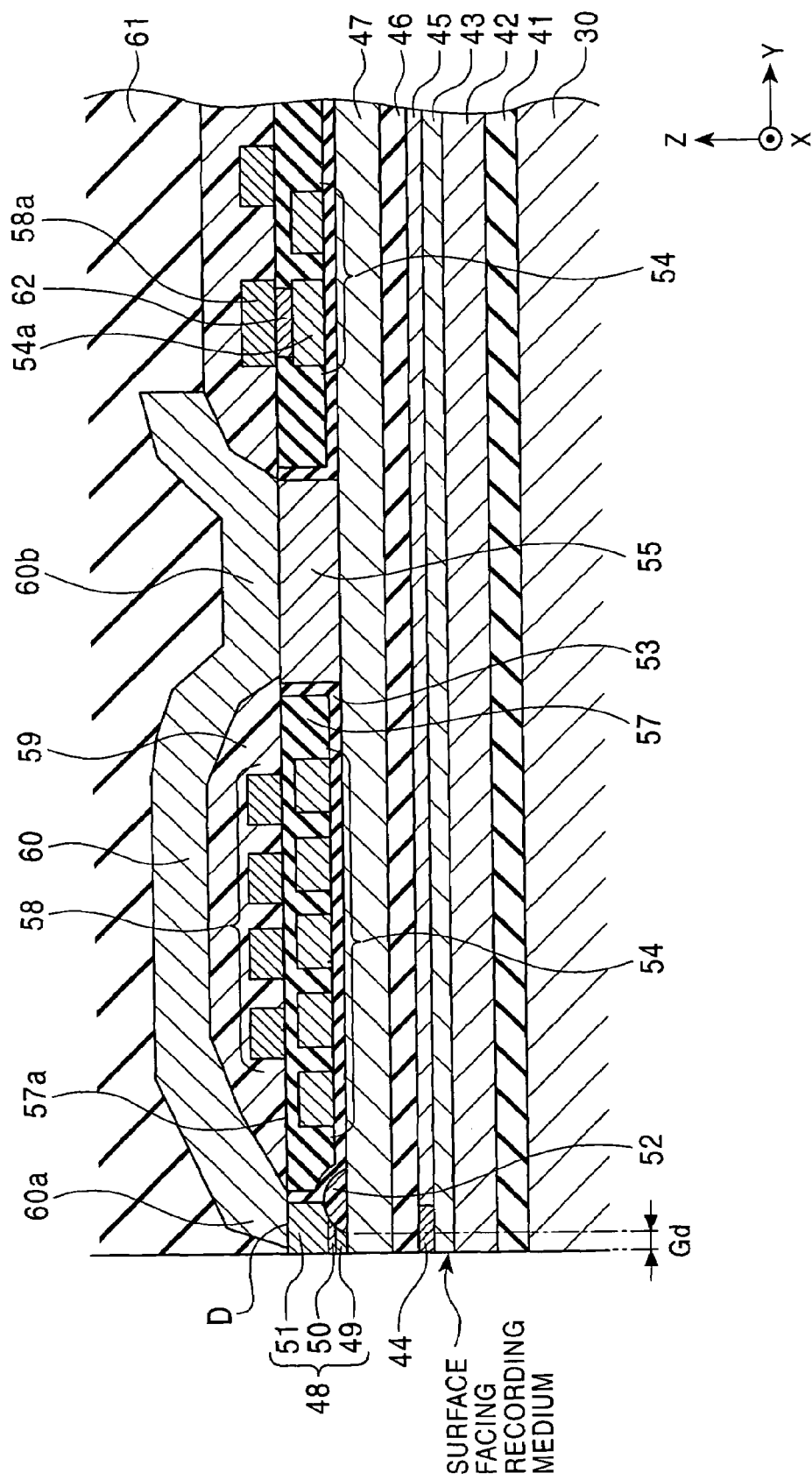
FIG. 2 is a partial cross-sectional view of the thin film magnetic head taken along the line II-II shown in FIG. 1.

FIG. 2 is a partial vertical cross-sectional view of the thin film magnetic head 32 taken along the line II-II shown in FIG. 1.

First, individual layers forming the thin film magnetic head 32 will be described. As shown in FIG. 2, on the slider 30, an alumina undercoat film 41 is formed, and on this alumina under coat film 41, a lower shield layer 42 made of a magnetic material such as permalloy (NiFe alloy) is formed.

As shown in FIG. 2, on the lower shield layer 42, a magnetoresistive effect element 44 is provided with a lower gap layer 43 made of alumina or the like interposed therebetween so as to be exposed at the surface facing a recording medium. The magnetoresistive effect element 44 is a GMR element or an AMR represented by a spin valve film, and by using the change in resistance of the magnetoresistive effect element 44 caused by influence of an exterior magnetic field thereon, magnetic signals recorded on a recording medium is reproduced.

Electrode layers 45 extending from the two sides located in the track width direction (X direction in the figure) to the rear side in the height direction (Y direction in the figure) are connected to the magnetoresistive effect element 44.

As shown in FIG. 2, an upper shield layer (lower core layer) 47 is provided on the electrode layers 45 and the magnetoresistive effect element 44 with an upper gap layer 46 made of alumina or the like interposed therebetween. The upper shield layer 47 is formed of a magnetic material such as permalloy (NiFe alloy). The layers from the lower shield layer 42 to the upper shield layer (lower core layer) 47 collectively form a reproducing MR head.

In this embodiment, the upper shield layer 47 also serves as a lower core layer of the inductive head. In addition, the upper shield layer and the lower core layer may be separately formed. In this case, an insulating layer is provided between the upper shield layer and the lower core layer.

As shown in FIG. 2, a magnetic portion 48 having a predetermined length from the surface facing a recording medium in the height direction is provided on the lower core layer 47. The magnetic portion 48 is formed so that the width in the track width direction (X direction in the figure) is a track width Tw. For example, the track width Tw is 0.5 μm or less.

In the embodiment shown in FIG. 2, the magnetic portion 48 has a three-layered structure composed of a lower magnetic layer 49, a gap layer 50, and an upper magnetic layer 51. Hereinafter, the magnetic layers 49 and 51, and the gap layer 50 will be described.

As shown in FIG. 2, on the lower core layer 47, the lower magnetic layer 49 used as the lowest layer of the magnetic portion 48 is formed by plating. The lower magnetic layer 49 is magnetically connected to the lower core layer 47 and may be or may not be formed of the same material as that for the lower core layer 47. In addition, the lower magnetic layer 49 may have a monolayer structure or a multilayer structure.

In addition, as shown in FIG. 2, on the lower magnetic layer 49, the non-magnetic gap layer 50 is provided.

The gap layer 50 is formed of a non-magnetic metal layer and is preferably formed on the lower magnetic layer 49 by plating. As the non-magnetic material, at least one selected from the group consisting of NiP, NIReP, NiPd, NiW, NiMo, NiRh, NiRe, Au, Pt, Rh, Pd, Ru, and Cr is preferably used. The gap layer 50 may have a monolayer structure or a multilayer structure.

Next, on the gap layer 50, the upper magnetic layer 51 is formed by plating which is to be magnetically connected to an upper core layer 60 described later. The upper magnetic layer 51 may be or may not be formed of the same material as that for the upper core layer 60 and, in addition, may have a monolayer structure or a multilayer structure.

When the gap layer 50 is formed of a non-magnetic metal material as described above, the lower magnetic layer 49, the gap layer 50, and the upper magnetic layer 51 can be successively formed by plating.

In addition, as shown in FIG. 2, a Gd determining insulating layer 52 is formed on the lower core layer 47 at a predetermined distance from the surface facing a recording medium in the height direction (Y direction in the figure).

Next, as shown in FIG. 2, on the lower core layer 47 at the height direction side further from the magnetic portion 48, a coil insulating underlayer 53 made of $Al_2O_3$ or $SiO_2$ is formed. As shown in FIG. 2, on the coil insulating underlayer 53, a first coil layer 54 made of a conductive material, such as Cu, having a low electrical resistance is formed by plating.

As shown in FIG. 2, in the first coil layer 54, a coiling center 54a thereof is located at a position further from a back gap layer 55, which is magnetically connected to the lower core layer 47, in the height direction (Y direction in the figure), and a spiral pattern is formed around the coiling center 54a.

As shown in FIG. 2, the upper surface of the first coil layer 54 is formed at a position lower than a reference plane D which is a plane formed between the upper magnetic layer 51 and the upper core layer 60.

In addition, in this embodiment, a coil insulating layer 57 made of an insulating material is filled between conductive parts of the first coil layer 54. As shown in FIG. 2, an upper surface 57a of the coil insulating layer 57 is planarized to be flush with the reference plane D.

In addition, on the upper surface 57a of the coil insulating layer 57, a second coil layer 58 having a spiral pattern is formed by plating. As is the first coil layer 54, the second coil layer 58 is also formed of a conductive material such as Cu having a low electrical resistance. In the second coil layer 58, the coiling direction is opposite to that of the first coil layer 54.

The second coil layer 58 is covered with an insulating layer 59 formed of an organic insulating material such as a resist material. In addition, on the insulating layer 59, the upper core layer 60 having a pattern is formed by frame plating or the like. A front portion 60a of the upper core layer 60 is magnetically connected to the upper magnetic layer 51, and a back portion 60b of the upper core layer 60 is magnetically connected to the back gap layer 55.

Furthermore, the upper core layer 60 is covered with a protective layer 61 made of alumina or the like.

Next, a conductive connection structure according to an embodiment of a thin film structure of the present invention will be described which is formed on an exterior connection portion 34a of the second coil lead layer 34 which is integrally formed with the first coil layer 54.

Figure 3:
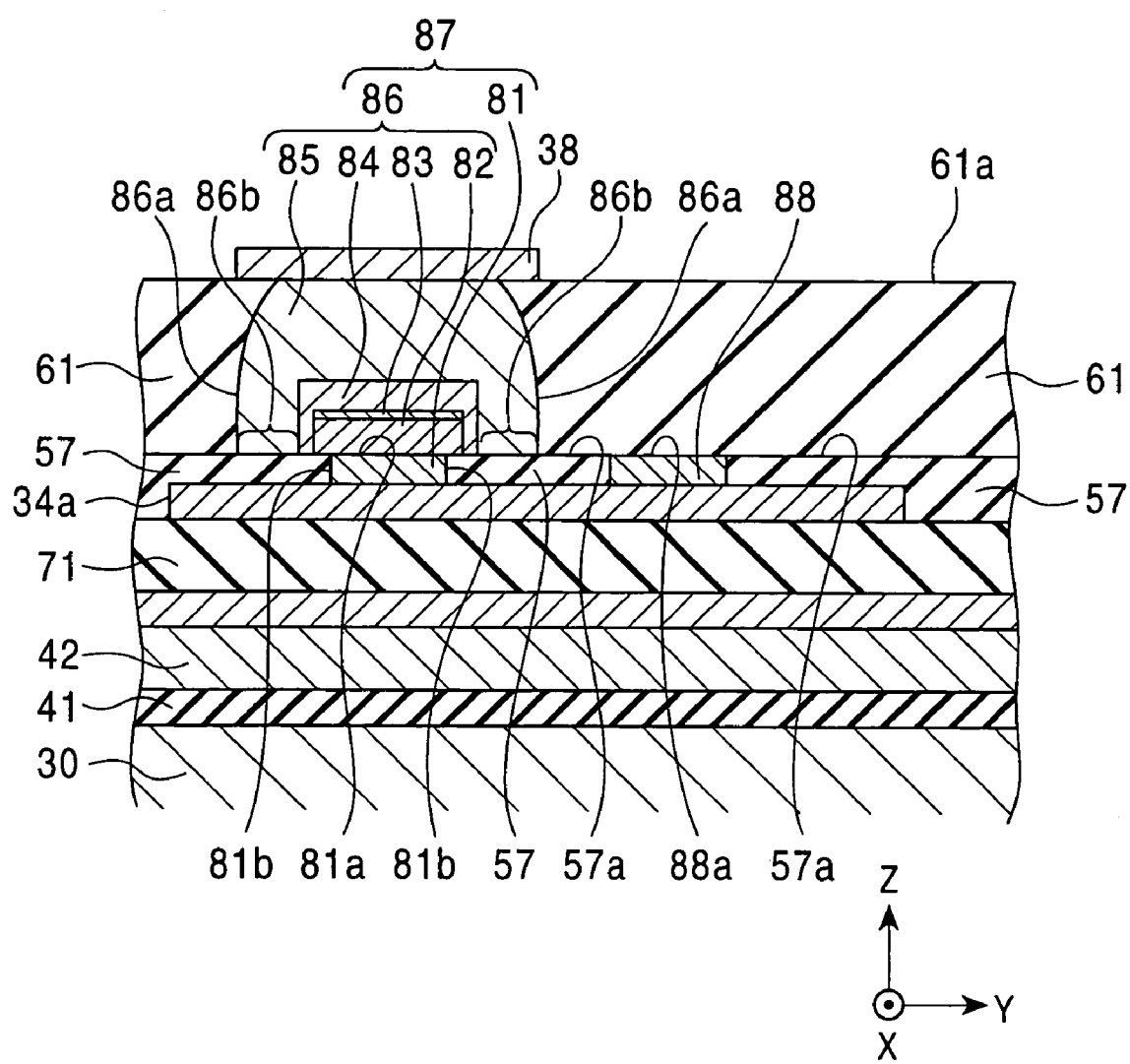
FIG. 3 is a partial cross-sectional view of a thin film structure taken along the line III-III shown in FIG. 1 of an embodiment according to the present invention.

FIG. 3 is a partial cross-sectional view of a thin film structure taken along the line III-III shown in FIG. 1 according to an embodiment of the present invention.

The exterior connection portion 34a of the second coil lead layer 34 shown in FIG. 3 is a conductive layer of the present invention and is formed on an insulating layer 71 which is formed around the lower core layer 47. On this exterior connection portion 34a, the protrusion (bump) 87 made of a conductive material is provided.

The protrusion (bump) 87 has a base portion 81 formed on the exterior connection portion 34a by plating so as to penetrate the coil insulating layer 57 and an upper portion 86 provided on the base portion 81. The upper portion 86 has a multilayer structure formed of a first layer 82, a second layer 83, a third layer 84, and a fourth layer 85 in that order from the center. In this structure, the first layer 82 is formed of the same material as that for the second coil layer 58, the second layer 83 is formed of the same material as that for a plating underlayer for the upper core layer 60, the third layer 84 is formed of the same material as that for the upper core layer 60, and the fourth layer 85 is formed of a material, such as Ni, Cu, or Au, having a small electrical resistance. However, the upper portion 86 may have a monolayer structure composed of a material, such as Ni, Cu, or Au, having a small electrical resistance.

The base portion 81 is formed of the same material as that for a first contact portion 62. An upper surface 81a of the base portion 81 is formed to be flush with the upper surface 57a of the coil insulating layer 57.

Around the upper portion 86, the protective layer 61 is formed, and the upper portion 86 penetrates the protective layer 61. The upper portion 86 is formed to be exposed at an upper surface 61a of the protective layer 61 and is electrically connected to the exterior terminal 38 formed on the protective layer 61.

In addition, on the exterior connection portion 34a, a metal layer 88 penetrating the coil insulating layer 57 is provided. This metal layer 88 functions as a current-carrying path which allows current to pass therethrough for forming the upper portion 86 by plating. An upper surface 88a of the metal layer 88 is formed to be flush with the upper surface 57a of the coil insulating layer 57.

In FIG. 3, the conductive connection structure on the exterior connection portion 34a of the second coil lead layer 34 is described, and a conductive connection structure on an exterior connection portion 33b of the first coil lead layer 33 shown in FIG. 1 is the same as that shown in FIG. 3. That is, on the first coil lead layer 33, a protrusion composed of a base portion and an upper portion is formed by plating, and on this protrusion, the exterior terminal 38 is formed.

In addition, conductive connection structures on the terminal portions (exterior connection portion) of the lead layers 35 and 36 shown in FIG. 1, which are the electrode lead layers for supplying a sense current to the magnetoresistive effect element of the MR head, can be formed to have the same structure as that shown in FIG. 3.

A cross-sectional area (plane parallel to the X-Y plane) of the upper portion 86 perpendicular to the thickness direction (Z direction in the figure) is gradually decreased along the direction toward the upper side (Z direction in the figure) of the upper portion 86. In addition, in the upper portion 86, a sidewall part 86a has an extending part 86b extending outward from a periphery 81b of the base portion 81, and the coil insulating layer (insulating layer) 57 is also present under the extending part 86b.

The coil insulating layer (insulating layer) 57 is present all around the periphery of the base portion 81 under the extending part 86b.

Figure 4:
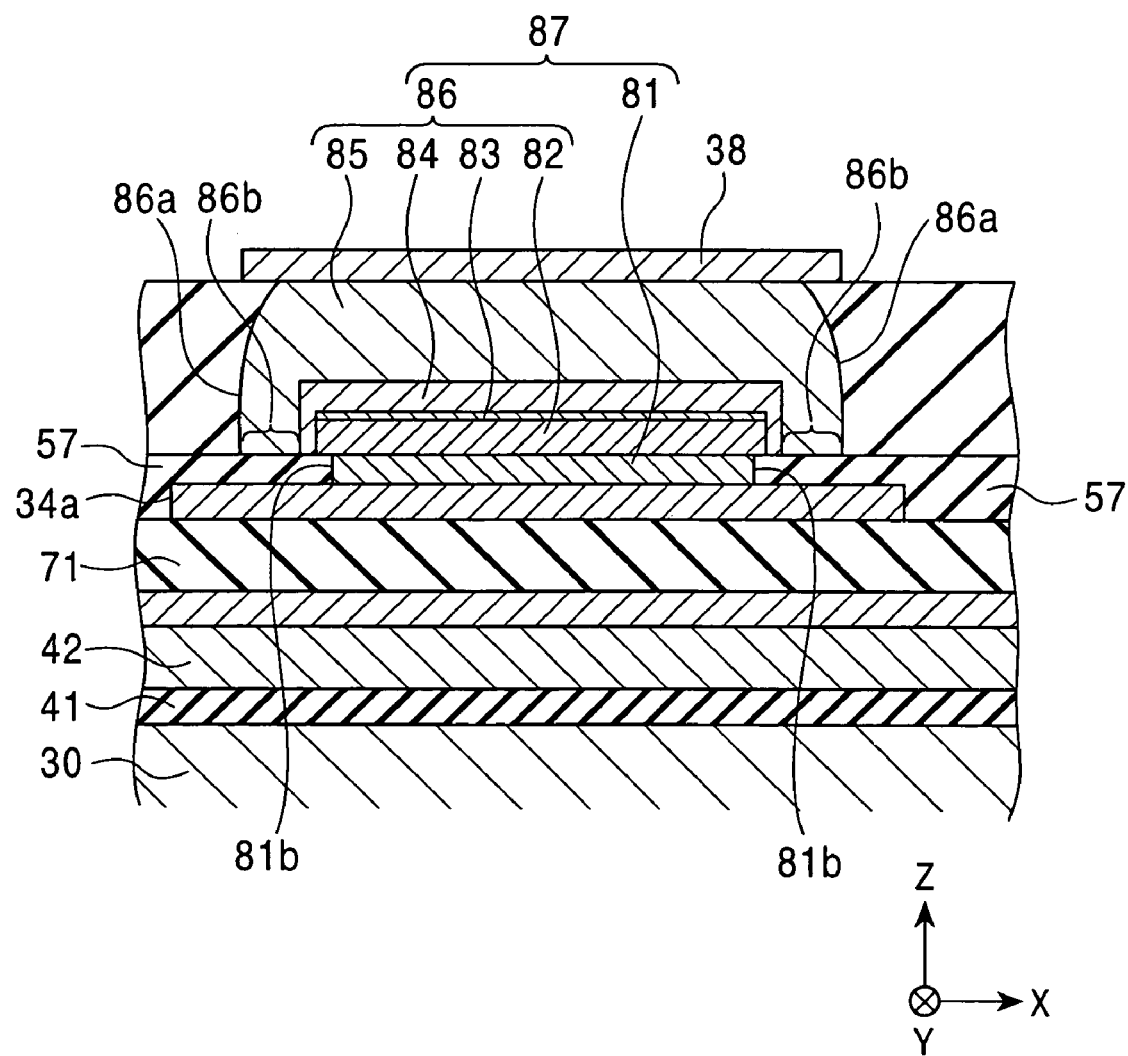
FIG. 4 is a partial cross-sectional view of the thin film structure taken along the line IV-IV shown in FIG. 1 of the embodiment according to the present invention.

FIG. 4 is a partial cross-sectional view of the thin film structure of the embodiment according to the present invention taken along the line IV-IV shown in FIG. 1.

As also shown in FIG. 4, in the upper portion 86, the sidewall part 86a has the extending part 86b extending outward from the periphery 81b of the base portion 81, and the coil insulating layer (insulating layer) 57 is also present under the extending part 86b.

In the present invention, since the coil insulating layer (insulating layer) 57 is also present under the extending part 86b of the protrusion 87, the mechanical strength around the protrusion 87 is increased. Accordingly, cracking is not likely to occur in the protective layer (insulating layer) 61, and the corrosion resistance of the conduction connection structure is improved.

In addition, in the upper portion 86 of the protrusion 87, since the sidewall part 86a has the extending part 86b extending outward from the periphery 81b of the base portion 81, the volume of the protrusion 87 is maintained, and as a result, the increase in electrical resistance can be prevented.

In this embodiment, the coil insulating layer (insulating layer) 57 is in contact with the periphery 81b of the base portion 81. That is, in the entire region under the extending part 86b of the protrusion 87, the coil insulating layer (insulating layer) 57 is present, and hence the mechanical strength around the protrusion 87 is improved.

Figure 5:
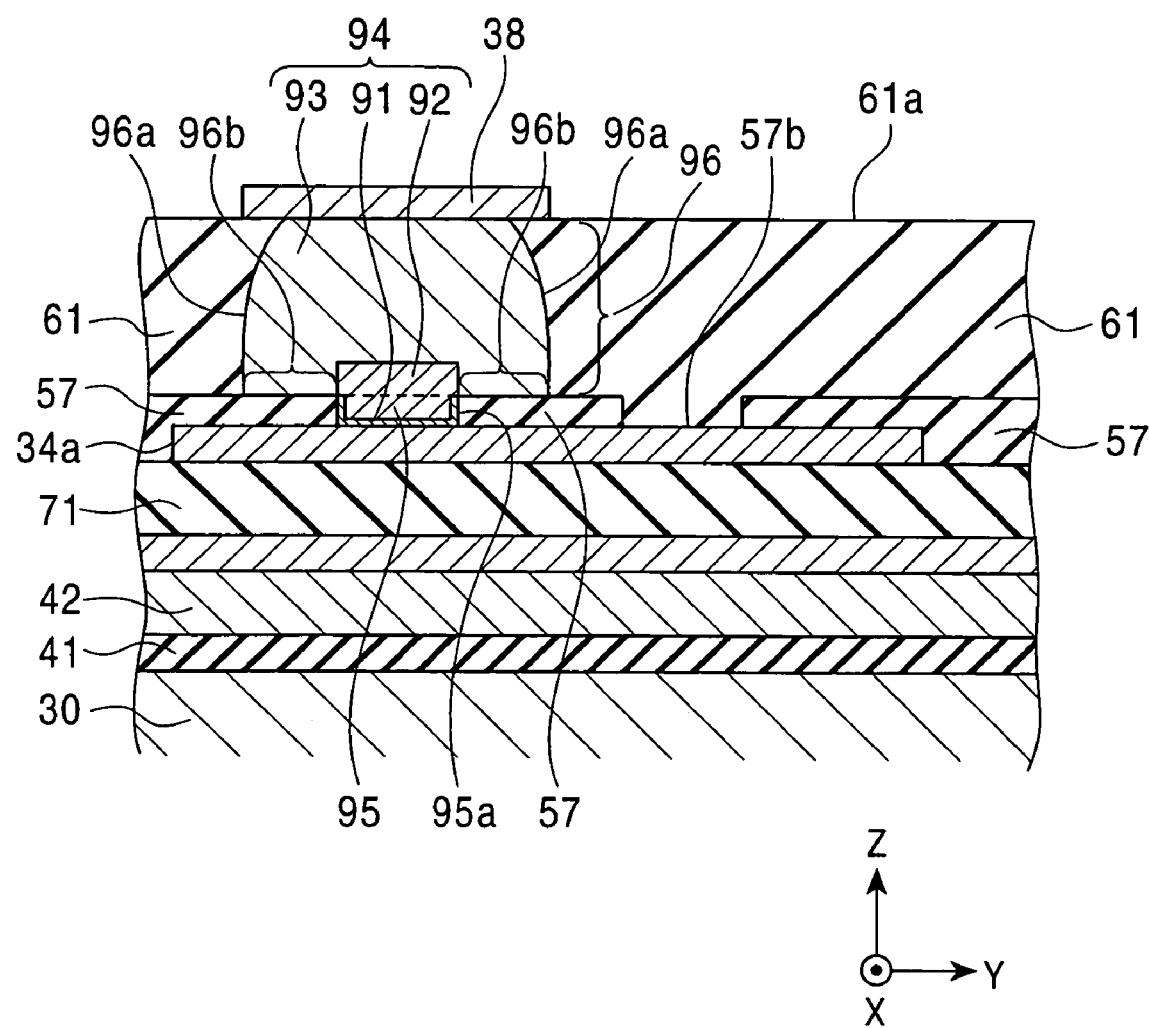
FIG. 5 is a partial cross-sectional view of a thin film structure of another embodiment according to the present invention.

FIG. 5 is a partial cross-sectional view of a thin film structure of another embodiment according to the present invention.

The exterior connection portion 34a of the second coil lead layer 34 shown in FIG. 5 is a conductive layer of the present invention and is formed on the insulating layer 71 formed around the lower core layer 47. On the exterior connection portion 34a, a protrusion (bump) 94 made of a conductive material is provided.

The protrusion (bump) 94 has a plating underlayer 91 formed on the exterior connection portion 34a by sputtering, a first layer 92 penetrating the coil insulating layer 57, and a second layer 93 provided on the first layer 92. The first layer 92 is formed of the same material as that for the upper core layer 60, and the second layer 93 is formed of a material, such as Ni, Cu, or Au, having a small electrical resistance. However, the formation of the first layer 92 may be omitted, and the protrusion (bump) 94 may have a monolayer structure composed of a material, such as Ni, Cu, or Au, having a small electrical resistance.

In the protrusion (bump) 94 shown in FIG. 5, a part of the first layer 92 surrounded by the coil insulating layer 57 is a base portion 95 and an upper part on the base portion 95 is an upper portion 96.

Around the upper portion 96, the protective layer 61 is formed, and the upper portion 96 penetrates the protective layer 61. The upper portion 96 is formed to be exposed at the upper surface 61a of the protective layer 61 and is electrically connected to the exterior terminal 38 formed on the protective layer 61.

In addition, in the coil insulating layer 57, an opening 57b is formed. When the upper portion 96 is formed by plating, current is supplied from the exterior connection portion 34a exposed through the opening 57b.

A conductive connection structure shown in FIG. 5 can also be used as the conductive connection structure on the exterior connection portion 34a of the second coil lead layer 34 and that on the exterior connection portion 33b of the first coil lead layer 33.

In addition, the conductive connection structures on the terminal portions (exterior connection portions) of the lead layers 35 and 36 shown in FIG. 1, which are the electrode lead layers for supplying a sense current to the magnetoresistive effect element of the MR head, can be formed so as to have the same structure as that shown in FIG. 5.

A cross-sectional area (plane parallel to the X-Y plane) of the upper portion 96 perpendicular to the thickness direction (Z direction in the figure) is gradually decreased along the direction toward the upper side (Z direction in the figure) of the upper portion 96. In addition, in the upper portion 96, a sidewall part 96a has an extending part 96b extending outward from a periphery 95a of the base portion 95, and the coil insulating layer (insulating layer) 57 is also present under the extending part 96b.

The coil insulating layer (insulating layer) 57 is present all around the periphery of the base portion 95 under the extending part.

Figure 6:
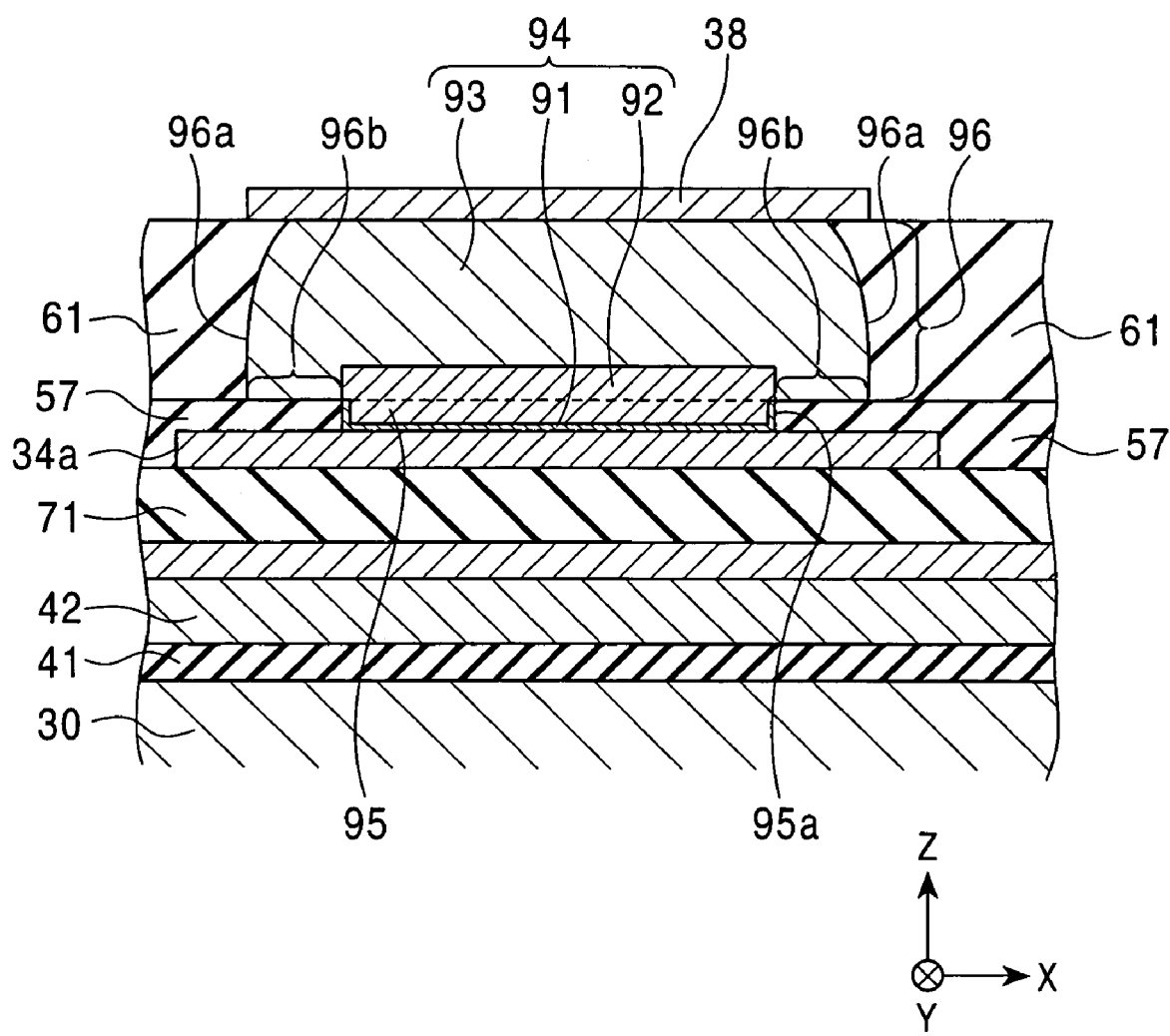
FIG. 6 is a cross-sectional view of a conductive connection structure (thin film structure) shown in FIG. 5 in parallel with an X-Z plane.

FIG. 6 is a cross-sectional view of the conductive connection structure (thin film structure) shown in FIG. 5 in parallel with the X-Z plane.

In FIG. 6, in the upper portion 96, the sidewall part 96a has the extending part 96b extending outward from the periphery 95a of the base portion 95, and the coil insulating layer (insulating layer) 57 is also present under the extending part 96b.

Since the coil insulating layer (insulating layer) 57 is also present under the extending part 96b of the protrusion 94, the mechanical strength around the protrusion 94 is improved. Accordingly, cracking is not likely to occur in the protective layer (insulating layer) 61, and the corrosion resistance of the conductive connection structure can be improved.

In addition, in the upper portion 96 of the protrusion 94, since the sidewall part 96*a* has the extending part 96*b* extending outward from the periphery 95*a* of the base portion 95, the volume of the protrusion 94 is maintained, and the increase in electrical resistance can be prevented.

In the embodiment described above, the coil insulating layer (insulating layer) 57 is in contact with the periphery 95*a* of the base portion 95. That is, in the entire region under the extending part 96*b* of the protrusion 94, the coil insulating layer (insulating layer) 57 is present, and as a result, the mechanical strength around the protrusion 94 is improved.

A method for manufacturing the conductive connection structure (thin film structure) shown in FIGS. 3 and 4 will be described.

FIGS. 7A to 17B are schematic views for illustrating steps of manufacturing the conductive connection structure (thin film structure) shown in FIGS. 3 and 4. In the figures mentioned above, for example, FIG. 7A is a plan view of the conductive connection structure (thin film structure) when viewed from above, and FIG. 7B is a cross-sectional view of the conductive connection structure taken on the line VIIB-VIIB shown in FIG. 7A when viewed along the arrow.

The formation of the conductive connection structure (thin film structure) shown in FIGS. 3 and 4 is simultaneously performed with the formation of the inductive head shown in FIGS. 1 and 2.

Figure 7B:
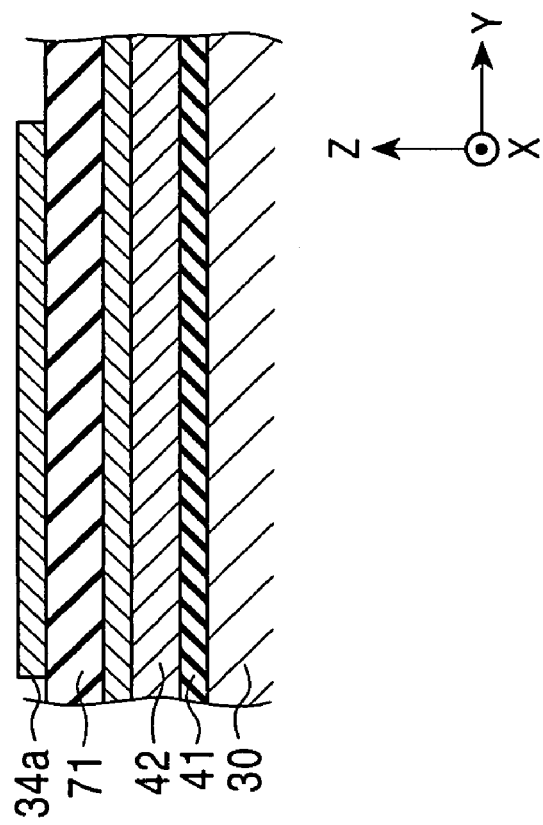
FIGS. 7A and 7B are a plan view and a cross-sectional view, respectively, for illustrating a step of manufacturing a conductive connection structure (thin film structure) shown in FIGS. 3 and 4.
Figure 7A:
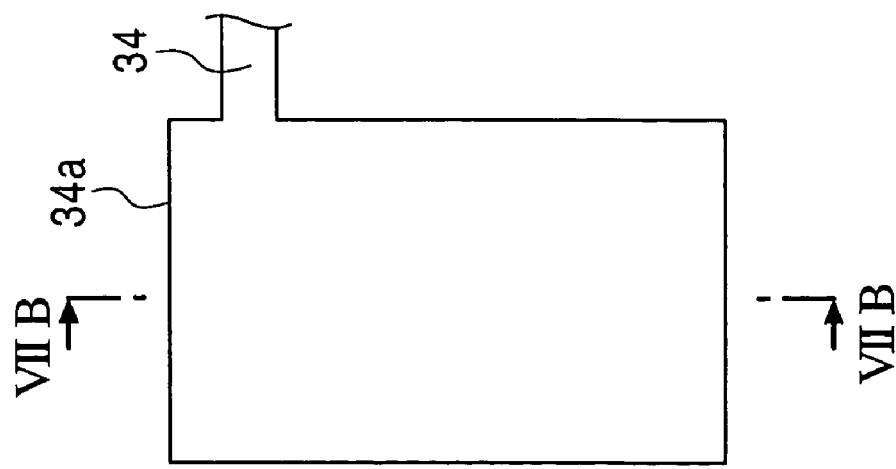

In the step shown in FIGS. 7A and 7B, after the lower core layer 47 of the inductive head shown in FIG. 2 is formed, the insulating layer 71 is formed around the lower core layer 47, and on this insulating layer 71, the second coil lead layer 34 shown in FIG. 1 is formed. The second coil lead layer 34 is simultaneously formed with the first coil layer 54 using the same material as that therefor.

The exterior connection portion 34*a* of the second coil lead layer 34 is the conductive layer of the present invention, and on the exterior connection portion 34*a*, the layers forming the conductive connection structure (thin film structure) are sequentially formed.

Figure 8B:
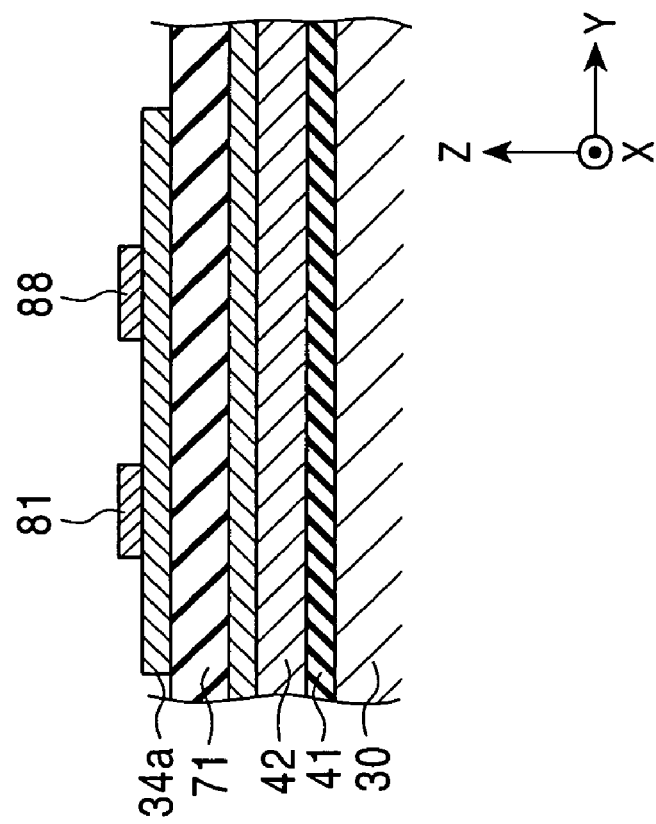
FIGS. 8A and 8B are a plan view and a cross-sectional view, respectively, for illustrating a step of manufacturing the conductive connection structure (thin film structure) shown in FIGS. 3 and 4.
Figure 8A:
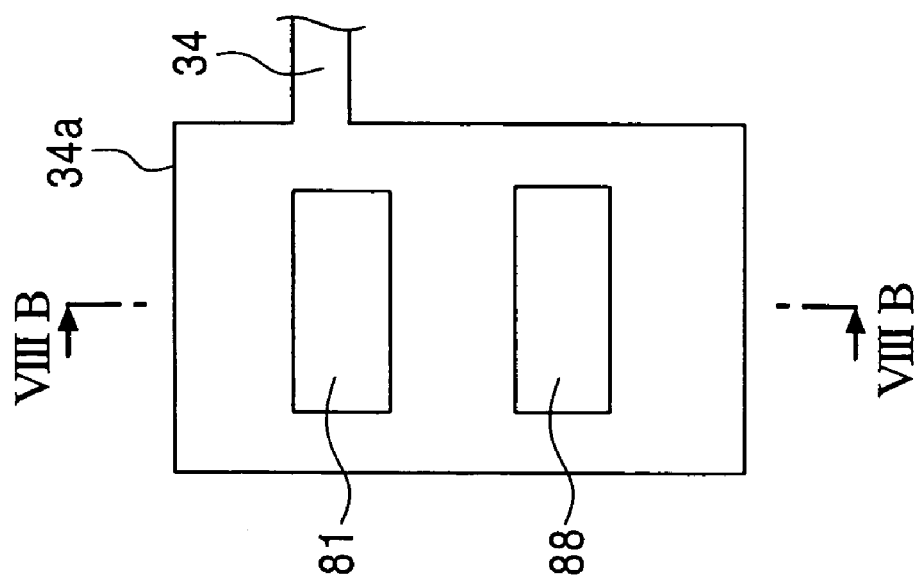

Next, in the step shown in FIGS. 8A and 8B, the base portion 81 and the metal layer 88 are formed by plating. The base portion 81 and the metal layer 88 are formed simultaneously with the first contact portion 62 shown in FIG. 2 by plating using the same material as that therefor, such as Ni, Cu, or Au. The first contact portion 62 serves to electrically connect between the coiling center 54*a* of the first coil layer 54 and the coiling center 58*a* of the second coil layer 58. In addition, the metal layer 88 serves as a current-carrying path which allows current to pass therethrough for forming the upper portion 86 by plating.

Figure 9:
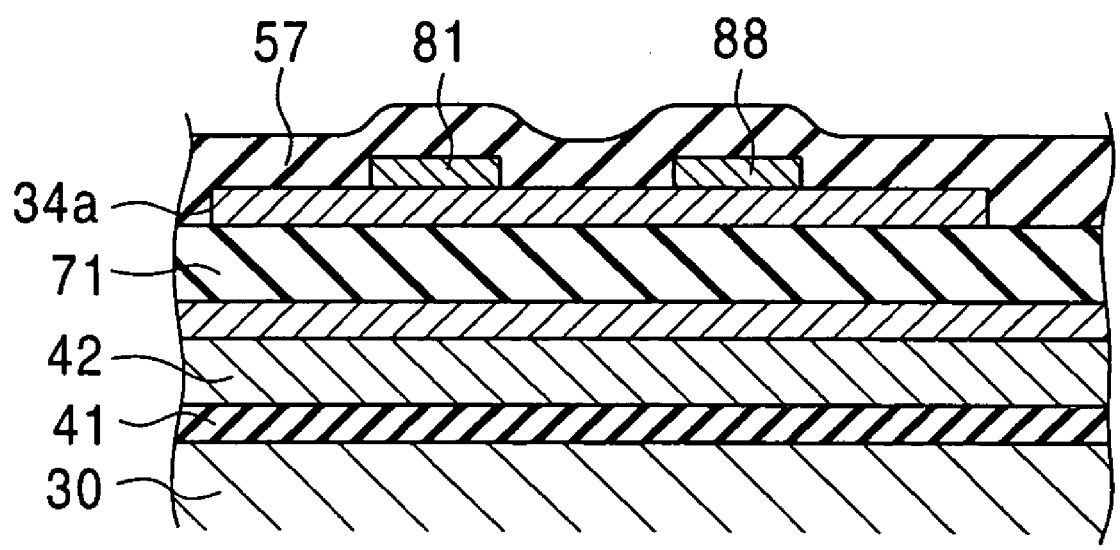
FIG. 9 is a cross-sectional view for illustrating a step of manufacturing the conductive connection structure (thin film structure) shown in FIGS. 3 and 4.

Next, in the step shown in FIG. 9, on the insulating layer 71, the exterior connection portion 34*a*, the base portion 81, and the metal layer 88, the coil insulating layer 57 is formed by sputtering. The coil insulating layer 57 is the same as the coil insulating layer 57 shown in FIG. 2 and is formed of an inorganic material such as $Al_2O_3$ or $SiO_2$.

In the step shown in FIGS. 10A and 10B, the coil insulating layer 57 is polished by a CMP technique so as to expose the upper surfaces of the base portion 81 and the metal layer 88. The upper surface of the coil insulating layer 57 and the upper surfaces of the base portion 81 and the metal layer 88 form a planarized and flush surface, and this flush surface thus formed coincides with the reference plane D. In addition, a thickness t1 of the coil insulating layer 57 is 1 μm or less.

Figure 11A:
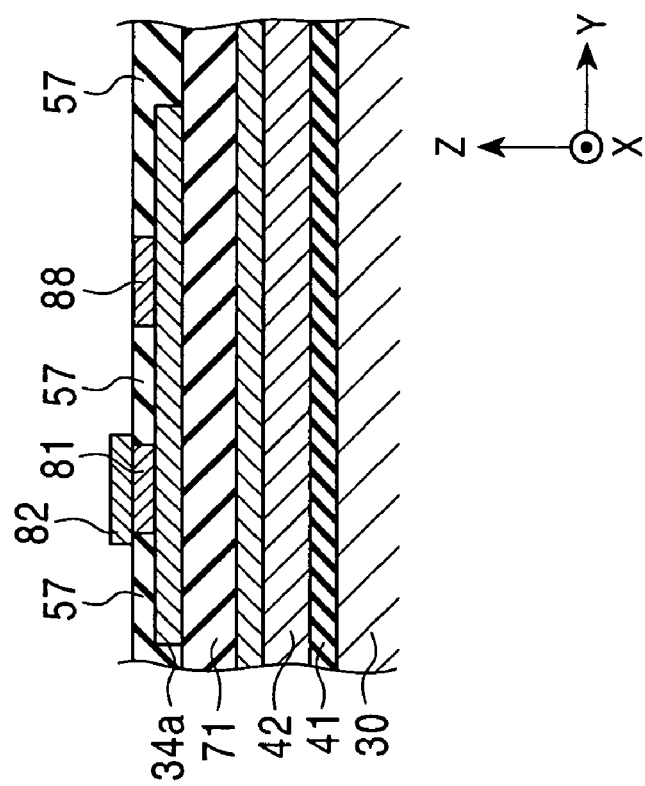
FIGS. 11A and 11B are a plan view and a cross-sectional view, respectively, for illustrating a step of manufacturing the conductive connection structure (thin film structure) shown in FIGS. 3 and 4.
Figure 11B:
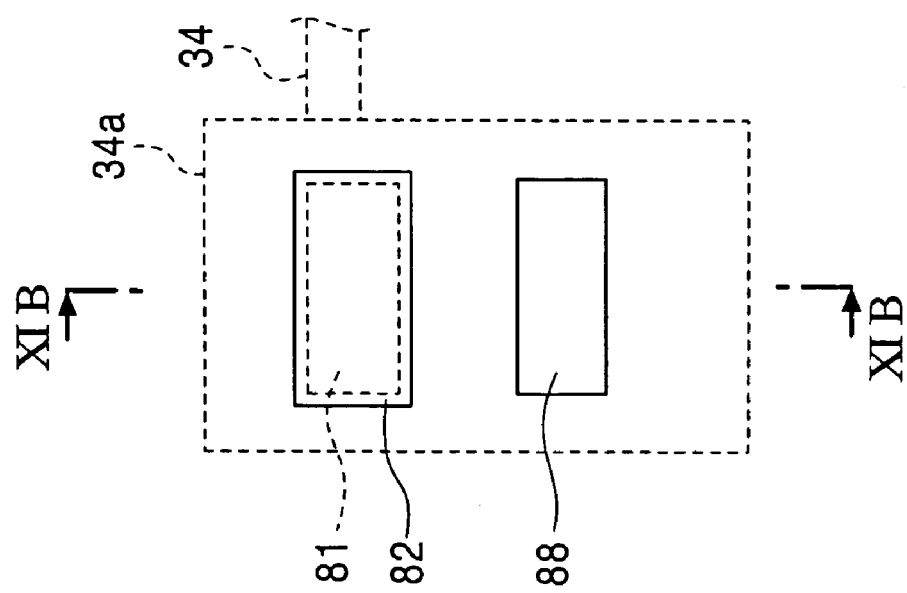

Next, in the step shown in FIGS. 11A and 11B, on the base portion 81, the first layer 82 is formed simultaneously with the second coil layer 58 shown in FIG. 2 by frame plating using the same material as that therefor.

Figure 12B:
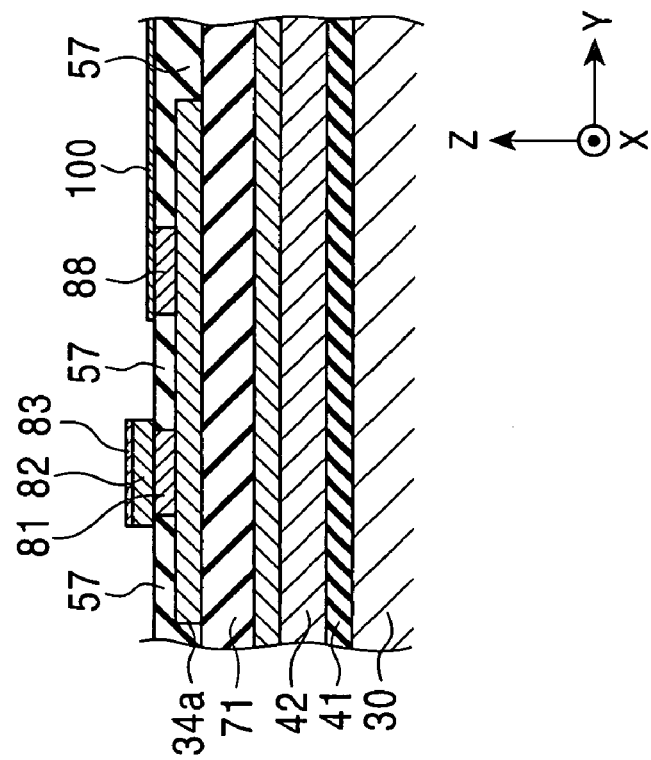
FIGS. 12A and 12B are a plan view and a cross-sectional view, respectively, for illustrating a step of manufacturing the conductive connection structure (thin film structure) shown in FIGS. 3 and 4.
Figure 12A:
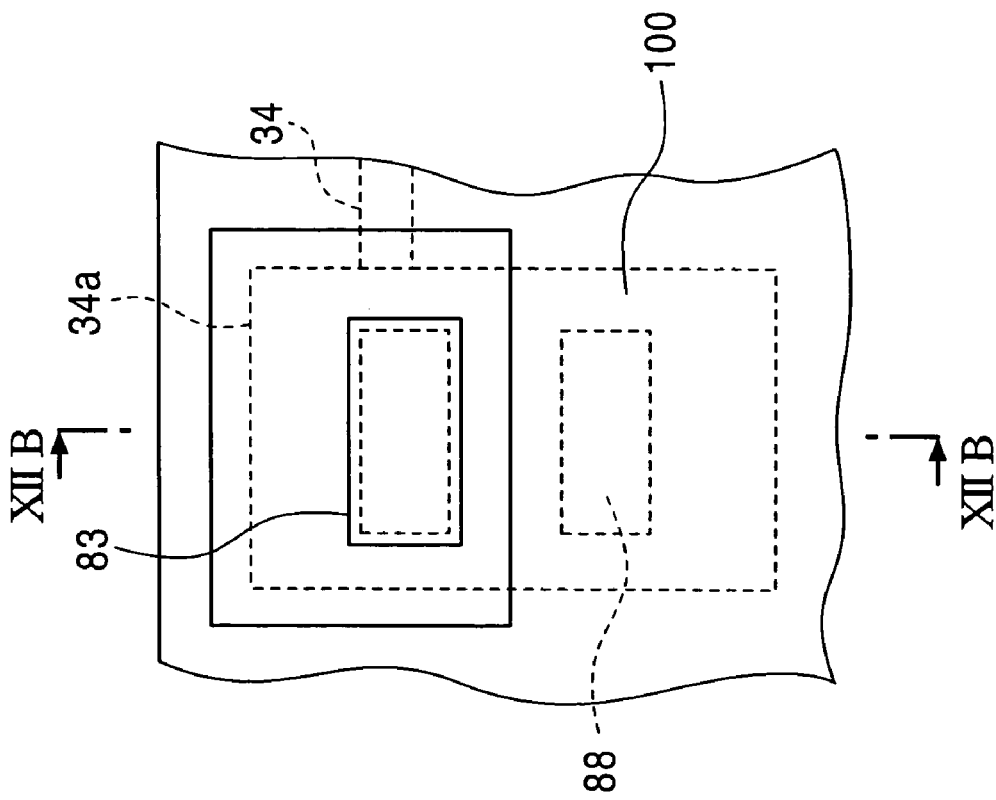

In the step shown in FIGS. 12A and 12B, on the first layer 82, the second layer 83 is formed simultaneously with the plating underlayer, which is used for forming the upper core layer 60 shown in FIG. 2, by sputtering using the same material as that for the plating underlayer. At the same time, using the same material as that for the plating underlayer, a current-carrying film 100 is also formed on the metal layer 88 by sputtering. The current-carrying film 100 is separated from the second layer 83 and can be used as a lead layer for supplying current to the metal layer 88 for plating.

Figure 13B:
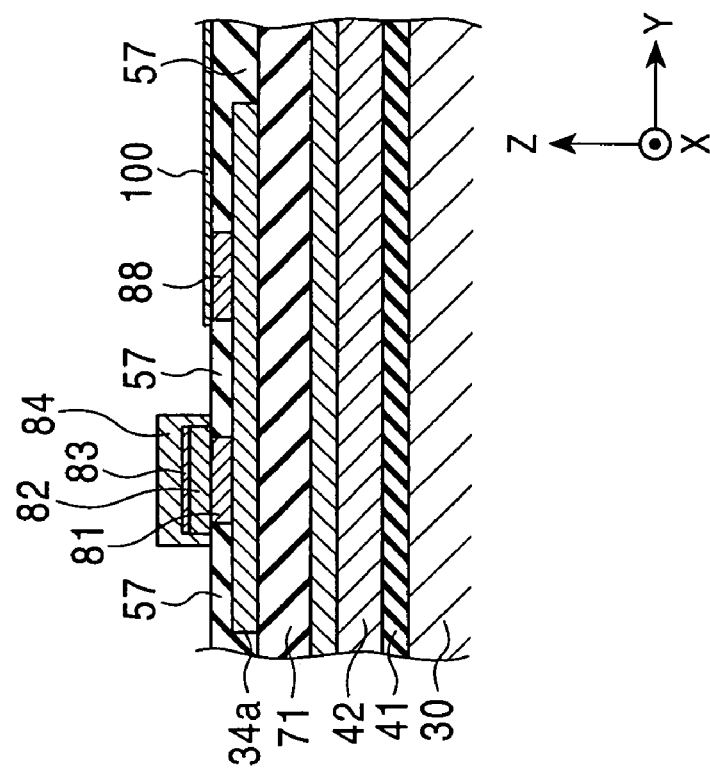
FIGS. 13A and 13B are a plan view and a cross-sectional view, respectively, for illustrating a step of manufacturing the conductive connection structure (thin film structure) shown in FIGS. 3 and 4.
Figure 13A:
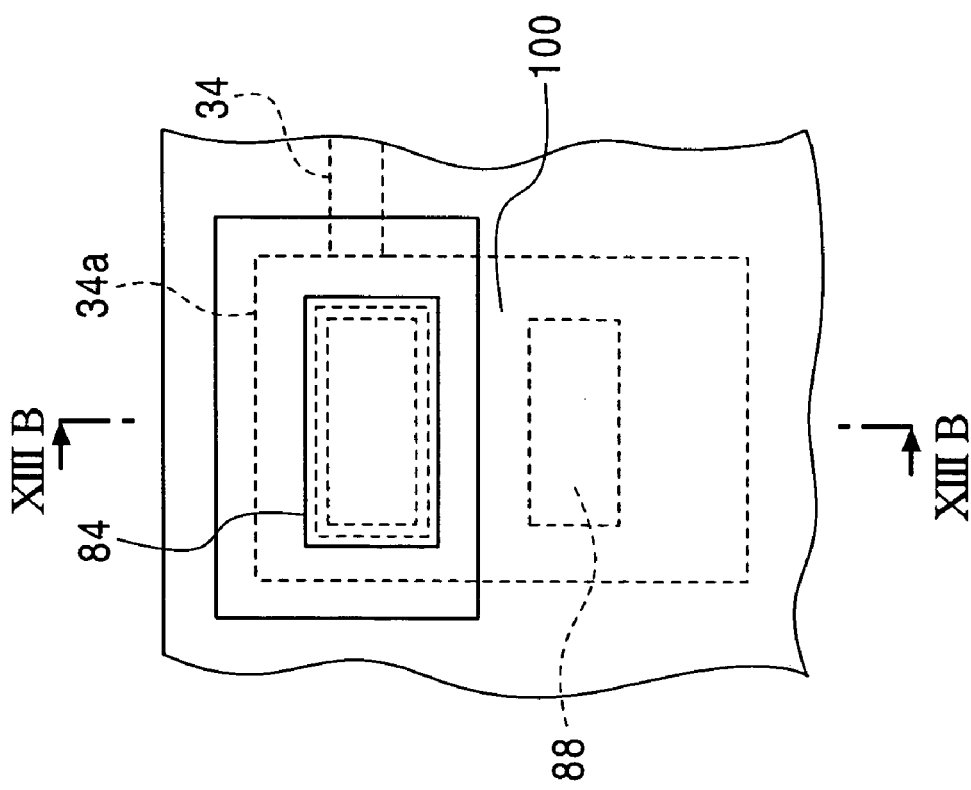

Next, in the step shown in FIGS. 13A and 13B, on the second layer 83, the third layer 84 is formed simultaneously with the upper core layer 60 shown in FIG. 2 by frame plating using the same material as that therefor. In this step, by using the current-carrying film 100 as a lead layer, current for plating can be supplied from the upper surface of the metal layer 88 through the exterior connection portion 34*a*.

Figure 14B:
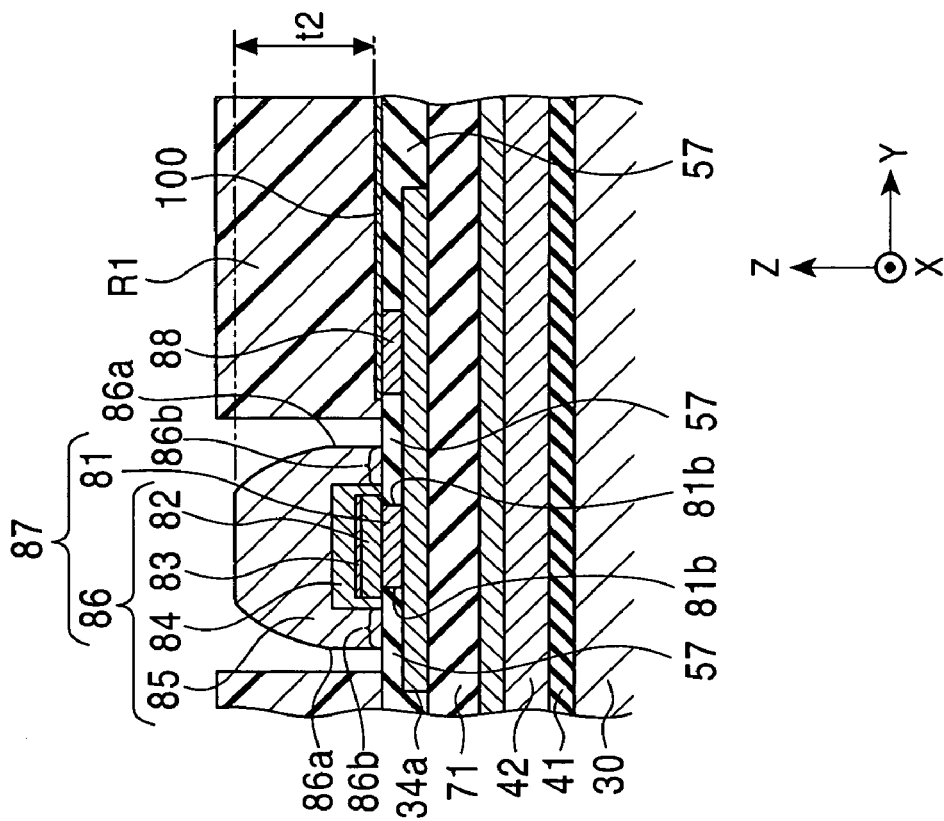
FIGS. 14A and 14B are a plan view and a cross-sectional view, respectively, for illustrating a step of manufacturing the conductive connection structure (thin film structure) shown in FIGS. 3 and 4.
Figure 14A:
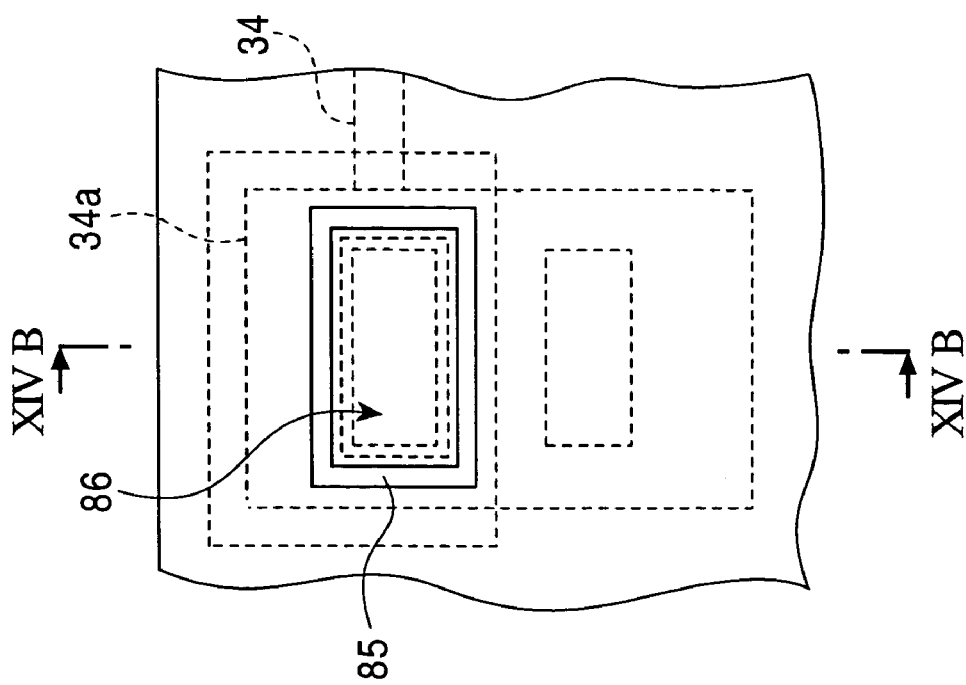

In the step shown in FIGS. 14A and 14B, on the third layer 84, the fourth layer 85 is formed using a material such as Cu or Au having a small electrical resistance. A resist layer R1 is formed at a certain distance from the third layer 84, and the fourth layer 85 is formed by free plating growth using a conductive material. A thickness t2 of the fourth layer 85 obtained by plating is 40 μm. In this step, by using the current-carrying film 100 as a lead layer, current used for plating can be supplied from the upper surface of the metal layer 88.

Through the steps shown in FIGS. 11A to 14B, the upper portion 86 is formed to have a multilayer structure composed of the first layer 82, the second layer 83, the third layer 84, and the fourth layer 85 in that order from the center.

However, an upper portion having a monolayer structure may be formed directly on the base portion 81 by free plating growth using a conductive material.

Alternatively, in the step shown in FIGS. 11A and 11B, when a plating underlayer for the second coil layer 58 is allowed to remain and is used as a lead layer, current can be supplied for forming the second layer 83, the third layer 84, and the fourth layer 85 by plating.

Since the fourth layer 85 is formed by free plating growth, the cross-sectional area (plane parallel to the X-Y plane) of the upper portion 86 perpendicular to the thickness direction (Z direction in the figure) is gradually decreased along the direction toward the upper side (Z direction in the figure) of the upper portion 86.

In addition, in the upper portion 86, the sidewall part 86*a* has the extending part 86*b* extending outward from the periphery 81*b* of the base portion 81, and the coil insulating layer 57 is also present all around the periphery of the base portion 81 under the extending part 86*b*.

Figure 15B:
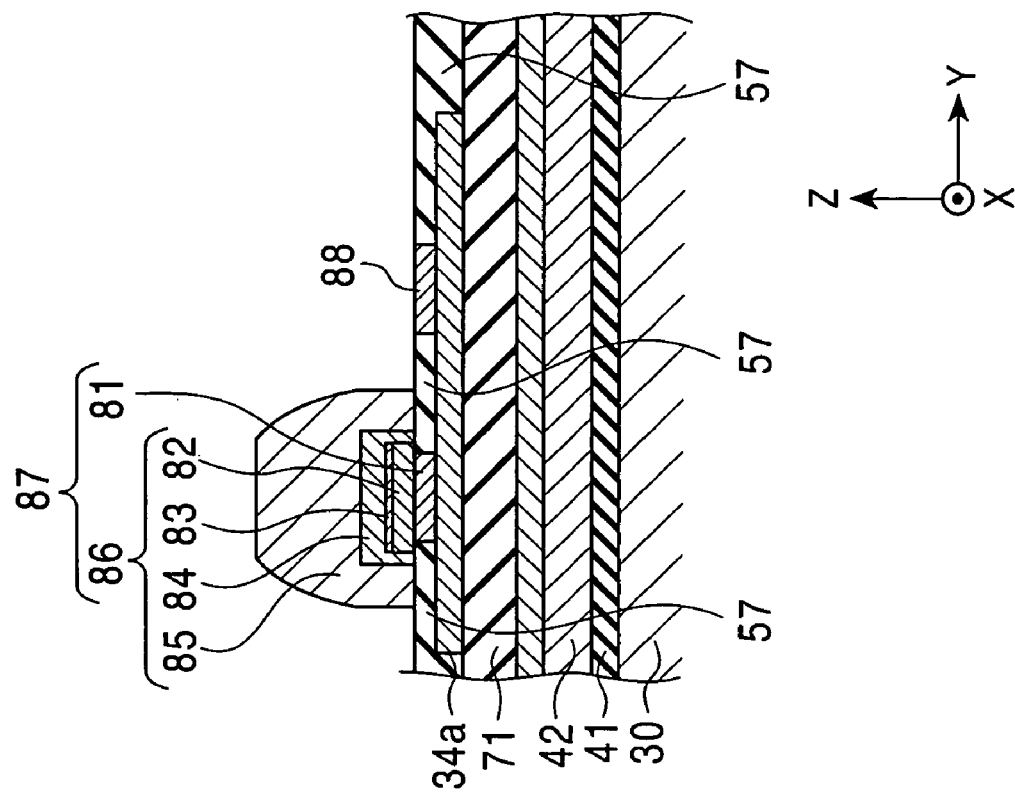
FIGS. 15A and 15B are a plan view and a cross-sectional view, respectively, for illustrating a step of manufacturing the conductive connection structure (thin film structure) shown in FIGS. 3 and 4.
Figure 15A:
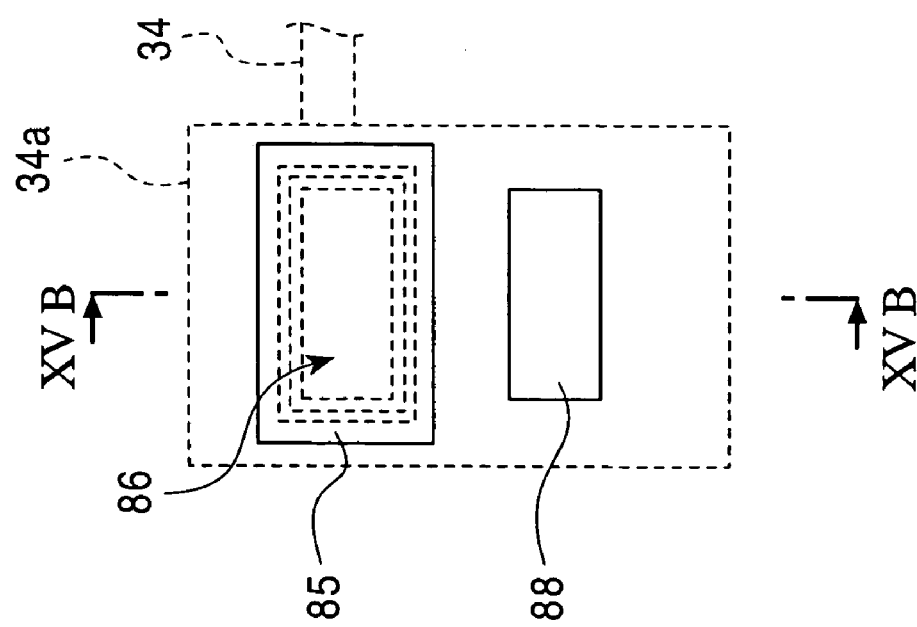

Next, in the step shown in FIGS. 15A and 15B, after the resist layer R1 is removed, the current-carrying film 100 is removed by ion milling or the like.

In the step shown in FIG. 16, the protective layer 61 is formed on the coil insulating layer 57, the metal layer 88, and the upper portion 86 by sputtering. The protective layer 61 is the same as the protective layer 61 shown in FIG. 2 and is formed of an inorganic material such as $Al_2O_3$ or $SiO_2$.

In addition, the protective layer 61 is processed by milling and polishing so that the upper surface of the upper portion

86 is exposed. The upper surface of the protective layer 61 and the upper surface of the upper portion 86 are planarized to be flush with each other. A thickness t3 of the protective layer 61 and the upper portion 86 is approximately 30 μm.

Figure 17B:
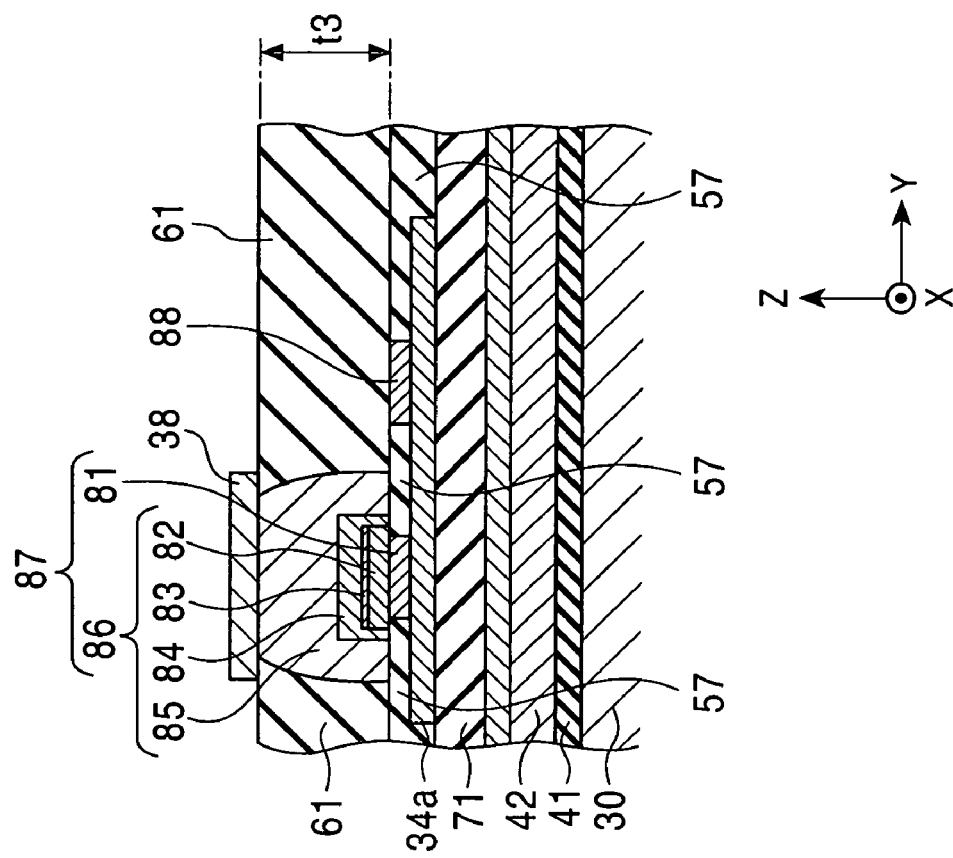
FIGS. 17A and 17B are a plan view and a cross-sectional view, respectively, for illustrating a step of manufacturing the conductive connection structure (thin film structure) shown in FIGS. 3 and 4.
Figure 17A:
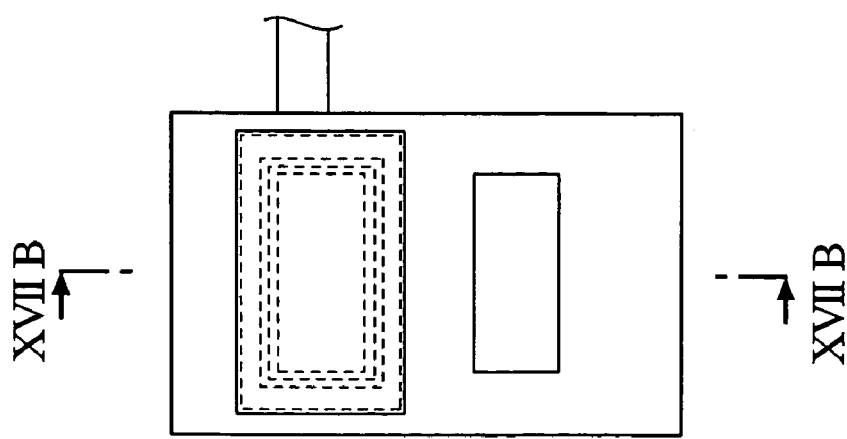

Next, the exterior terminal 38 is provided on the upper surface 61a of the upper portion 86 to form the structure shown in FIG. 17, thereby forming the conductive connection structure shown in FIGS. 3 and 4.

According to the manufacturing method described above, in the steps shown in FIGS. 12A to 14B, by supplying current from the upper surface of the metal layer 88 (current-carrying portion), the upper portion 86 is formed on the base portion 81 by plating, thereby forming the protrusion 87. Hence, the metal layer 88 (current-carrying portion) can be formed in the vicinity of the base portion 81 and is not necessary to be removed later. As a result, after the upper portion 86 is formed by plating, the coil insulating layer 57 formed all around the periphery of the base portion 81 is also not necessary to be removed, and the conductive connection structure (thin film structure) can be formed in which the coil insulating layer 57 is also present under the extending part 86b of the protrusion 87.

In the conductive connection structure (thin film structure) formed by this manufacturing method, the mechanical strength around the protrusion 87 is improved, cracking is unlikely to occur in the protective layer 61, and the corrosion resistant is improved. In particular, in the milling step shown in FIG. 16, the generation of cracks in the protective layer 61 can be suppressed.

In addition, when the fourth layer 85 of the upper portion 86 is formed, since the free plating growth is only performed, the variation in volume of the protrusion 87 is reduced, and as a result, the variation in electrical resistance can be reduced.

In addition, according to the manufacturing method described above, the cross-sectional area (plane parallel to the X-Y plane) of the upper portion 86 perpendicular to the thickness direction (Z direction in the figure) is gradually decreased along the direction toward the upper side (Z direction in the figure) of the upper portion 86. That is, the side surface of the upper portion 86 is a curved or an inclined surface.

Accordingly, in the step shown in FIG. 16, when the protective layer 61 is formed, a thickness t4 thereof can be decreased. In particular, the protective layer 61 can be formed so as to have a thickness t4 of 35 to 40 μm, and as a result, the productivity can be improved.

Figure 18:
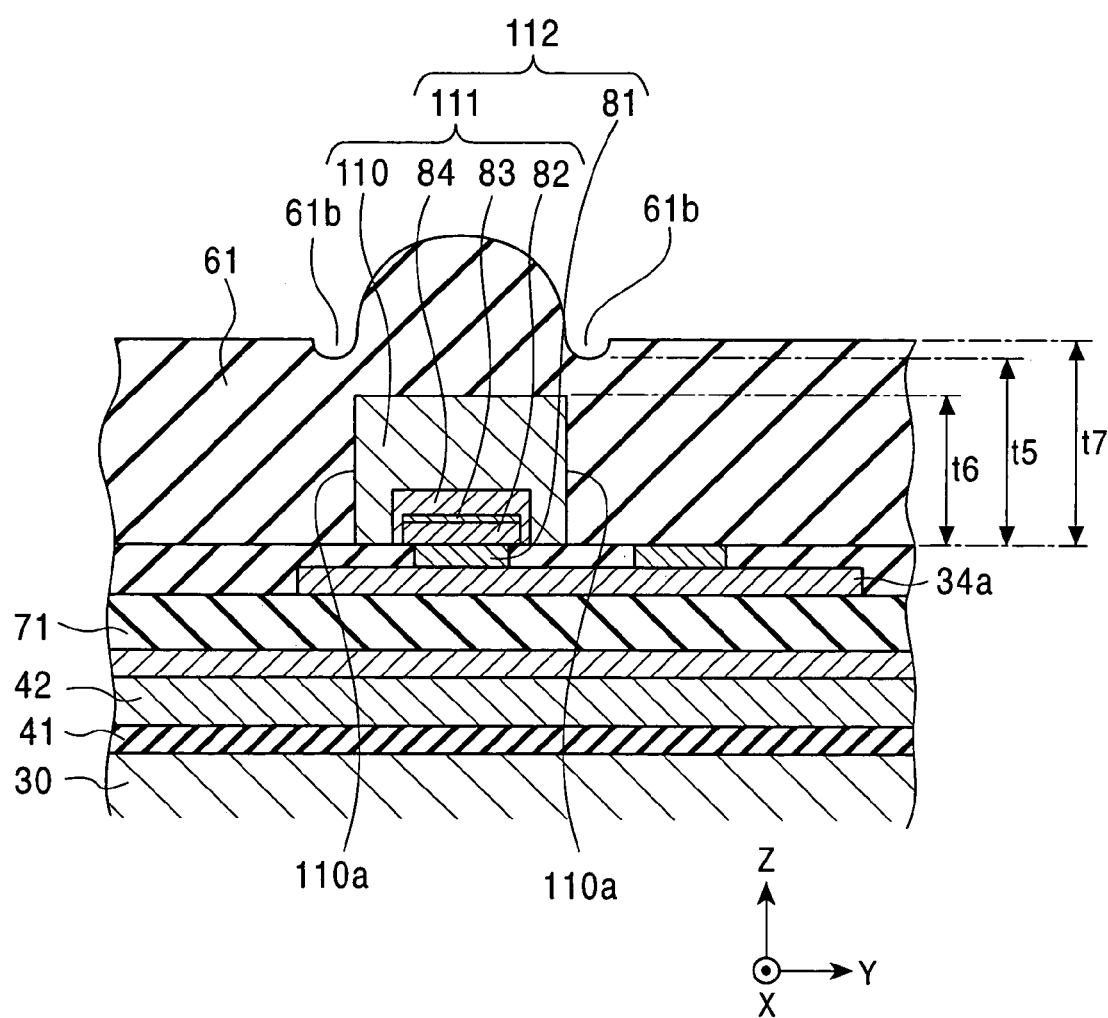
FIG. 18 is a cross-sectional view for illustrating a step of manufacturing a conductive connection structure (thin film structure) in which an upper portion has a vertical side surface.

On the other hand, as shown in FIG. 18, in a protrusion 112 having an upper portion 111 in which a fourth layer 110 is also formed by a frame plating method, the following problems may arise. When the fourth layer 110 is formed by a frame plating method, as shown in FIG. 18, a side surface 110a of the fourth layer 110 becomes a surface perpendicular to the upper surface of the coil insulating layer 57. When the side surface 110a of the fourth layer 110 becomes the perpendicular surface as described above, the sputtering rate around the side surface 110a of the fourth surface 110 is decreased when the protective layer 61 is formed, and as a result, a recess 61b is formed in the surface thereof. Accordingly, when the protective layer 61 is formed, a distance t5 from the upper surface of the coil insulating layer 57 to the recess 61b must be larger than a thickness t6 of the upper portion 111. Hence, a thickness t7 of the protective layer 61 must be 45 to 50 μm, and compared to the manufacturing method of the present invention, the film thickness t7 of the protective layer 61 becomes very large.

A method for manufacturing the conductive connection structure (thin film structure) shown in FIGS. 5 and 6 will be described.

FIGS. 19A to 25B are schematic views for illustrating steps of manufacturing the conductive connection structure (thin film structure) shown in FIGS. 5 and 6. In the figures mentioned above, for example, FIG. 19A is a plan view of the conductive connection structure (thin film structure) when viewed from above, and FIG. 19B is a cross-sectional view of the conductive connection structure taken on the line XIXB-XIXB shown in FIG. 19A when viewed along the arrow.

The formation of the conductive connection structure (thin film structure) shown in FIGS. 5 and 6 is simultaneously performed when the inductive head shown in FIGS. 1 and 2 is formed.

First, as is the step shown in FIGS. 7A and 7B, after the lower core layer 47 of the inductive head shown in FIG. 2 is formed, the insulating layer 71 is formed around the lower core layer 47, and on this insulating layer 71, the second coil lead layer 34 shown in FIG. 1 is formed. The second coil lead layer 34 is simultaneously formed with the first coil layer 54 shown in FIG. 2 by plating using the same material as that therefor.

The exterior connection portion 34a of the second coil lead layer 34 is the conductive layer of the present invention, and on the exterior connection portion 34a, the layers forming the conductive connection structure (thin film structure) are sequentially formed.

Next, in the step shown in FIGS. 19A and 19B, on the insulating layer 71 and the exterior connection portion 34a, the coil insulating layer 57 is formed by sputtering. The coil insulating layer 57 is the same as the coil insulating layer 57 shown in FIG. 2 and is formed of an inorganic material such as $Al_2O_3$ or $SiO_2$. In addition, the current-carrying opening 57b and a plating-forming opening 57c are formed in the coil insulating layer 57 to expose the exterior connection portion 34a.

Figure 20B:
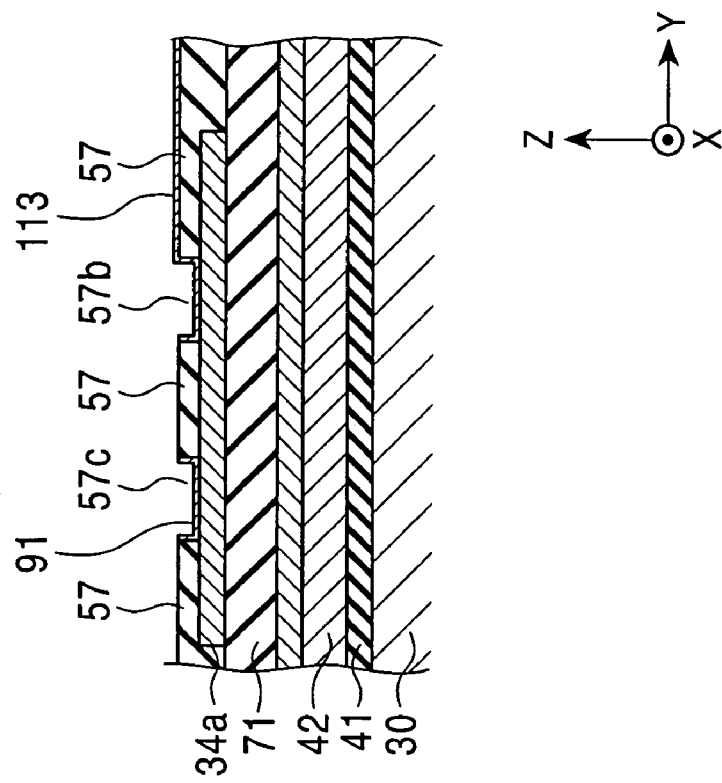
FIGS. 20A and 20B are a plan view and a cross-sectional view, respectively, for illustrating a step of manufacturing the conductive connection structure (thin film structure) shown in FIGS. 5 and 6.
Figure 20A:
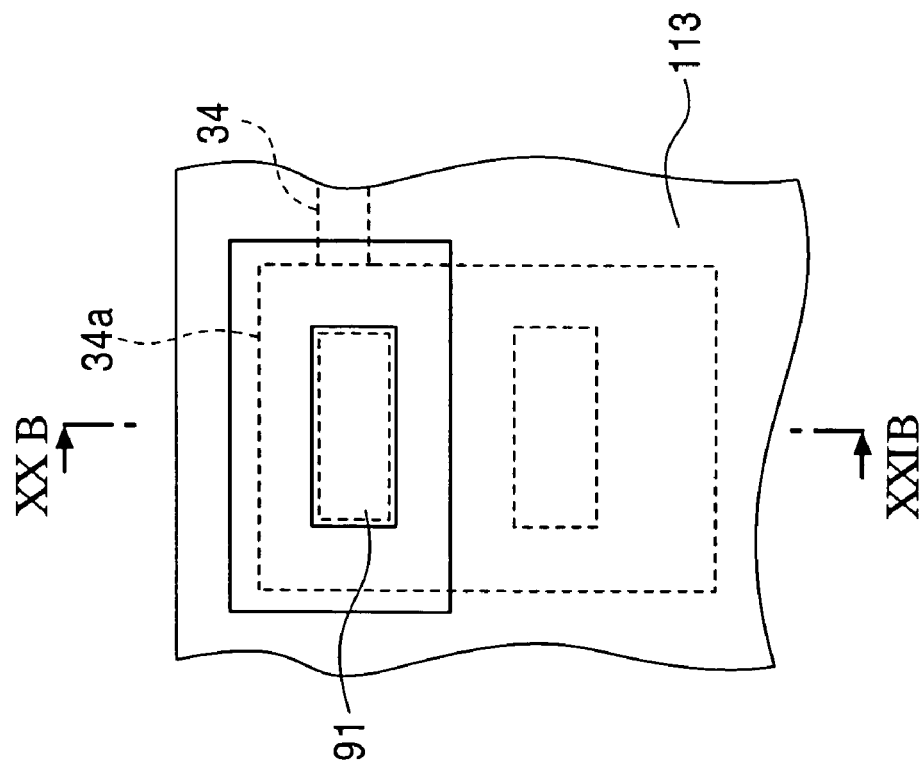

Next, in the step shown in FIGS. 20A and 20B, on the exterior connection portion 34a exposed through the plating-forming opening 57c, the plating underlayer 91 is simultaneously formed with the plating underlayer used for forming the upper core layer 60 shown in FIG. 2 by sputtering using the same material as that therefor. At the same time, on the exterior connection portion 34a exposed through the current-carrying opening 57b and the coil insulating layer 57, a current-carrying film 113 is formed by sputtering using the same material as that for the plating underlayer described above. The current-carrying film 113 is separated from the plating underlayer 91 and is used as a lead layer for supplying current to the exterior connection portion 34a for plating.

In the step shown in FIGS. 21A and 21B, on the plating underlayer 91, the first layer 92 is simultaneously formed with the upper core layer 60 shown in FIG. 2 by frame plating using the same material as that therefor. In this step, by using the current-carrying film 113 as a lead layer, current for plating can be supplied from the upper surface of the exterior connection portion 34a.

In the step shown in FIGS. 22A and 22B, on the first layer 91, the second layer 93 is formed by plating using a material such as Ni, Cu, or Au having a small electrical resistance. A resist layer R2 is formed at a certain distance from the first layer 92, and the second layer 93 is formed by free plating growth. A thickness t8 of the second layer 93 obtained by plating is 40 μm. In this step, by using the current-carrying film 113 as a lead layer, current for plating can also be supplied from the upper surface of the exterior connection portion 34a.

Through the steps shown in FIGS. 19A to 22B, the upper portion 96 is formed having a multilayer structure composed of the first layer 92 and the second layer 93 in that order from the center.

Alternatively, an upper portion having a monolayer structure may be formed directly on the plating underlayer 91 by performing free plating growth using a conductive material. However, when the second layer 93 is also formed by plating on the first layer 92 which is formed by plating, the adhesion therebetween is improved, and as a result, a force fixing the protrusion 94 on the exterior connection portion 34a is preferably increased.

Since the second layer 93 is formed by free plating growth, the cross-sectional area (plane parallel to the X-Y plane) of the upper portion 96 perpendicular to the thickness direction (Z direction in the figure) is gradually decreased along the direction toward the upper side (Z direction in the figure) of the upper portion 96.

In the protrusion (bump) 94, a part of the first layer 92 surrounded by the coil insulating layer 57 is the base portion 95 and an upper part on the base portion 95 is the upper portion 96.

In the upper portion 96, the sidewall part 96a extends outward from the periphery 95a of the base portion 95 to form the extending part 96b, and the coil insulating layer (insulating layer) 57 is present all around the periphery of the base portion 95 under the extending part 96b.

In addition, the coil insulating layer (insulating layer) 57 may be formed of an organic insulating material such as a resist material.

Figure 23B:
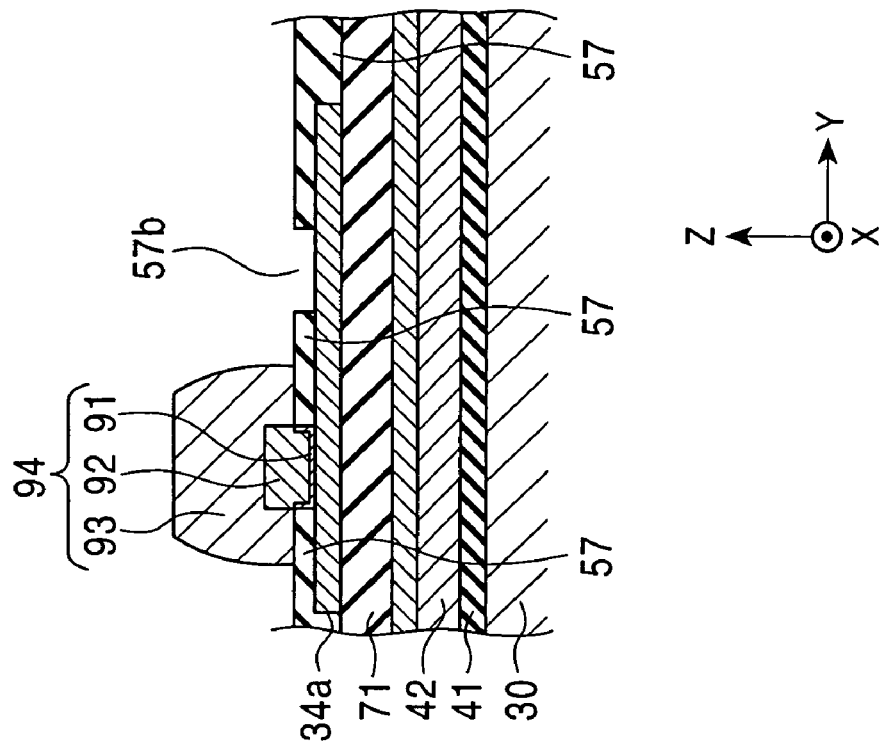
FIGS. 23A and 23B are a plan view and a cross-sectional view, respectively, for illustrating a step of manufacturing the conductive connection structure (thin film structure) shown in FIGS. 5 and 6.
Figure 23A:
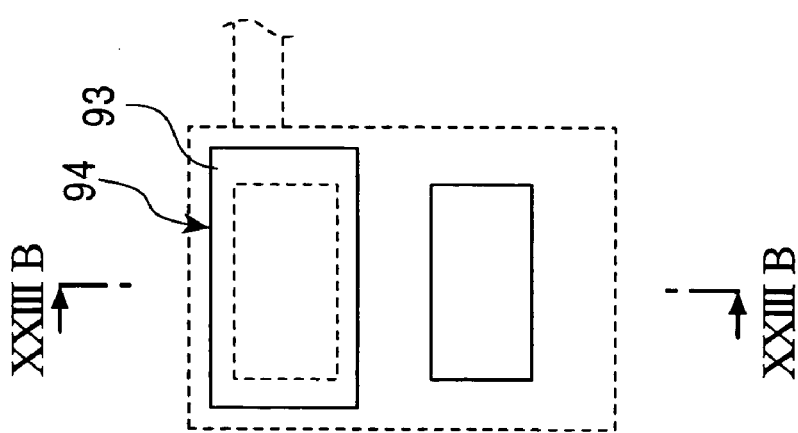

In the step shown in FIGS. 23A and 23B, after the resist layer R2 is removed, the current-carrying film 113 is removed by ion milling or the like.

Figure 24:
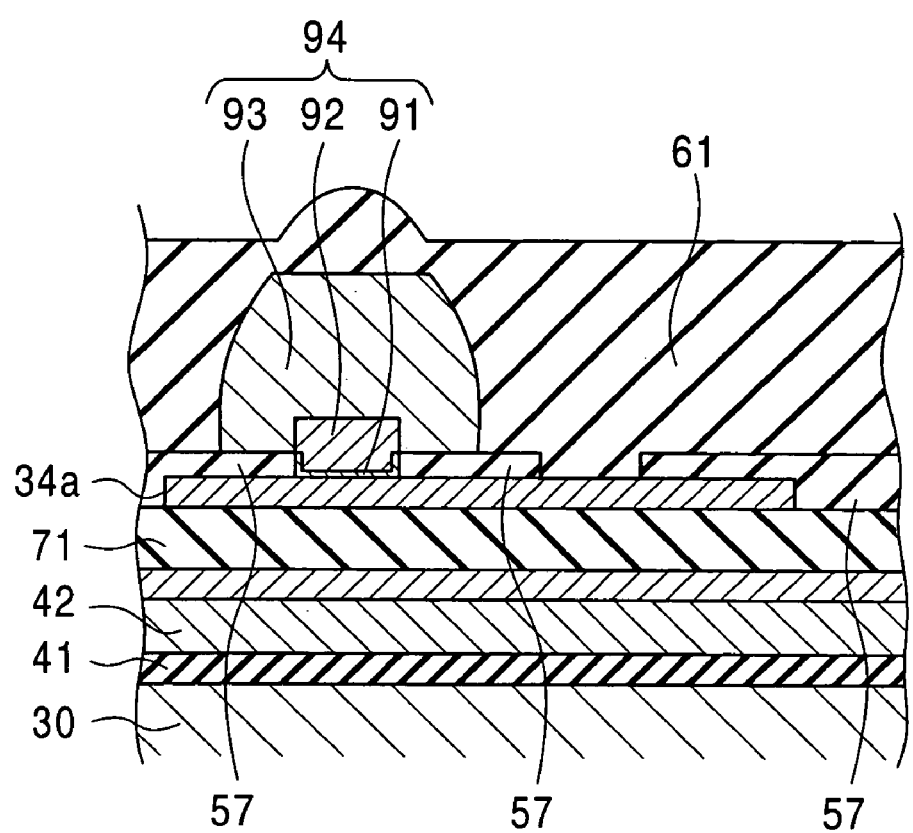
FIG. 24 is a cross-sectional view for illustrating a step of manufacturing the conductive connection structure (thin film structure) shown in FIGS. 5 and 6.

Next, in the step shown in FIG. 24, on the coil insulating layer 57 and the upper portion 96, the protective layer 61 is formed by sputtering. The protective layer 61 is the same as the protective layer 61 shown in FIG. 2 and is formed of an inorganic material such as $Al_2O_3$ or $SiO_2$.

In addition, the protective layer 61 is processed by milling and polishing so that the upper surface of the upper portion 96 is exposed. The upper surface of the protective layer 61 and the upper surface of the upper portion 96 are planarized to be flush with each other. A thickness t9 of the protective layer 61 and the upper portion 96 is approximately 30 μm.

Next, the exterior terminal 38 is provided on the upper surface of the upper portion 96 to form the structure shown in FIG. 25, thereby forming the conductive connection structure shown in FIGS. 5 and 6.

According to this embodiment, in the steps shown in FIGS. 21A to 22B, by supplying current from the current-carrying opening 57b, the first layer 92 and the second layer 93 are formed by plating on the exterior connection portion 34a exposed through the plating-forming opening 57c. When the current-carrying opening 57b is formed at a position close to the plating-forming opening 57c, the exterior connection portion 34a in the vicinity of the current-carrying opening 57b is not necessary to be removed later. Accordingly, after the protrusion 94 is formed, the coil insulating layer 57 formed all around the periphery of the base portion 95 is also not necessary to be removed, and as a result, the conductive connection structure (thin film structure) can be manufactured in which the coil insulating layer 57 is also present under the extending part 96b of the protrusion 94.

In the conductive connection structure (thin film structure) formed by this manufacturing method, the mechanical strength around the protrusion 94 is improved, cracking is unlikely to occur in the protective layer 61, and the corrosion resistant is improved. In particular, in the milling step shown in FIG. 24, the generation of cracks in the protective layer 61 can be suppressed.

In addition, when the second layer 93 is formed, since the free plating growth is only performed, the variation in volume of the protrusion 94 is reduced, and as a result, a thin film structure can be manufactured in which the variation in electrical resistance can be reduced.

In addition, the conductive connection structure (thin film structure) of the embodiment described above may be used for the terminal portion (exterior connection portion) of the other coil lead layer 33. In this case, since the metal layer (current-carrying portion) 88 or the current-carrying opening 57b can be used for forming a protrusion on the terminal portion (exterior connection portion) of the other coil lead layer 33, a current-carrying portion or a current-carrying opening may not be provided therefor.

In addition, the conductive connection structure (thin film structure) of the embodiment described above may be used for the terminal portions (exterior connection portions) of the electrode lead layers 35 and 36 for supplying a sense current to the magnetoresistive effect element of the MR head.

Figure 26:
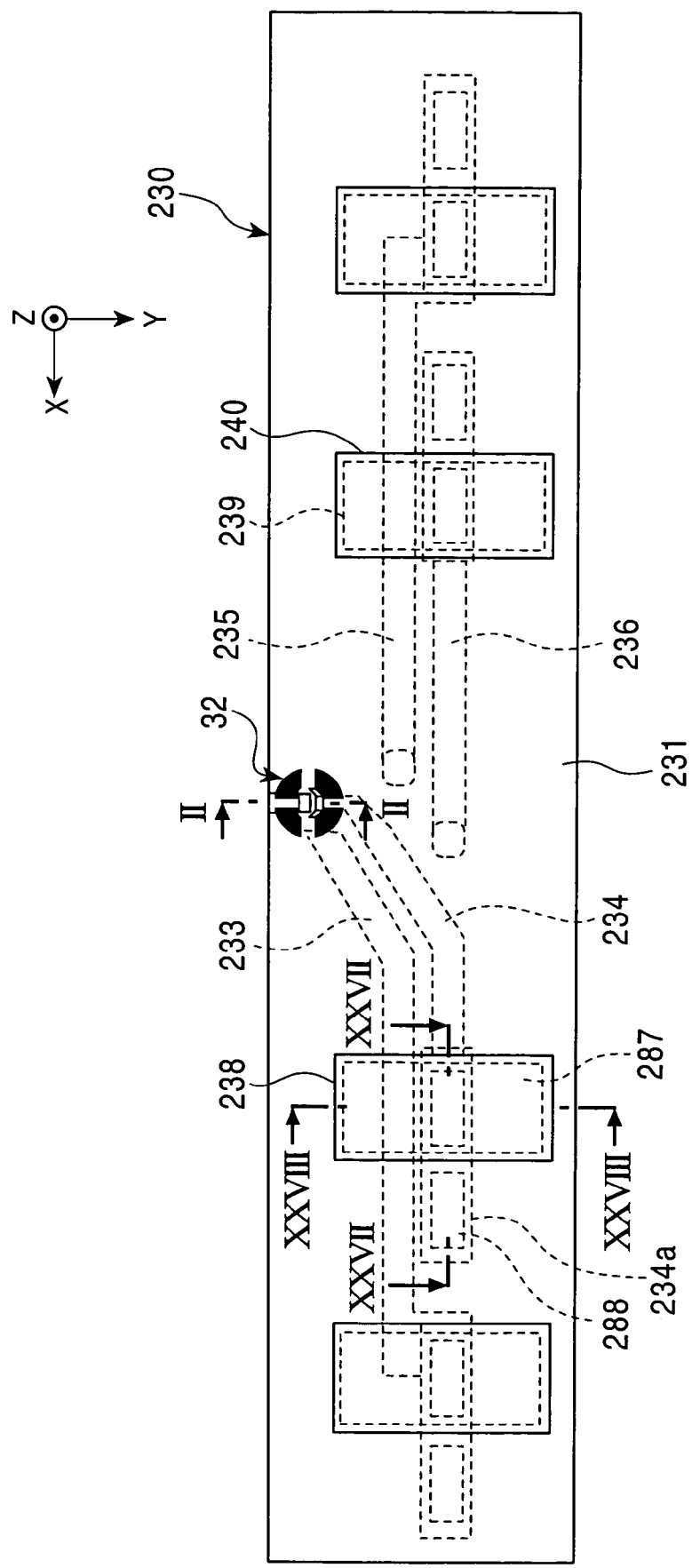
FIG. 26 is a partial plan view of an end surface at a trailing side of a slider provided with a magnetic head, in which a thin film structure of the present invention is used as a lead line for electrode connection.

FIG. 26 is a partial plan view showing the structure of an end surface 231 of a slider 230 at a trailing side provided with a magnetic head, the slider using a thin film structure of the present invention as a lead line for electrode connection. The upper side surface of the slider 230 in the figure is the surface facing a recording medium.

The slider 230 shown in FIG. 26 is formed of a ceramic material such as alumina-titanium carbide ($Al_2O_3$—TiC), and on the end surface 231 at the trailing side, the thin film head 32 is provided at the side of the surface facing a recording medium.

The thin film magnetic head 32 is the same as the thin film magnetic head 2 shown in FIGS. 1 and 2.

As shown in FIG. 26, on the end surface 231 of the slider 230 at the trailing side, four lead layers 233 to 236 are formed by plating. Among those mentioned above, the lead layers 233 and 234 are coil lead layers electrically connected to coil layers forming the inductive head. As shown in FIG. 26, the second coil lead layer 234 is electrically connected at a terminal portion (exterior connection portion) thereof to an exterior terminal 238 with a protrusion 287 provided therebetween, the protrusion 287 being formed directly or indirectly on the terminal portion of the second coil lead layer 234 by plating. As is the second coil lead layer 234, the first coil lead layer 233 is electrically connected at a terminal portion (exterior connection portion) thereof to an exterior terminal with a protrusion provided therebetween.

The lead layer 235 and 236 shown in FIG. 26 are electrode lead layers for supplying a sense current to a magnetoresistive effect element of an MR head, and the electrode lead layer 236 is electrically connected at a terminal portion (exterior connection portion) thereof to an exterior terminal 240 with a protrusion 239 provided therebetween, the protrusion 239 being formed directly or indirectly on the terminal portion by plating. In addition, as is the electrode lead layer 236, the electrode lead layer 235 is electrically connected at a terminal portion (exterior connection portion) thereof to an exterior terminal with a protrusion (bump) provided therebetween.

In this embodiment, the first coil lead layer 233 passes under the protrusion 287 on the terminal portion (exterior connection portion) of the second coil lead layer 234, and the electrode lead layer 235 passes under the protrusion 239 on the terminal portion (exterior connection portion) of the electrode lead layer 236. Accordingly, the wire density of the coil lead layers and the electrode lead layers on the end surface 231 of the slider 230 at the trailing side can be increased, the area of the end surface 231 at the trailing side can be decreased, and as a result, miniaturization of the slider 230 can be facilitated. In addition, while the area of the end surface 231 at the trailing side is decreased, at least five exterior terminals can be formed and wired on the end surface 231 at the trailing side.

Next, a conductive connection structure on an exterior connection portion 234a of the second coil lead layer 234, according to the embodiment of the thin film structure of the present invention, will be described, the second coil lead layer 234 being integrally formed with the first coil layer 54 by plating.

Figure 27:
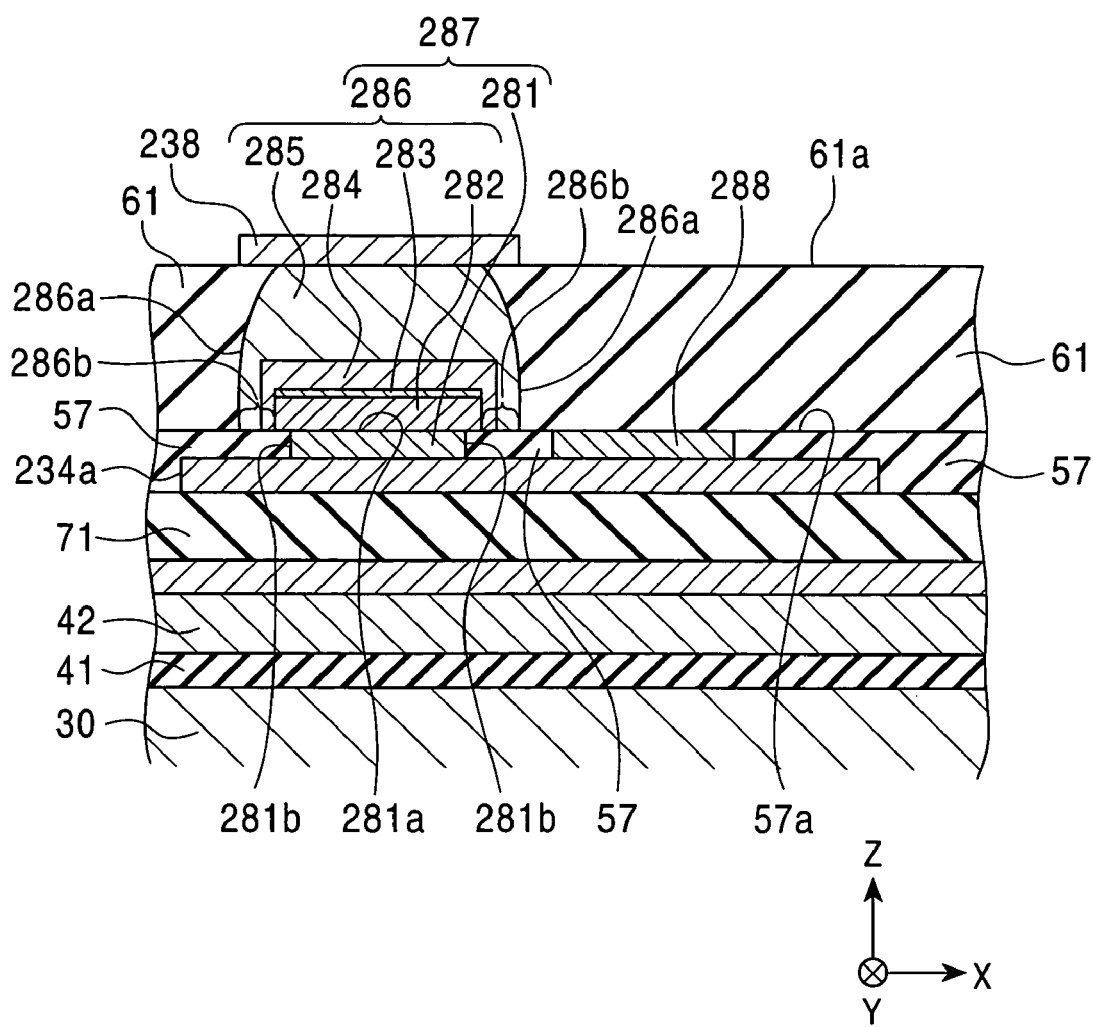
FIG. 27 is a partial cross-sectional view of a thin film structure taken along the line XXVII-XXVII shown in FIG. 26 of an embodiment according to the present invention.

FIG. 27 is a partial cross-sectional view of a thin film structure according to the embodiment of the present invention taken along the line XXVII-XXVII shown in FIG. 26.

The exterior connection portion 234a of the second coil lead layer 234 shown in FIG. 27 is a conductive layer of the present invention and is formed on the insulating layer 71 formed around the lower core layer 47. On this conductive layer, the protrusion (bump) 287 made of a conductive material is provided.

The protrusion (bump) 287 has a base portion 281 formed on the exterior connection portion 234a by plating and penetrating the coil insulating layer 57 and an upper portion 286 provided on the base portion 281. The upper portion 286 has a multilayer structure formed of a first layer 282, a second layer 283, a third layer 284, and a fourth layer 285 in that order from the center. In this structure, the first layer 282 is formed of the same material as that for the second coil layer 58, the second layer 283 is formed of the same material as that for the plating underlayer for the upper core layer 60, the third layer 283 is formed of the same material as that for the upper core layer 60, and the fourth layer 285 is formed of a material, such as Ni, Cu, or Au, having a small electrical resistance. However, the upper portion 286 may have a monolayer structure composed of a material, such as Ni, Cu, or Au, having a small electrical resistance.

The base portion 281 is formed of the same material as that for the first contact portion 62. An upper surface 281a of the base portion 281 is formed to be flush with the upper surface 57a of the coil insulating layer 57.

Around the upper portion 286, the protective layer 61 is formed, and the upper portion 286 penetrates the protective layer 61. The upper portion 286 is formed to be exposed at the upper surface 61a of the protective layer 61 and is electrically connected to the exterior terminal 238 formed on the protective layer 61.

In addition, on the exterior connection portion 234a, a metal layer 288 penetrating the coil insulating layer 57 is formed. This metal layer 288 functions as a current-carrying path which allows current to pass therethrough for forming the upper portion 286 by plating. An upper surface 288a of the metal layer 288 is formed to be flush with the upper surface 57a of the coil insulating layer 57.

In FIG. 27, the conductive connection structure on the exterior connection portion 234a of the second coil lead layer 234 is described, and a conductive connection structure on an exterior connection portion 233b of the first coil lead layer 233 shown in FIG. 26 is the same as that shown in FIG. 27. That is, a protrusion composed of a base portion and an upper portion is formed by plating on the first coil lead layer 233, and on this protrusion, the exterior terminal 238 is formed.

In addition, conductive connection structures on the terminal portions (exterior connection portions) of the lead layers 235 and 236 shown in FIG. 26, which are the electrode lead layers for supplying a sense current to the magnetoresistive effect element of the MR head, can be formed so as to have the same structure as that shown in FIG. 27.

A cross-sectional area (plane parallel to the X-Y plane) of the upper portion 286 perpendicular to the thickness direction (Z direction in the figure) is gradually decreased along the direction toward the upper side (Z direction in the figure) of the upper portion 286. In addition, in the upper portion 286, a sidewall part 286a has an extending part 286b extending outward from a periphery 281b of the base portion 281, and the coil insulating layer (insulating layer) 57 is also present under the extending part 286b.

The coil insulating layer (insulating layer) 57 is present all around the periphery of the base portion 281 under the extending part 286b.

Figure 28:
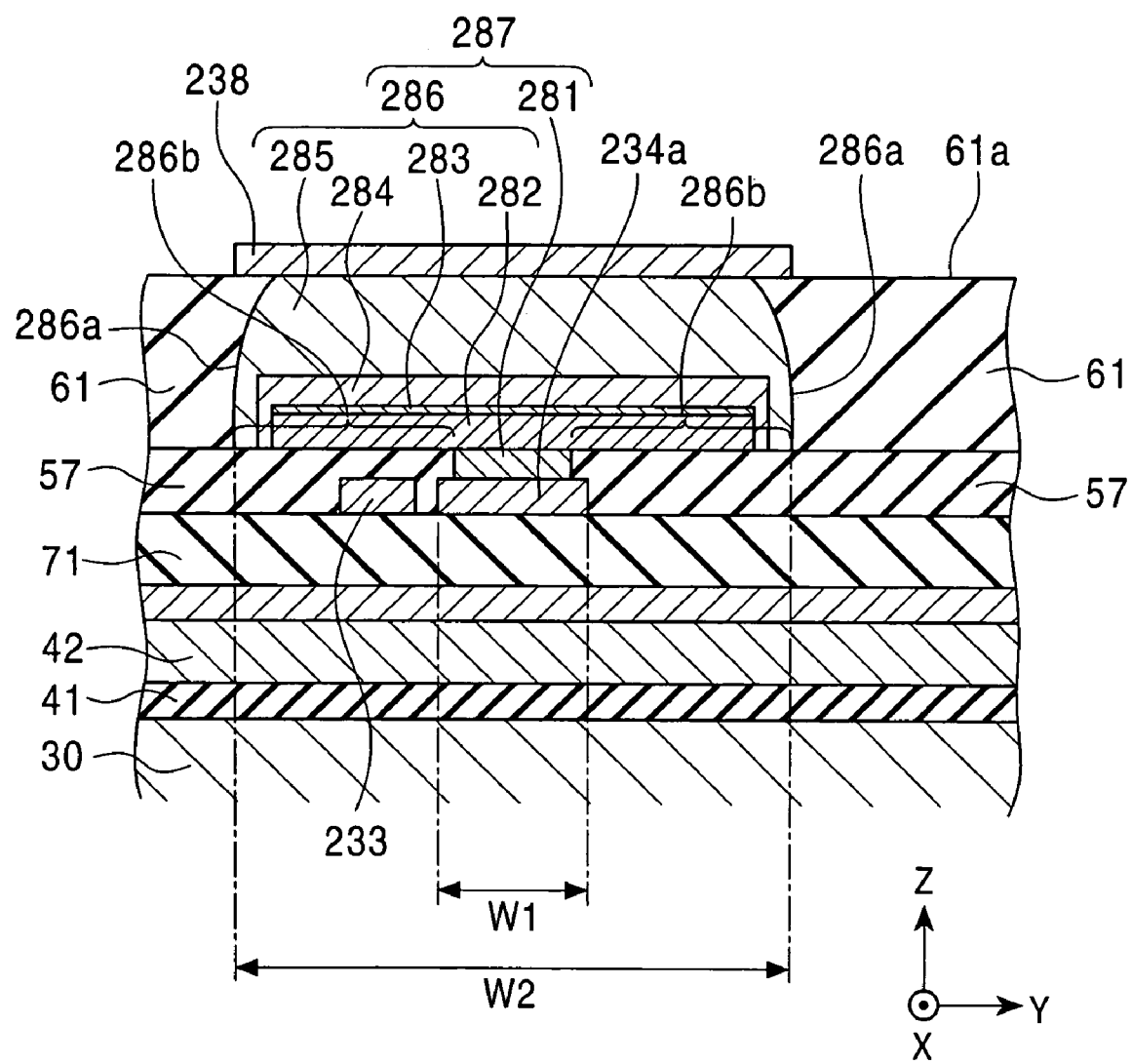
FIG. 28 is a partial cross-sectional view of the thin film structure taken along the line XXVIII-XXVIII shown in FIG. 26 of the embodiment according to the present invention.

FIG. 28 is a partial cross-sectional view of the thin film structure of the embodiment according to the present invention taken along the line XXVIII-XXVIII shown in FIG. 26.

As also shown in FIG. 28, in the upper portion 286, the sidewall part 286a has the extending part 286b extending outward from the periphery 281b of the base portion 281, and the coil insulating layer (insulating layer) 57 is also present under the extending part 286b.

In the present invention, since the coil insulating layer (insulating layer) 57 is also present under the extending part 286b of the protrusion 287, the mechanical strength around the protrusion 287 is increased. Accordingly, cracking is not likely to occur in the protective layer (insulating layer) 61, and as a result, the corrosion resistance of the conduction connection structure is improved.

In addition, in the upper portion 286 of the protrusion 287, since the sidewall part 286a has the extending part 286b extending outward from the periphery 281b of the base portion 281, the volume of the protrusion 287 is maintained, and as a result, the increase in electrical resistance can be prevented.

In this embodiment, the coil insulating layer (insulating layer) 57 is in contact with the periphery 281b of the base portion 281. That is, in the entire region under the extending part 286b of the protrusion 287, the coil insulating layer (insulating layer) 57 is present, and hence the mechanical strength around the protrusion 287 is improved.

In this embodiment, as shown in FIGS. 26 and 28, the coil lead layer 233, which is another lead layer, is provided at a side of the exterior connection portion (conductive layer) 234a and under the extending part 286b of the protrusion 287. As shown in FIG. 26, this coil lead layer 233 is connected to another thin film structure composed of the exterior connection portion 233b, the protrusion, and the exterior terminal 238.

In the present invention, the side of the exterior connection portion (conductive layer) 234a is not always necessary to be at the same level as that of the exterior connection portion (conductive layer) 234a, and the coil lead layer 233 may be formed at the same level as that of the base portion 281 which is located at the upper side the exterior connection portion (conductive layer) 234a or may be formed at the lower side thereof.

In addition, the coil lead layer 233 which is another lead layer may be provided at any side of the exterior connection portion (conductive layer) 234a as long as being present under the extending part 286b of the protrusion 287.

In addition, the structure in the vicinity of the exterior connection portion of the electrode lead layer may have the same structure as described above, the electrode lead layer supplying a sense current to the magnetoresistive effect element of the MR head.

Accordingly, the wire density of the coil lead layers 233 and 234 and the electrode lead layers 235 and 236 can be increased, the area of the end surface 231 at the trailing side can be decreased, and hence miniaturization of the slider 230 can be facilitated. In addition, while the area of the end surface 231 at the trailing side is decreased, at least five exterior terminals can be formed thereon.

Furthermore, in this embodiment, since the coil insulating layer 57 is also present all around the periphery of the base portion 281 under the extending part 286b, even when a width dimension W1 of the base portion 281 is decreased for providing the coil lead layer 233 at the side of the exterior connection portion (conductive layer) 234a, the mechanical strength around the protrusion 287 can be maintained. Hence, since a width dimension W2 of the upper portion 286 can be kept large, a bonding area between the protrusion 287 and the exterior terminal 238 can be increased, and reliable conduction having a low electrical resistance can be ensured.

In FIGS. 26 and 28, at the side of the exterior connection portion (conductive layer) 234a and at the position overlapping the extending part 286b of the protrusion 287, only the coil lead layer 233 is provided as another lead layer; however, at positions overlapping the extending part 286b of the protrusion 287, at least two other lead layers may also be provided.

Figure 29:
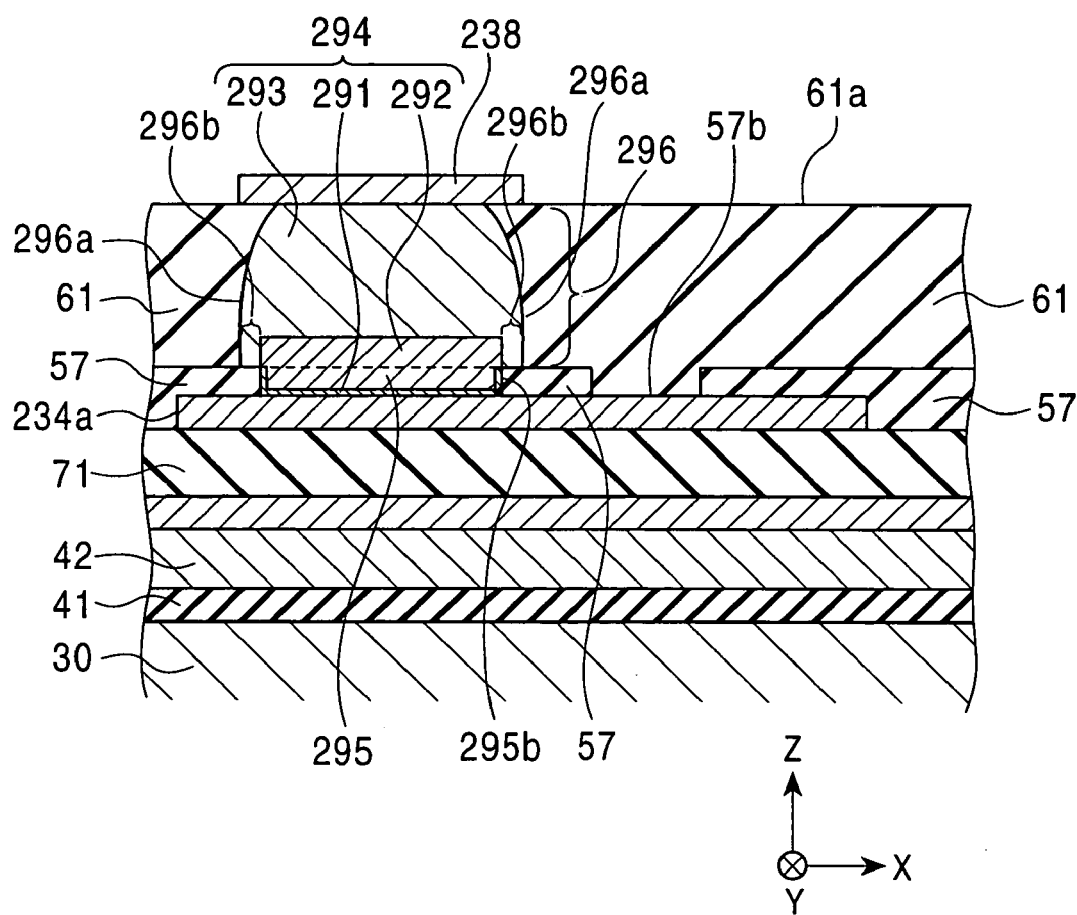
FIG. 29 is a partial cross-sectional view of a thin film structure of another embodiment according to the present invention.

FIG. 29 is a partial cross-sectional view of a thin film structure of another embodiment according to the present invention.

The exterior connection portion 234a of the second coil lead layer 234 shown in FIG. 29 is a conductive layer of the present invention and is formed on the insulating layer 71 formed around the lower core layer 47. On the exterior connection portion 234a, a protrusion (bump) 294 made of a conductive material is provided.

The protrusion (bump) 294 has a plating underlayer 291 formed on the exterior connection portion 234a by sputtering, a first layer 292 penetrating the coil insulating layer 57, and a second layer 293 provided on the first layer 292. The first layer 292 is formed of the same material as that for the upper core layer 60, and the second layer 293 is formed of a material, such as Ni, Cu, or Au, having a small electrical resistance. However, the formation of the first layer 292 may be omitted, and the protrusion (bump) 294 may have a monolayer structure composed of a material, such as Ni, Cu, or Au, having a small electrical resistance.

In the protrusion (bump) 294 shown in FIG. 29, a part of the first layer 292 surrounded by the coil insulating layer 57 is a base portion 295 and an upper part on the base portion 295 is an upper portion 296.

Around the upper portion 296, the protective layer 61 is formed, and the upper portion 296 penetrates the protective layer 61. The upper portion 296 is formed to be exposed at the upper surface 61a of the protective layer 61 and is electrically connected to the exterior terminal 238 formed on the protective layer 61.

In addition, in the coil insulating layer 57, an opening 57b is formed. When the upper portion 296 is formed by plating, current is supplied from the exterior connection portion 234a exposed through the opening 57b.

A conductive connection structure shown in FIG. 29 is also used as the conductive connection structure on the exterior connection portion 234a of the second coil lead layer 234 and that on the exterior connection portion 233b of the first coil lead layer 233.

In addition, the conductive connection structures on the terminal portions (exterior connection portions) of the lead layers 235 and 236 shown in FIG. 26, which are the electrode lead layers for supplying a sense current to the magnetoresistive effect element of the MR head, can be formed to have the same structure as that shown in FIG. 29.

A cross-sectional area (plane parallel to the X-Y plane) of the upper portion 296 perpendicular to the thickness direction (Z direction in the figure) is gradually decreased along the direction toward the upper side (Z direction in the figure) of the upper portion 296. In addition, in the upper portion 296, a sidewall part 296a has an extending part 296b extending outward from a periphery 295a of the base portion 295, and the coil insulating layer (insulating layer) 57 is also present under the extending part 296b.

The coil insulating layer (insulating layer) 57 is present all around the periphery of the base portion 295 under the extending part 296b.

Figure 30:
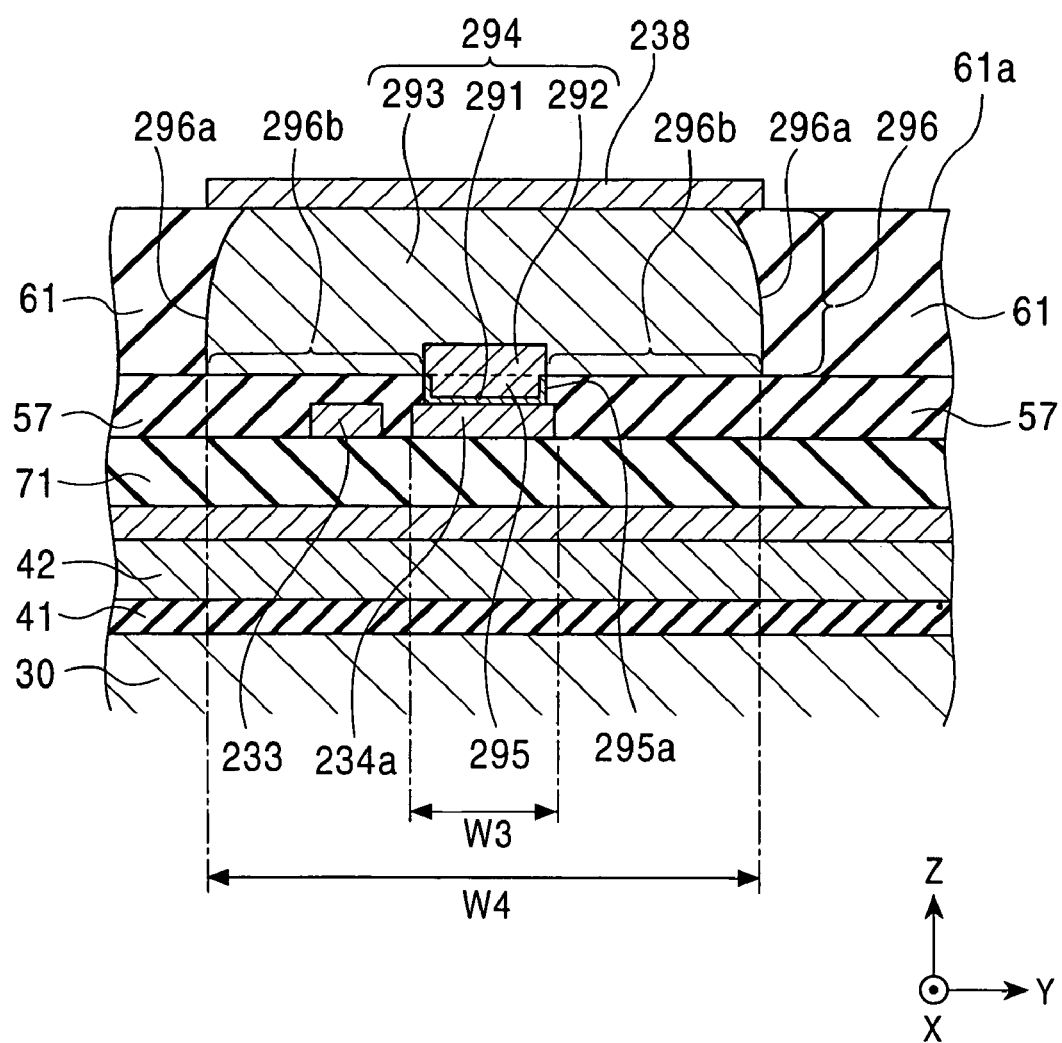
FIG. 30 is a cross-sectional view of a conductive connection structure (thin film structure) shown in FIG. 29 in parallel with a Y-Z plane.

FIG. 30 is a cross-sectional view of the conductive connection structure (thin film structure) shown in FIG. 29 in parallel with the Y-Z plane.

As also shown in FIG. 30, in the upper portion 296, the sidewall part 296a has the extending part 296b extending outward from the periphery 295a of the base portion 295, and the coil insulating layer (insulating layer) 57 is also present under the extending part 296b.

Since the coil insulating layer (insulating layer) 57 is also present under the extending part 296b of the protrusion 294, the mechanical strength around the protrusion 294 is improved. Accordingly, cracking is not likely to occur in the protective layer (insulating layer) 61, and the corrosion resistance of the conductive connection structure is improved.

In addition, in the upper portion 296 of the protrusion 294, since the sidewall part 296a has the extending part 296b extending outward from the periphery 295a of the base portion 295, the volume of the protrusion 294 is maintained, and the increase in electrical resistance can be prevented.

In the embodiment described above, the coil insulating layer (insulating layer) 57 is in contact with the periphery 295a of the base portion 295. That is, in the entire region under the extending part 296b of the protrusion 294, the coil insulating layer (insulating layer) 57 is provided, and as a result, the mechanical strength around the protrusion 294 is improved.

In this embodiment, as shown in FIG. 30, the coil lead layer 233, which is another lead layer, is provided at a side of the exterior connection portion (conductive layer) 234a and at a position overlapping the extending part 296b of the protrusion 294. As shown in FIG. 26, this coil lead layer 233 is connected to another thin film structure composed of the exterior connection portion 233b, the protrusion, and the exterior terminal 238.

In addition, the structure in the vicinity of the exterior connection portion of the electrode lead layer may have the same structure as described above, the electrode lead layer supplying a sense current to the magnetoresistive effect element of the MR head.

Accordingly, the wire density of the coil lead layers 233 and 234 and the electrode lead layers 235 and 236 can be increased, the area of the end surface 231 at the trailing side can be decreased, and hence miniaturization of the slider 230 can be facilitated. In addition, while the area of the end surface 231 at the trailing side is decreased, at least five exterior terminals can be formed thereon.

Furthermore, in this embodiment, since the coil insulating layer 57 is also present all around the periphery of the base portion 295 under the extending part 296b, even when a width dimension W3 of the base portion 295 is decreased for providing the coil lead layer 233 at the side of the exterior connection portion (conductive layer) 234a, the mechanical strength around the protrusion 294 can be maintained. Hence, a width dimension W4 of the upper portion 296 can be kept large, a bonding area between the protrusion 294 and the exterior terminal 238 can be increased, and reliable conduction having a low resistance can be ensured.

In FIG. 30, at the side of the exterior connection portion (conductive layer) 234a and at the position overlapping the extending part 296b of the protrusion 294, only the coil lead layer 233 is provided as another lead layer; however, at positions overlapping the extending part 296b of the protrusion 294, at least two other lead layers may be provided.

A method for manufacturing the conductive connection structure (thin film structure) shown in FIGS. 27 and 28 will be described.

FIGS. 31A to 35 are schematic views for illustrating manufacturing steps of the conductive connection structure (thin film structure) shown in FIGS. 27 and 28. In the figures mentioned above, for example, FIG. 31A is a plan view of the conductive connection structure (thin film structure) when viewed from above, and FIG. 31B is a cross-sectional view of the conductive connection structure taken on the line XXXIB-XXXIB shown in FIG. 31A when viewed along the arrow.

The formation of the conductive connection structure (thin film structure) shown in FIGS. 27 and 28 is simultaneously performed when the inductive head shown in FIGS. 26 and 2 is formed.

Figure 31A:
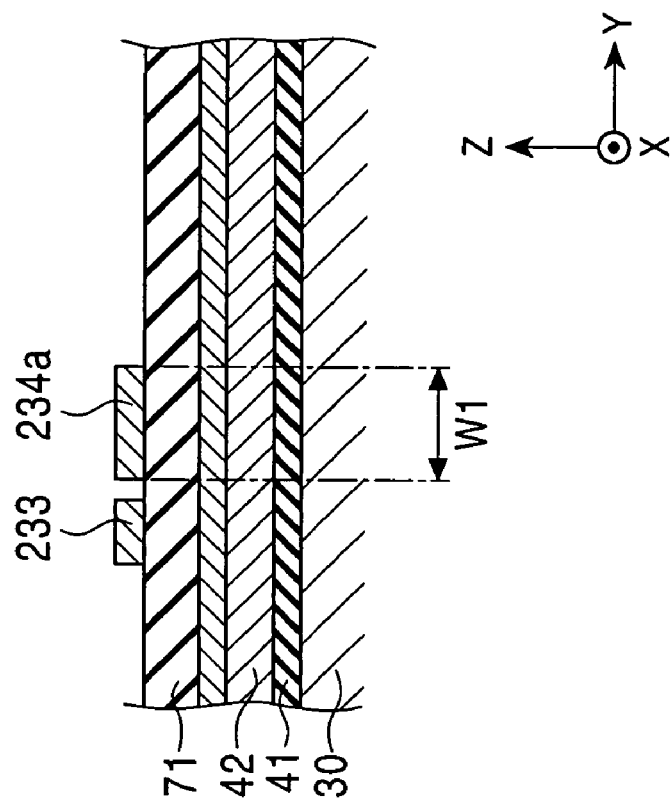
FIGS. 31A and 31B are a plan view and a cross-sectional view, respectively, for illustrating a step of manufacturing a conductive connection structure (thin film structure) shown in FIGS. 27 and 28.
Figure 31B:
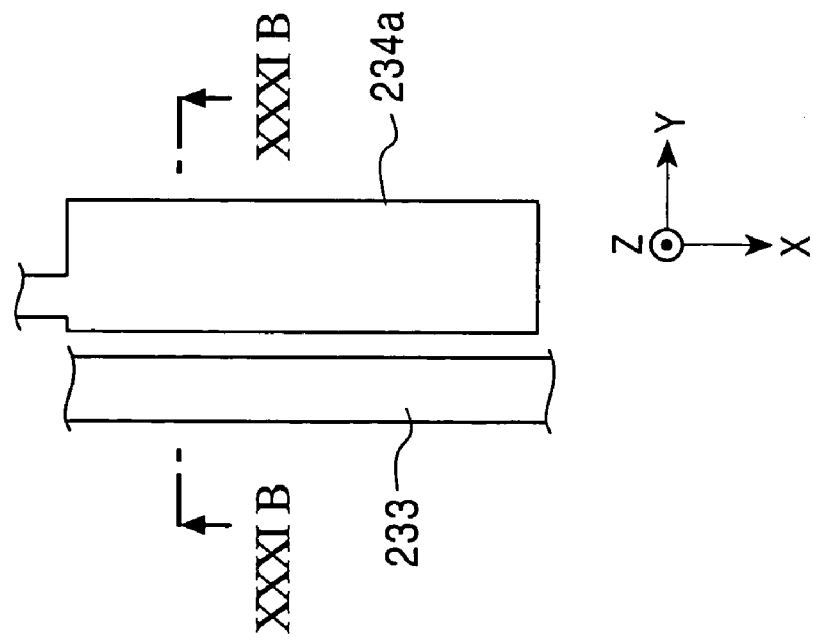

In the step shown in FIGS. 31A and 31B, after the lower core layer 47 of the inductive head shown in FIG. 2 is formed, the insulating layer 71 is formed around the lower core layer 47, and on this insulating layer 71, the second coil lead layer 234 shown in FIG. 26 is formed. The second coil lead layer 234 is simultaneously formed with the first coil layer 54 by plating using the same material as that for the first coil layer 54 shown in FIG. 2. The exterior connection portion 234a of the second coil lead layer 234 is the conductive layer of the present invention, and on the exterior connection portion 234a, the layers forming the conductive connection structure (thin film structure) are sequentially formed.

In the step described above, the dimension W1 of the exterior connection portion 234a of the coil lead layer 234 is formed smaller than the dimension W2 of the protrusion 287 which is formed later, the dimensions W1 and W2 being along the Y direction in the figure, and the coil lead layer (another lead layer) 233 is formed at the side of the conductive layer 234a and under the protrusion 287. In this case, the formation of the coil lead layer 233 can be simultaneously performed when the coil layer 54 and the coil lead layer 234 are formed. Next, in the step shown in FIGS. 32A and 32B, on the exterior connection portion 234a, the base portion 281 and the metal layer 288 are formed by plating. The base portion 281 and the metal layer 288 are formed simultaneously with the first contact portion 62 shown in FIG. 1 using the same material, such as Ni, Cu, or Au, as that for the first contact portion 62. The first contact portion 62 serves to electrically connect between the coiling center 54a of the first coil layer 54 and the coiling center 58a of the second coil layer 58. In addition, the metal layer 288 serves as a current-carrying portion allowing current to pass therethrough when the upper portion 286 is formed by plating.

Figure 33:
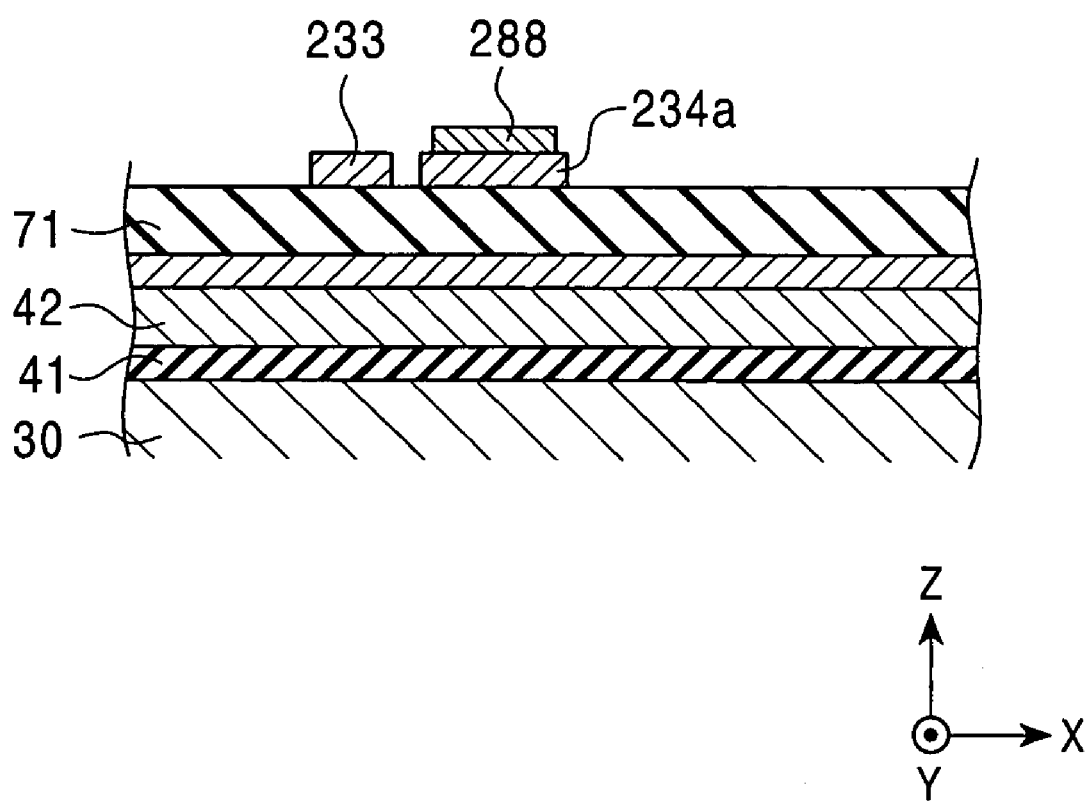
FIG. 33 is a cross-sectional view for illustrating a step of manufacturing the conductive connection structure (thin film structure) shown in FIGS. 27 and 28.

FIG. 33 is a cross-sectional view of the thin film structure taken along the line XXXIII-XXXIII shown in FIG. 32 when viewed along the arrow.

Next, in the step shown in FIGS. 34A and 34B, on the insulating layer 71, the exterior connection portion 234a, the base portion 281, and the metal layer 288, the coil insulating layer 57 is formed by sputtering. The coil insulating layer 57 is then polished using a CMP technique (milling and polishing technique) so that the upper surfaces of the base portion 281 and the metal layer 288 are exposed. The upper surface of the coil insulating layer 57 and the upper surfaces of the base portion 281 and the metal layer 288 form a planarized and flush surface, and the flush surface thus formed coincides with the reference plane D. In this step, the coil insulating layer 57 has a thickness t10 of 1 μm or less.

The coil insulating layer 57 is the same as the coil insulating layer 57 shown in FIG. 2 and is formed of an inorganic material such as $Al_2O_3$ or $SiO_2$.

Subsequently, as is the manufacturing method of the thin film structure shown in FIGS. 3 and 4, the upper portion 286 is formed by sequential plating on the base portion 281 to form the protrusion 287, and after the protrusion 287 is exposed at the surface of the protective layer 61, the exterior terminal 238 is formed on the protrusion 287.

That is, on the base portion 281, the first layer 282 is formed simultaneously with the second coil layer 58 by frame plating using the same material as that for the second coil layer 58 shown in FIG. 2, and on the first layer 282, the second layer is formed simultaneously with the plating underlayer by sputtering using the same material as that for this plating underlayer for forming the upper core layer 60 shown in FIG. 2. At the same time, on the metal layer 288, a current-carrying film 300 is also formed by sputtering using the same material as that for the plating underlayer described above. A position at which the current-carrying film 300 is formed is indicated by a dotted line shown in FIG. 34B. The current-carrying film 300 is separated from the second layer 283 and can also be used as a lead layer for supplying current to the metal layer 288 for plating.

In addition, on the second layer 283, the third layer 284 is formed simultaneously with the upper core layer 60 by frame plating using the same material as that for the upper core layer 60 shown in FIG. 2. In this step, by using the current-carrying film 300 as a lead layer, current for plating can be supplied from the upper surface of the metal layer 288 through the exterior connection portion 234a.

Next, on the third layer 284, the fourth layer 285 is formed by plating using a material such as Ni, Cu, or Au having a small electrical resistance. As is the step shown in FIG. 14, the fourth layer 285 is formed by free plating growth using a conductive material. The fourth layer 85 is formed to have a thickness t11 of 40 μm obtained by plating. In this step, by using the current-carrying film 300 as a lead layer, current for plating can also be supplied from the upper surface of the metal layer 288.

However, free plating growth may be performed using a conductive material directly on the base portion 281 so as to form an upper portion having a monolayer structure.

According to this embodiment, since the fourth layer 285 is formed by free plating growth, the cross-sectional area (plane parallel to the X-Y plane) of the upper portion 286 perpendicular to the thickness direction (Z direction in the figure) is gradually decreased along the direction toward the upper side (Z direction in the figure) of the upper portion 286.

In addition, in the upper portion 286, the sidewall part 286*a* has the extending part 286*b* extending outward from the periphery 281*b* of the base portion 281, and the coil insulating layer (insulating layer) 57 is present all around the periphery of the base portion 281 under the extending part 286*b*.

In this embodiment, the extending part 286*b* of the upper portion 286 is formed to extend to a position overlapping the coil lead layer (another lead layer) 233.

That is, only a part of the exterior connection portion 234*a* at which the metal layer 288 is formed by plating is extended to the outside of the area of the protrusion 287, the other part of the exterior connection portion 234*a* is formed under the extending part 286*b* of the protrusion 287, and the coil lead layer (another lead layer) 233 is provided under the extending part 286*b* of the protrusion 287.

Also in the manufacturing method described above, by supplying current from the upper surface of the metal layer 288 (current-carrying portion), the upper portion 286 can be formed on the base portion 281 by plating, thereby forming the protrusion 287. Hence, the metal layer (current-carrying portion) 288 can be formed at a position close to the base portion 281 and is not necessary to be removed later. Accordingly, after the upper portion 286 is formed by plating, the coil insulating layer 57 formed all around the periphery of the base portion 281 is also not necessary to be removed, and as a result, the conductive connection structure (thin film structure) can be formed in which the coil insulating layer 57 is also present under the extending part 286*b* of the protrusion 287.

In the conductive connection structure (thin film structure) formed by this manufacturing method, the mechanical strength around the protrusion 287 is improved, cracking is unlikely to occur in the protective layer 61, and the corrosion resistance is improved. In particular, the generation of cracks in the protective layer 61 in the milling step shown in FIG. 16 can be suppressed.

In addition, when the fourth layer 285 of the upper portion 286 is formed, since the free plating growth is only performed, the variation in volume of the protrusion 287 is reduced, and the variation in electrical resistance can be reduced.

In this embodiment, the wire density of the coil lead layers 233 and 234 and the electrode lead layers 235 and 236 can be increased, the area of the end surface 231 at the trailing side can be decreased, and as a result, miniaturization of the slider 230 can be facilitated. In addition, while the area of the end surface 231 at the trailing side is decreased, at least five exterior terminals can be formed on the end surface 231 at the trailing side.

Furthermore, in this embodiment, since the coil insulating layer 57 is also present all around the periphery of the base portion 281 under the extending part 286*b*, even when the width dimension of the base portion 281 is decreased for providing the coil lead layer 233 at the side of the exterior connection portion (conductive layer) 234*a*, the mechanical strength around the protrusion 287 can be maintained. Hence, since the width dimension of the upper portion 286 can be kept large, the bonding area between the protrusion 287 and the exterior terminal 238 can be increased, and reliable conduction having a low electrical resistance can be ensured.

In FIGS. 26 and 28, at the side of the exterior connection portion (conductive layer) 234*a* and at the position overlapping the extending part 286*b* of the protrusion 287, only the coil lead layer 233 is provided as another lead layer; however, at positions overlapping the extending part 286*b* of the protrusion 287, at least two other lead layers may be provided.

According to the manufacturing method described above, the cross-sectional area (plane parallel to the X-Y plane) of the upper portion 286 perpendicular to the thickness direction (Z direction in the figure) is gradually decreased along the direction toward the upper side (Z direction in the figure) of the upper portion 286. That is, since the side surface of the upper portion 286 has a curved or an inclined surface, the thickness of the protective layer 61 can be decreased when it is formed.

A method for manufacturing the conductive connection structure (thin film structure) shown in FIGS. 29 and 30 will be described.

FIGS. 36A to 39 are schematic views for illustrating manufacturing steps of the conductive connection structure (thin film structure) shown in FIGS. 29 and 30. In the figures mentioned above, for example, FIG. 36A is a plan view of the conductive connection structure (thin film structure) when viewed from above, and FIG. 36B is a cross-sectional view of the conductive connection structure taken on the line XXXVIB-XXXVIB shown in FIG. 36A when viewed along the arrow.

The formation of the conductive connection structure (thin film structure) shown in FIGS. 29 and 30 is simultaneously performed when the inductive head shown in FIGS. 1 and 2 is formed.

As is the step shown in FIGS. 31A and 31B, after the lower core layer 47 of the inductive head shown in FIG. 2 is formed, the insulating layer 71 is first formed around the lower core layer 47, and on this insulating layer 71, the second coil lead layer 234 and the first coil lead layer 233 shown in FIG. 26 are formed. The second coil lead layer 234 is simultaneously formed with the first coil layer 54 by plating using the same material as that for the first coil layer 54 shown in FIG. 2.

The exterior connection portion 234*a* of the second coil lead layer 234 is the conductive layer of the present invention, and on the exterior connection portion 234*a*, the layers forming the conductive connection structure (thin film structure) are sequentially formed.

Next, in the step shown in FIGS. 36A and 36B, on the insulating layer 71 and the exterior connection portion 234*a*, the coil insulating layer 57 is formed by sputtering. The coil insulating layer 57 is the same as the coil insulating layer 57 shown in FIG. 2 and is formed of an inorganic material such as $Al_2O_3$ or $SiO_2$.

In addition, the current-carrying opening 57*b* and the plating-forming opening 57*c* are formed in the coil insulating layer 57 to expose the exterior connection portion 234*a*.

Figure 37:
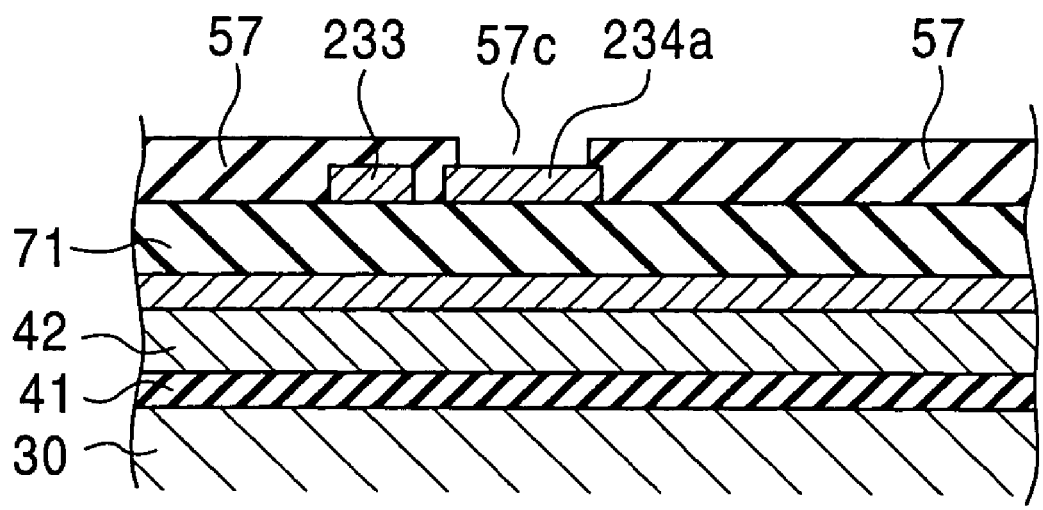
FIG. 37 is a cross-sectional view for illustrating a step of manufacturing the conductive connection structure (thin film structure) shown in FIGS. 29 and 30.

FIG. 37 is a cross-sectional view of the second coil lead layer 234 and the first coil lead layer 233 taken on the line XXXVII-XXXVII shown in FIG. 36A when viewed along the arrow. The first coil lead layer 233 is totally covered with the coil insulating layer 57.

Figure 38B:
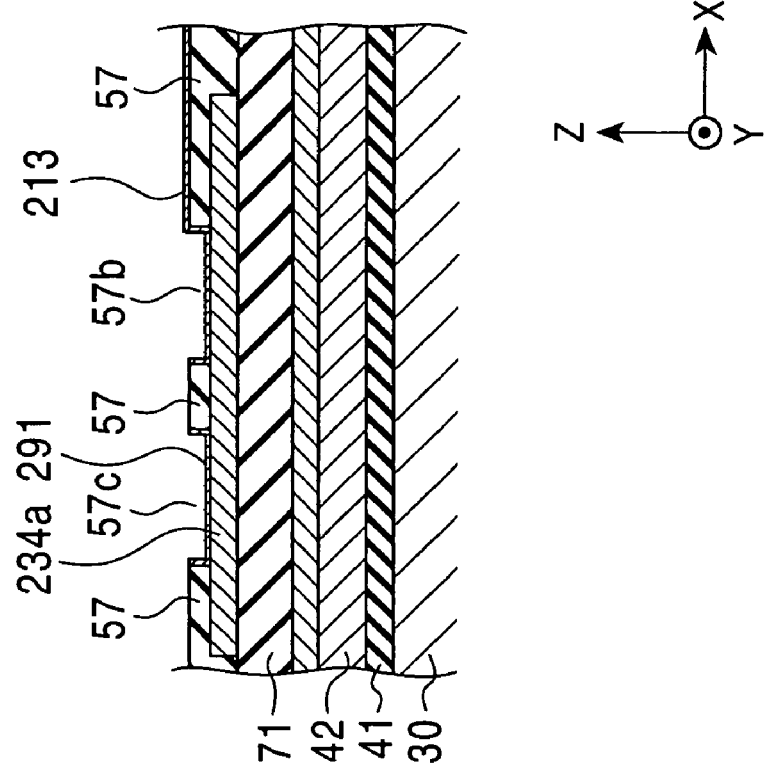
FIGS. 38A and 38B are a plan view and a cross-sectional view, respectively, for illustrating a step of manufacturing the conductive connection structure (thin film structure) shown in FIGS. 29 and 30.
Figure 38A:
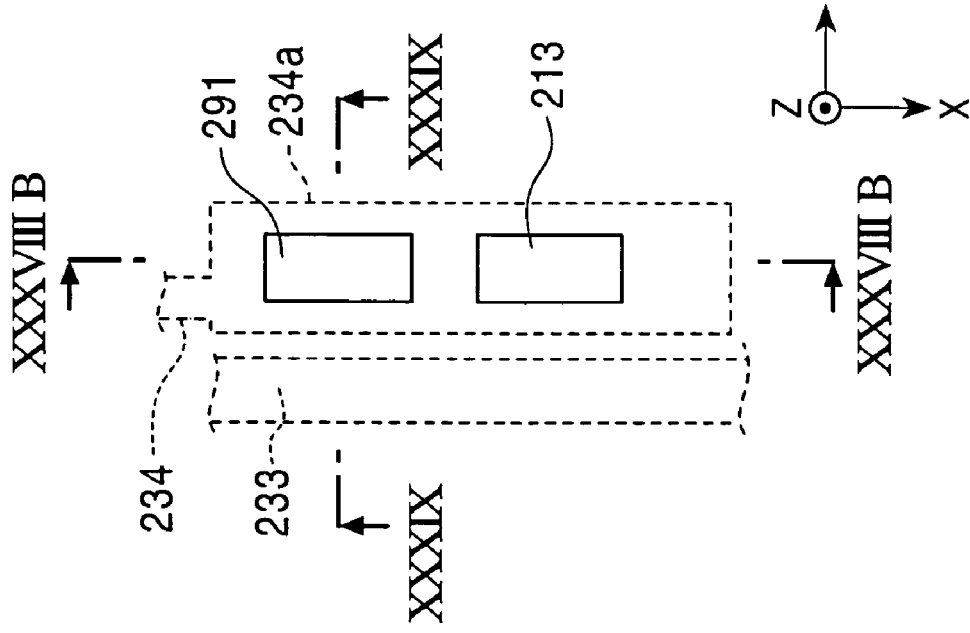

Next, in the step shown in FIGS. 38A and 38B, on the exterior connection portion 234*a* exposed through the plating-forming opening 57*c*, the plating underlayer 291 is formed simultaneously with the plating underlayer for the upper core layer 60 shown in FIG. 2 by sputtering using the same material as that for the plating underlayer described above. At the same time when this plating underlayer is formed, on the exterior connection portion 234*a* exposed through the current-carrying opening 57*b* and the coil insulating layer 57, a current-carrying film 213 is formed by sputtering using the same material as that for the plating underlayer described above. The current-carrying film 213 is separated from the plating underlayer 291 and is used as a lead layer for supplying current to the exterior connection portion 234a for plating.

Figure 39:
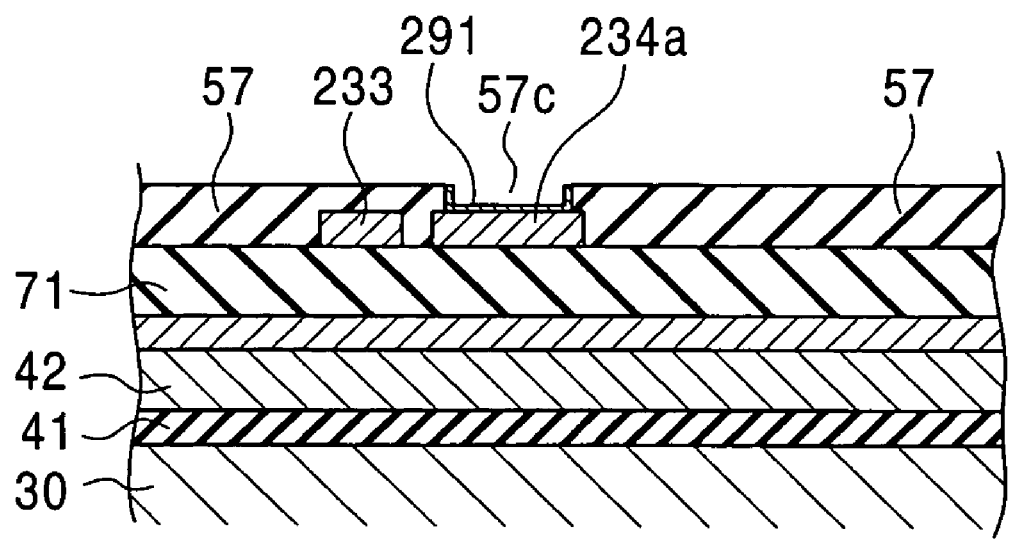
FIG. 39 is a cross-sectional view for illustrating a step of manufacturing the conductive connection structure (thin film structure) shown in FIGS. 29 and 30.
Figure 40:
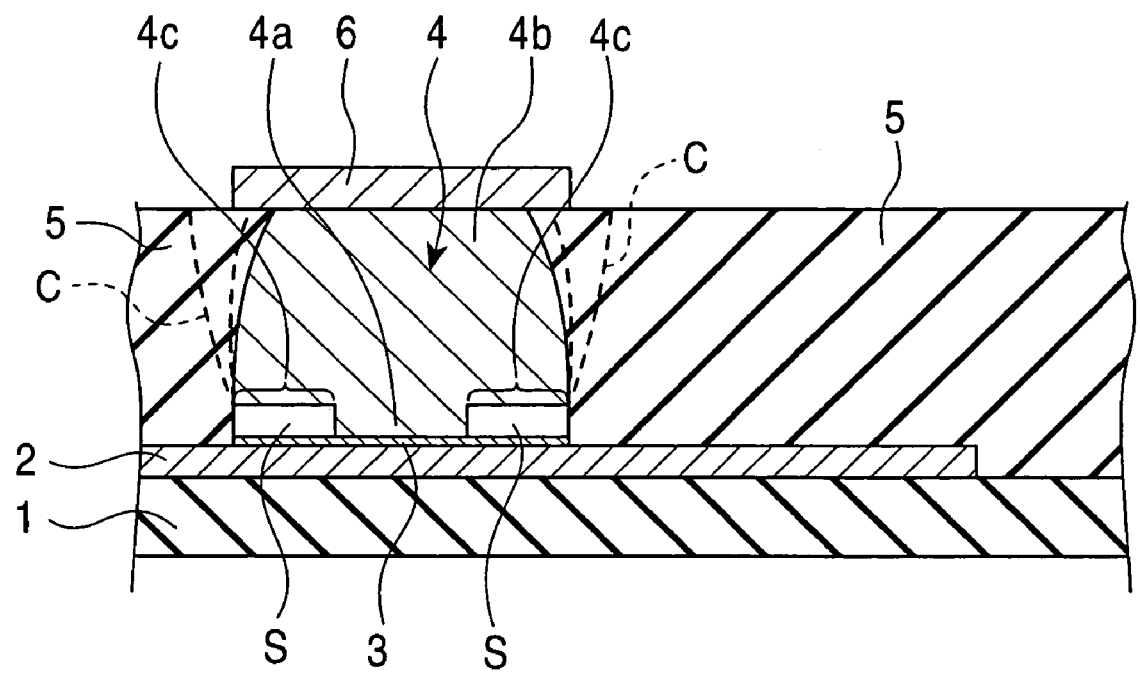
FIG. 40 is a cross-sectional view showing a related conductive connection structure (thin film structure)
Figure 41:
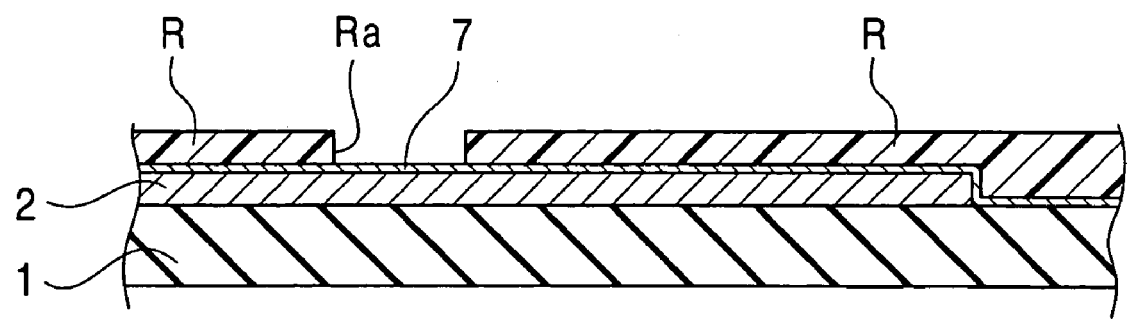
FIG. 41 is a cross-sectional view for illustrating a manufacturing step of the related conductive connection structure (thin film structure)
Figure 42:
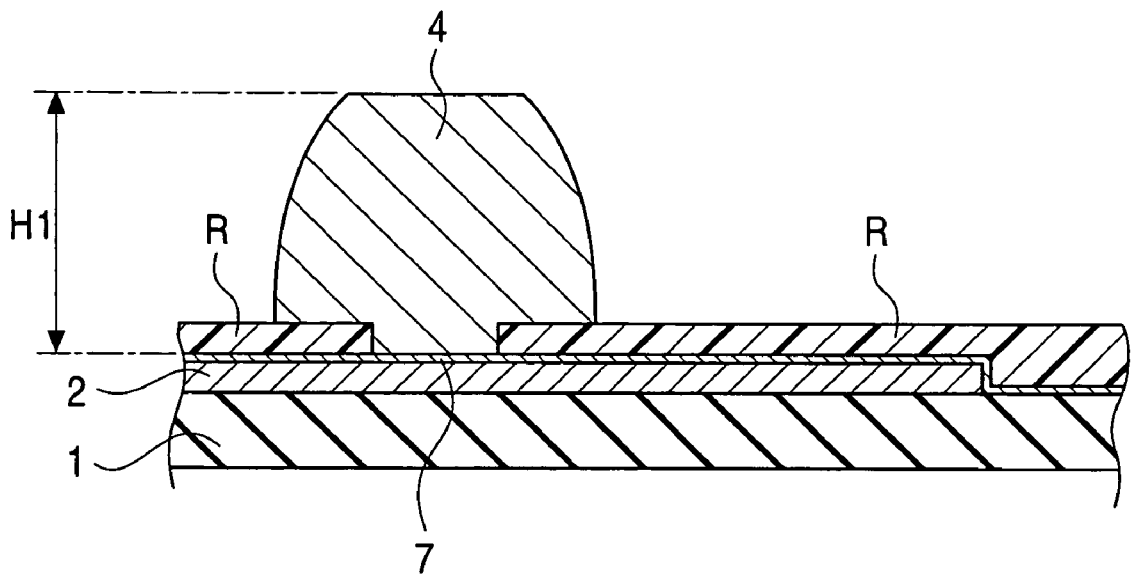
FIG. 42 is a cross-sectional view for illustrating a manufacturing step of the related conductive connection structure (thin film structure)
Figure 43:
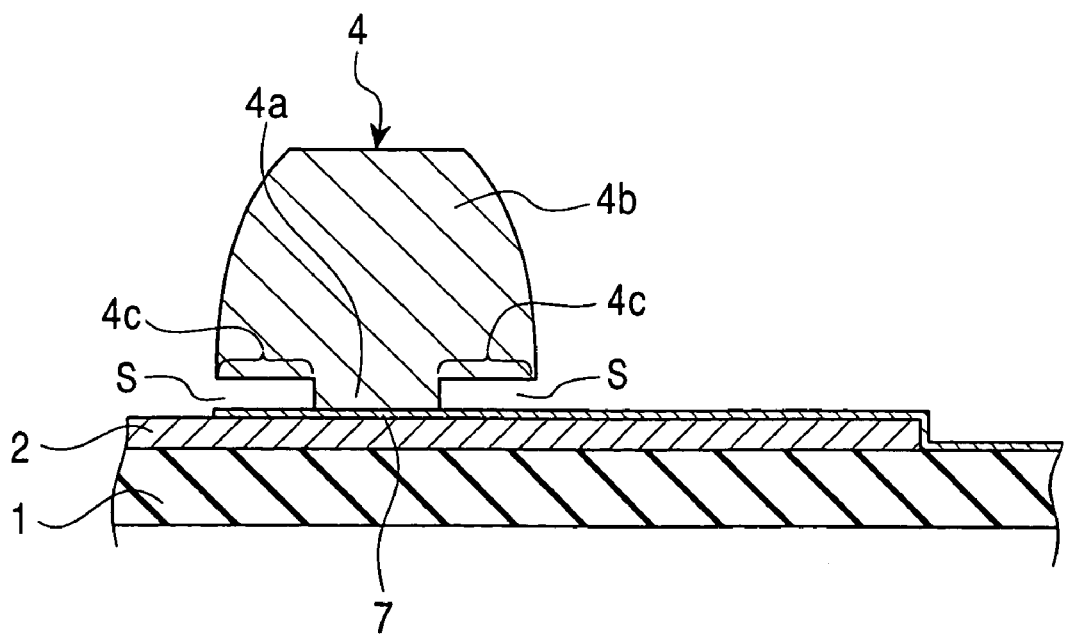
FIG. 43 is a cross-sectional view for illustrating a manufacturing step of the related conductive connection structure (thin film structure)
Figure 44:
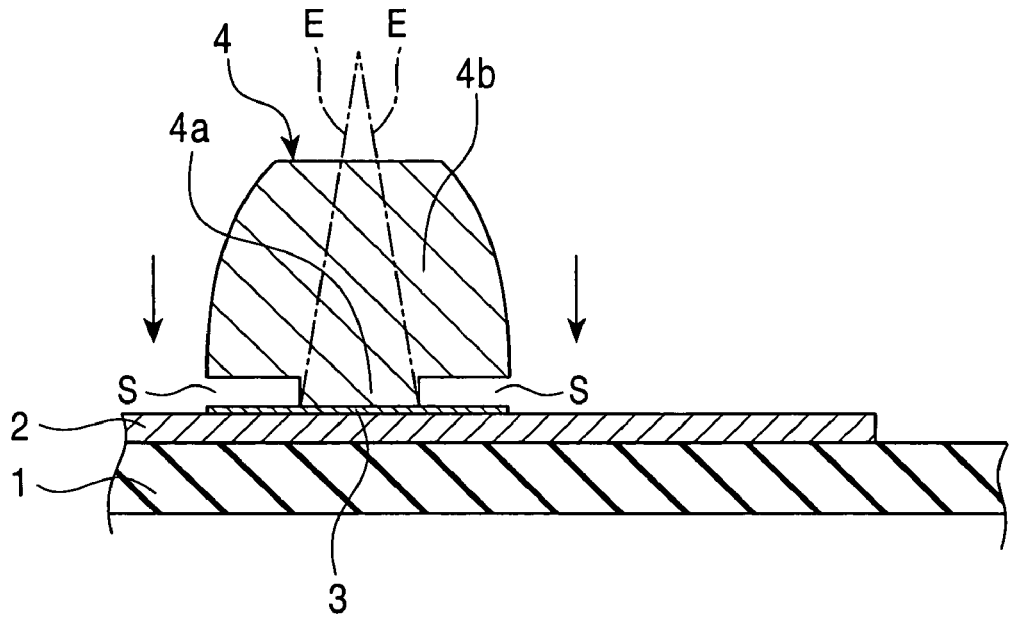
FIG. 44 is a cross-sectional view for illustrating a manufacturing step of the related conductive connection structure (thin film structure)
Figure 45:
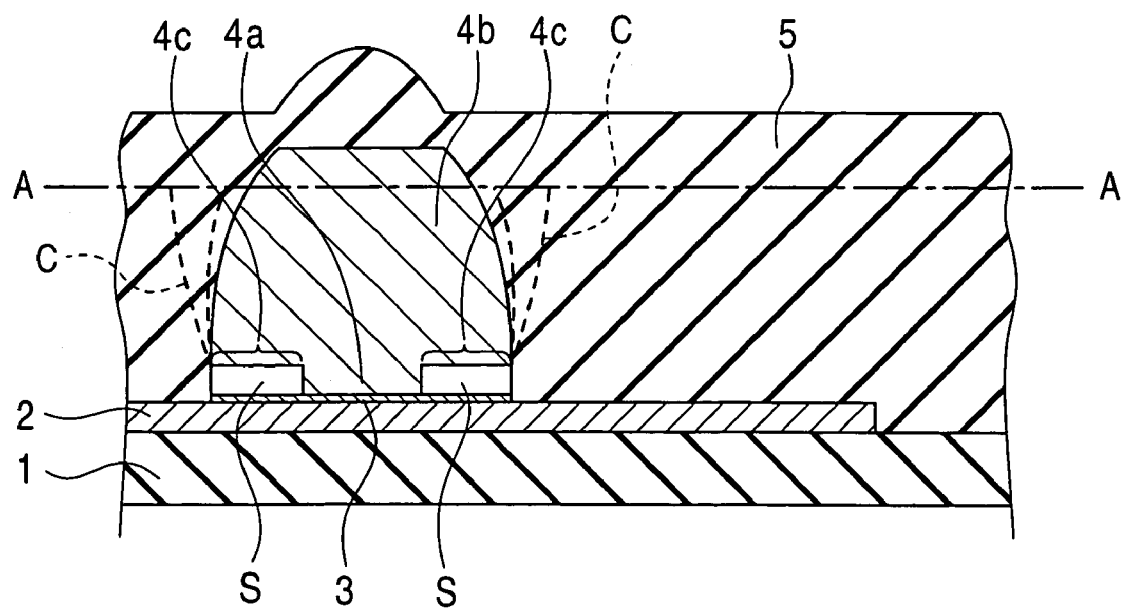
FIG. 45 is a cross-sectional view for illustrating a manufacturing step of the related conductive connection structure (thin film structure).

FIG. 39 is a cross-sectional view of the second coil lead layer 234 and the first coil lead layer 233 taken on the line XXXIX-XXXIX shown in FIG. 38A when viewed along the arrow.

Subsequently, as is the manufacturing method of the thin film structure shown in FIGS. 5 and 6, the first layer 292 is, formed on the plating underlayer 291 simultaneously with the upper core layer 60 by frame plating using the same material as that for the upper core layer 60, and on the first layer 292, the second layer 293 is formed by plating using a material such as Ni, Cu, or Au having a small electrical resistance. The second layer 293 is formed by free plating growth. The thickness of the second layer 293 obtained by plating is 40 μm. In this step, by using the current-carrying film 213 as a lead layer, current for plating can be supplied from the upper surface of the exterior connection portion 234a.

By forming the second layer 293 using the free plating growth, the cross-sectional area of the upper portion 296 perpendicular to the thickness direction (Z direction in the figure) is gradually decreased in the direction toward the upper side (Z direction in the figure) of the upper portion 296.

In the protrusion (bump) 294, a part of the first layer 292 surrounded by the coil insulating layer 57 is the base portion 295, and an upper part on the base portion 295 is the upper portion 296.

In the upper portion 296, the sidewall part 296a has the extending part 296b extending outward from the periphery 295a of the base portion 295, and the coil insulating layer (insulating layer) 57 is present all around the periphery of the base portion 295 under the extending part 296b.

In this embodiment, the coil insulating layer (insulating layer) 57 may be formed of an organic insulating material such as a resist material.

In addition, after the protective layer 61 is formed on the coil insulating layer 57 and the upper portion 296 by sputtering, the upper surface of the upper portion 296 is exposed, and the exterior terminal 238 is formed on the upper surface of the upper portion 296, thereby forming the conductive connection structure shown in FIGS. 29 and 30.

In addition, in this embodiment, the extending part 296b of the upper portion 296 is formed to extend to a position overlapping the coil lead layer (another lead layer) 233.

That is, only a part of the exterior connection portion 234a at which the current-carrying opening 57b is formed is extended to the outside of the area of the protrusion 294, the other part of the exterior connection portion 234a is formed under the extending part 296b of the protrusion 294, and the coil lead layer (another lead layer) 233 is provided under the extending part 296b of the protrusion 294.

In this embodiment, by supplying current from above the current-carrying opening 57b, the first layer 292 and the second layer 293 are formed by plating on the exterior connection portion 234a exposed through the plating-forming opening 57c. When the current-carrying opening 57b is formed at a position close to the plating-forming opening 57c, the exterior connection portion 234a in the vicinity of this current-carrying opening 57b is not necessary to be removed later. Accordingly, after the protrusion 294 is formed, the coil insulating layer 57 formed all around the periphery of the base portion 295 is also not necessary to be removed, and as a result, the conductive connection structure (thin film structure) can be formed in which the coil insulating layer 57 is also present under the extending part 296b of the protrusion 294.

In the conductive connection structure (thin film structure) formed in accordance with this manufacturing method, the mechanical strength around the protrusion 294 is improved, cracking is not likely to occur in the protective layer 61, and the corrosion resistance is improved.

In addition, when the second layer 293 is formed, since the free plating growth is only performed, the variation in volume of the protrusion 294 is reduced, and hence a thin film structure can be manufactured in which the variation in electrical resistance can be reduced.

In this embodiment, the wire density of the coil lead layers 233 and 234 and the electrode lead layers 235 and 236 can be increased, the area of the end surface 231 at the trailing side can be decreased, and as a result, miniaturization of the slider 230 can be facilitated. In addition, while the area of the end surface 231 at the trailing side is decreased, at least five exterior terminals can be formed on the end surface 231 at the trailing side.

Furthermore, in this embodiment, since the coil insulating layer 57 is also present all around the periphery of the base portion 295 under the extending part 296b, even when the width dimension W3 of the base portion 295 is decreased for providing the coil lead layer 233 at the side of the exterior connection portion (conductive layer) 234a, the mechanical strength around the protrusion 294 can be maintained. Hence, since the width dimension of the upper portion 296 can be kept large, the bonding area between the protrusion 294 and the exterior terminal 238 can be increased, and reliable conduction having a low electrical resistance can be ensured.

Heretofore, the preferable embodiments of the present invention have been described; however, various modifications may be made without departing from the scope of the present invention.

In addition, the above embodiments have been described by way of example, and the present invention is not limited thereto.

What is claimed is:

1. A method for manufacturing a thin film magnetic head, the method comprising:
   (a) forming a lower core layer;
   (b) forming a first insulating layer around the lower core layer;
   (c) simultaneously forming by plating a coil layer on the lower core layer with a coil insulating underlayer interposed therebetween and a first coil lead layer connected to the coil layer on the first insulating layer;
   (d) forming a coil insulating layer of an inorganic material on the coil layer and the first coil lead layer;
   (e) forming two openings in the coil insulating layer on the first coil lead layer to expose the first coil lead layer so that the two openings form a plating-forming opening and a current-carrying opening;
   (f) simultaneously forming a first plating underlayer by plating a second plating underlayer on the first coil lead layer exposed through the plating-forming opening, and a current-carrying lead layer that is continuously provided from the surface of the first coil lead layer exposed through the current-carrying opening to a surface of the coil insulating layer, using the same material;

(g) simultaneously forming, by plating from the same material as the first plating underlayer, an upper core layer on the first plating underlayer and a base portion on the second plating underlayer in the plating-forming opening formed in the coil insulating layer by supplying a current from the current-carrying lead layer to the second plating underlayer in the plating-forming opening through the first coil lead layer facing the current-carrying opening, and further forming a first upper portion from the same material as that for the upper core layer by plating to extend from the base portion to an outside of the plating-forming opening using free plating growth from the base portion;

(h) forming a second upper portion, which is provided on the first upper portion and extends therefrom to the outside of the plating-forming opening and which has an outer shape having a height larger than that of the plating-forming opening, a width extending from the plating-forming opening to the surface of the coil insulating layer, and a convex-curved side surface, using free plating growth from the first upper portion by supplying a current to the first upper portion from the current-carrying lead layer through the first coil lead layer facing the current-carrying opening and the second plating underlayer in the plating-forming opening, so that a protrusion is formed from the base portion, the first upper portion, and the second upper portion;

(i) removing the current-carrying lead layer by ion milling; and (j) forming a protective layer of an inorganic material on the second upper portion of the protrusion and the coil insulating layer.

2. The method of claim 1, wherein when the first coil lead layer is formed, a second coil lead layer is simultaneously formed on the first insulating layer by plating so as to be disposed at a certain distance from the first coil lead layer, and the second upper portion of the protrusion is formed by plating so that the width of the second upper portion extends from the plating-forming opening to a surface of the coil insulating layer formed on the second coil lead layer.

3. The method of claim 1, wherein the coil insulating layer comprises $Al_2O_3$ or $SiO_2$.

4. The method of claim 1, wherein the protective layer comprises $Al_2O_3$ or $SiO_2$.

* * * * *